(12) United States Patent
Jang et al.

(10) Patent No.: US 12,206,510 B2
(45) Date of Patent: Jan. 21, 2025

(54) METHOD AND APPARATUS FOR DETERMINING PROCESSING TIME OF UE IN WIRELESS COMMUNICATION SYSTEM

(71) Applicant: Samsung Electronics Co., Ltd., Gyeonggi-do (KR)

(72) Inventors: Youngrok Jang, Gyeonggi-do (KR); Taehyoung Kim, Gyeonggi-do (KR); Jinyoung Oh, Gyeonggi-do (KR); Jinhyun Park, Gyeonggi-do (KR); Hyoungju Ji, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 305 days.

(21) Appl. No.: 17/565,979

(22) Filed: Dec. 30, 2021

(65) Prior Publication Data
US 2022/0209904 A1 Jun. 30, 2022

(30) Foreign Application Priority Data

Dec. 30, 2020 (KR) .................. 10-2020-0187374
Aug. 24, 2021 (KR) .................. 10-2021-0111842

(51) Int. Cl.
*H04L 1/1867* (2023.01)
*H04L 5/00* (2006.01)
*H04W 72/1273* (2023.01)

(52) U.S. Cl.
CPC .......... *H04L 1/1887* (2013.01); *H04L 5/0055* (2013.01); *H04W 72/1273* (2013.01)

(58) Field of Classification Search
CPC .......... H04W 72/12; H04W 72/04; H04L 5/00
See application file for complete search history.

(56) References Cited

U.S. PATENT DOCUMENTS

2019/0306865 A1 10/2019 Medles et al.
2021/0160827 A1 5/2021 Kim et al.
(Continued)

FOREIGN PATENT DOCUMENTS

WO  WO 2019/185043  10/2019
WO  WO 2020/032587  2/2020
(Continued)

OTHER PUBLICATIONS

Qualcomm Incorporated, "Multi-TRP Enhancements", R1-2006781, 3GPP TSG-RAN WG1 Meeting #102-e, Aug. 17-28, 2020, 11 pages. (Year: 2020).*
(Continued)

*Primary Examiner* — Chi H Pham
*Assistant Examiner* — Samuel Dilan Rutnam
(74) *Attorney, Agent, or Firm* — The Farrell Law Firm, P.C.

(57) ABSTRACT

The disclosure relates to converging a 5G communication system for supporting higher data rates beyond a 4G system with a technology for IoT, and may be applied to intelligent services based on the 5G communication technology and IoT-related technology. A method is provided, which improves coverage of a PDCCH in a wireless communication system and a method of repeatedly transmitting the PDCCH. When a PDCCH is repeatedly transmitted, a method is provided for determining a PDSCH processing time and a PUSCH preparation time considered by a UE is provided, and thus, a more efficient communication system can be implemented.

16 Claims, 26 Drawing Sheets

(56) References Cited

U.S. PATENT DOCUMENTS

2022/0240295 A1* 7/2022 Gao .................. H04L 1/1887
2022/0330296 A1* 10/2022 Sun .................. H04L 5/0053

FOREIGN PATENT DOCUMENTS

WO PCT/CN/2020/107491    *  6/2020
WO     WO 2021/101088        5/2021

OTHER PUBLICATIONS

Qualcomm Incorporated, "Multi-TRP Enhancements", R1-2006781, 3GPP TSG-RAN WG1 Meeting #102-e, Aug. 17-28, 2020, 11 pages.
CATT, "Remaining Issues on UCI Enhancements", R1-2007815, 3GPP TSG RAN WG1 #103-e, Oct. 26-Nov. 13, 2020, 18 pages.
Qualcomm Incorporated, "Multi-TRP Enhancements", R1-2004463, 3GPP TSG RAN WG1 #101-e, May 25-Jun. 5, 2020, 11 pages.
International Search Report dated Apr. 11, 2022 issued in counterpart application No. PCT/KR2021/020295, 6 pages.
European Search Report dated Sep. 23, 2024 issued in counterpart application No. 21915879.7-1206, 8 pages.

* cited by examiner

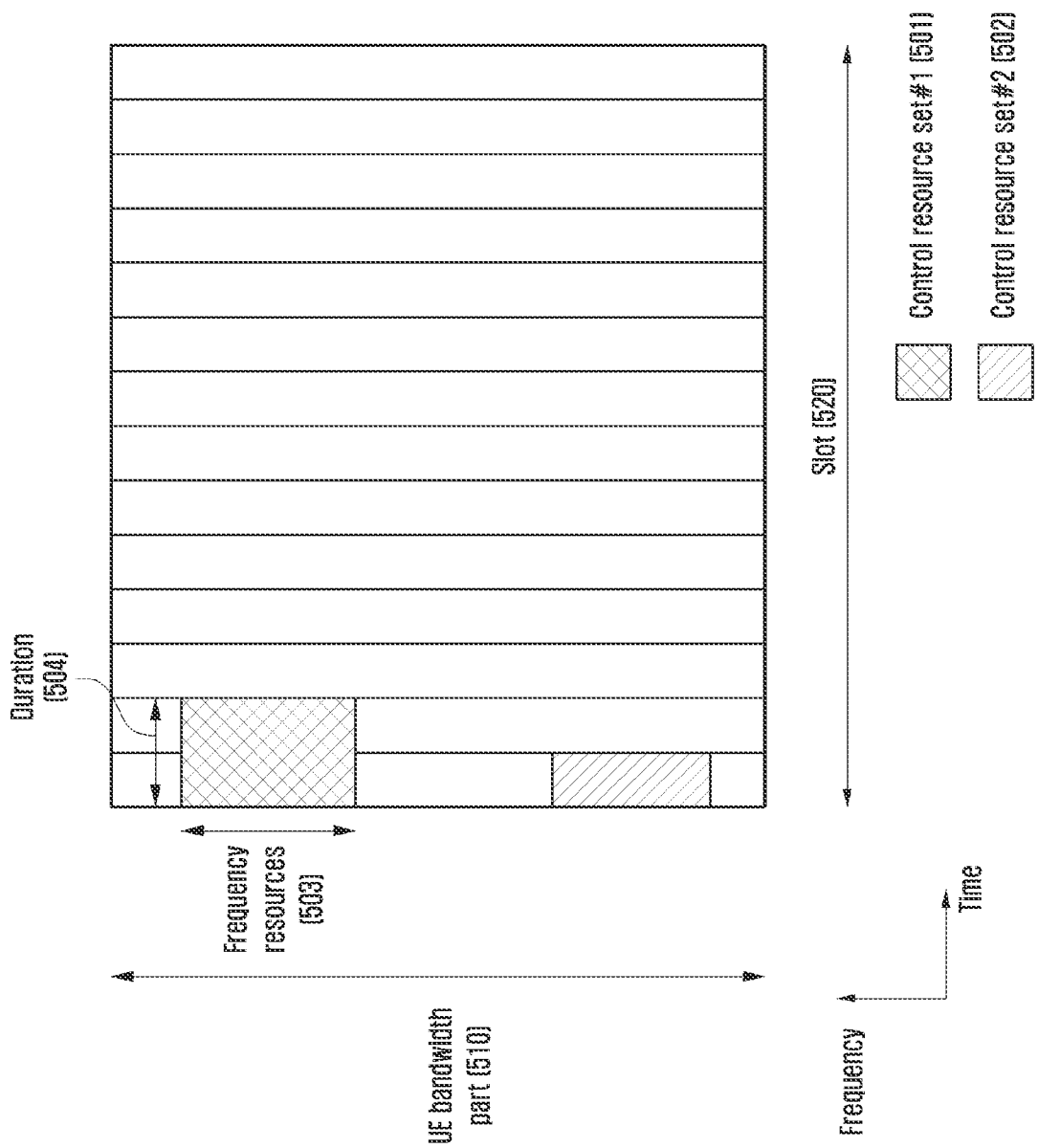

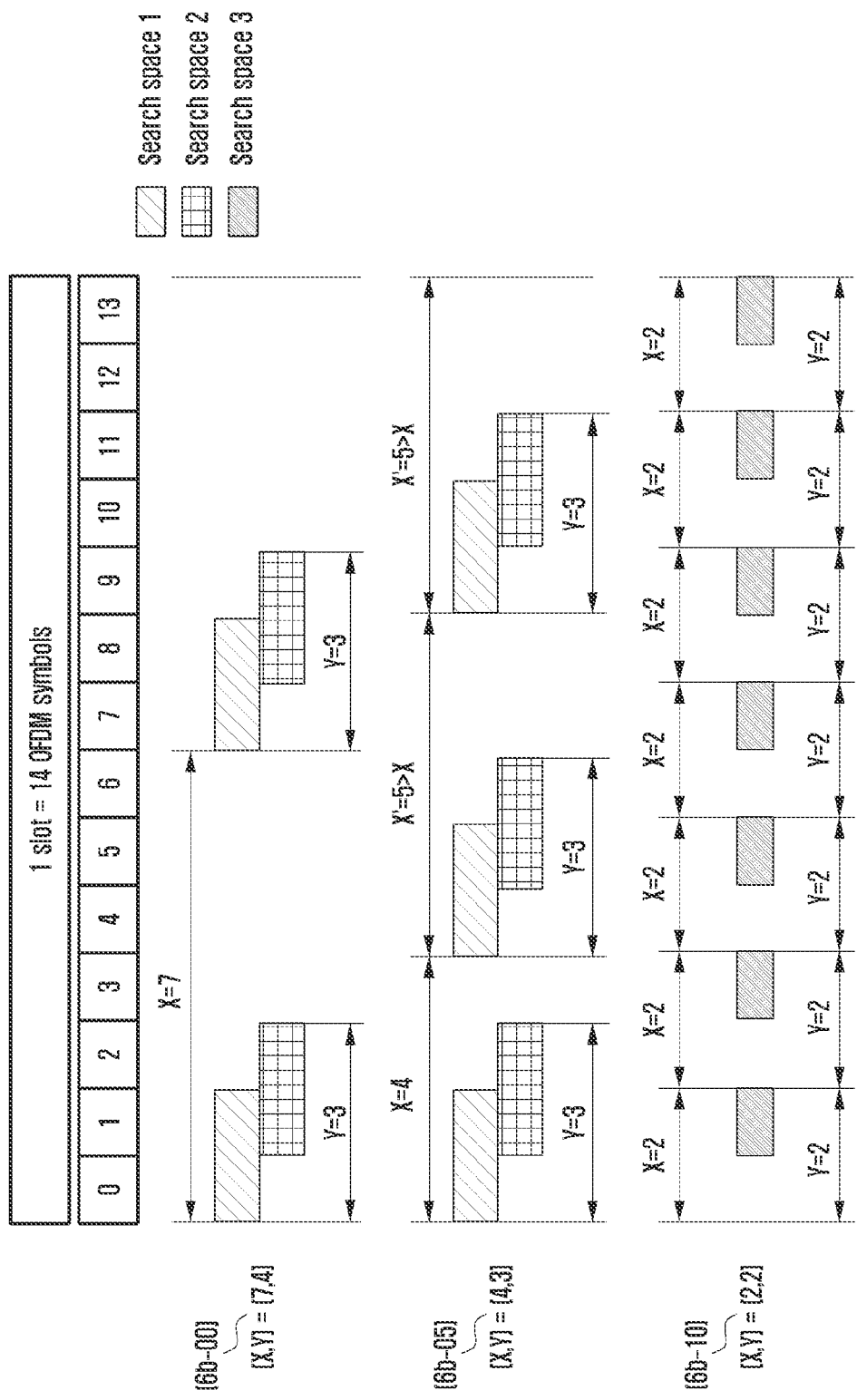

METHOD AND APPARATUS FOR DETERMINING PROCESSING TIME OF UE IN WIRELESS COMMUNICATION SYSTEM

CROSS-REFERENCE TO RELATED APPLICATION(S)

This application is based on and claims priority under 35 U.S.C. § 119(a) to Korean Patent Application Nos. 10-2020-0187374 and 10-2021-0111842, which were filed in the Korean Intellectual Property Office on Dec. 30, 2020, and Aug. 24, 2021, respectively the entire disclosure of each of which is incorporated by herein reference.

BACKGROUND

1. Field

The disclosure relates generally to operations of a user equipment (LIE) and a base station (BS) in a wireless communication system, and more particularly to a method of determining a processing time in a wireless communication system and an apparatus capable of performing the same.

2. Description Of Related Art

To meet the increasing demand for wireless data traffic since deployment of 4th Generation (4G) communication systems, efforts have been made to develop an improved $5^{th}$-Generation (5G) or pre-5G communication system. The 5G or pre-5G communication system may also be called a 'beyond 4G network' or a 'post long-term evolution (LTE) system.'

A 5G communication system is considered to be implemented in higher frequency (millimeter (mm) Wave) bands, e.g., 60 gigahertz (GHz) bands, to accomplish higher data rates. To decrease propagation loss of the radio waves and increase the transmission distance, beamforming, massive multiple-input multiple-output (MIMO), full dimensional MIMO (FD-MIMO), array antennas, analog beam forming, and large scale antenna techniques are being discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving networks, cooperative communication, coordinated multi-points (CoMP), reception-end interference cancellation, etc. hybrid frequency shift keying (FSK) and quadrature amplitude modulation (QAM) (FQAM) and sliding window superposition coding (SWSC) are being developed for advanced coding modulation (ACM), and filter bank multi carrier (FBMC), non-orthogonal multiple access (NOMA), and sparse code multiple access (SCMA) are also being developed as advanced access technologies.

The Internet is evolving to the Internet of things (IoT) where distributed entities, i.e., things, exchange and process information without human intervention. The Internet of everything (IoE), which is a combination of the IoT technology and big data processing technology through connection with a cloud server, has also emerged. As technology elements, such as "sensing technology," "wired/wireless communication and network infrastructure," "service interface technology," and "Security technology" have been demanded for IoT implementation, a sensor network, machine-to-machine (M2M) communication, machine type communication (MTC), etc., have been recently researched. Such an IoT environment may provide intelligent Internet technology services by collecting and analyzing data generated among connected things. IoT may be applied to a variety of fields including smart homes, smart buildings, smart cities, smart or connected cars, smart grids, health care, smart appliances, and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, NEMO, and array antennas. Application of a cloud RAN as the above-described Big Data processing technology may also be considered to be as an example of a convergence between 5G technology and IoT technology.

With the advance of wireless communication systems as described above, various services can be provided. Accordingly, there is a need for schemes to effectively provide these services.

SUMMARY

An aspect of the disclosure is to provide an apparatus and a method capable of effectively providing a service in a wireless communication system.

Another aspect of the disclosure is to provide a method of determining a processing time of a UE in consideration of repetitive transmission of a downlink control channel (e.g., a physical downlink control channel (PDCCH)).

In accordance with an aspect of the disclosure, a method performed by a terminal in a communication system is provided. The method includes identifying a first PDCCH and a second PDCCH that are associated with PDCCH repetitive transmissions; identifying a physical downlink shared channel (PDSCH) scheduled by at least one of the first PDCCH or the second PDCCH; identifying a largest $d_{1,1}$ value from among a first $d_{1,1}$ value associated with the first PDCCH and the PDSCH, and a second $d_{1,1}$ value associated with the second PDCCH and the PDSCH; identifying a PDSCH processing time based on the largest $d_{1,1}$ value; and transmitting, to a base station, hybrid automatic repeat request (HARQ)-acknowledgement (ACK) information for the PDSCH based on the PDSCH processing time.

In accordance with another aspect of the disclosure, a method performed by a terminal in a communication system is provided. The method includes identifying a first PDCCH and a second PDCCH that are associated with PDCCH repetitive transmissions, wherein a physical uplink shared channel (PUSCH) is scheduled by at least one of the first PDCCH or the second PDCCH; identifying a last symbol of a PDCCH that ends later in time from among the first PDCCH and the second PDCCH; identifying a PDSCH preparation time based on the last symbol; and transmitting, to a base station, the PUSCH based on the PUSCH preparation time.

In accordance with another aspect of the disclosure, a method performed by a base station in a communication system is provided. The method includes transmitting, to a terminal, a first PDCCH and a second PDCCH that are associated with PDCCH repetitive transmissions; transmitting, to the terminal, a PDSCH scheduled by at least one of the first PDCCH or the second PDCCH; and receiving, from the terminal, HARQ-ACK information for the PDSCH, wherein the HARQ-ACK information is received based on a PDSCH processing time, the PDSCH processing time is based on a largest $d_{1,1}$ value for the PDSCH processing time, and the largest $d_{1,1}$ value is from among a first dii value associated with the first PDCCH and the PDSCH, and a second $d_{1,1}$ value associated with the second PDCCH and the PDSCH.

In accordance with another aspect of the disclosure, a method performed by a base station in a communication system is provided. The method includes transmitting, to the terminal, a first PDCCH and a second PDCCH that are associated with PDCCH repetitive transmissions; and receiving, from the terminal, a PUSCH scheduled by at least one of the first PDCCH or the second PDCCH, wherein the PUSCH is received based on a PUSCH preparation time, and the PUSCH preparation time is based on a last symbol of a PDCCH candidate that ends later in time from among the first PDCCH and the second PDCCH.

In accordance with another aspect of the disclosure, a terminal is provided for use in a communication system. The terminal includes a transceiver; and a controller configured to identify a first PDCCH and a second PDCCH that are associated with PDCCH repetitive transmissions, identify a PDSCH scheduled by at least one of the first PDCCH or the second PDCCH, identify a largest $d_{1,1}$ value from among a first $d_{1,1}$ value associated with the first PDCCH and the PDSCH, and a second $d_{1,1}$ value associated with the second PDCCH and the PDSCH, identify a PDSCH processing time based on the largest $d_{1,1}$ value, and transmit, to a base station, HARQ-ACK information for the PDSCH based on the PDSCH processing time.

In accordance with another aspect of the disclosure, a terminal is provided for use in a communication system. The terminal includes a transceiver; and a controller configured to identify a first PDCCH and a second PDCCH that are associated with PDCCH repetitive transmissions, wherein a PUSCH is scheduled by at least one of the first PDCCH or the second PDCCH, identify a last symbol of a PDCCH that ends later in time from among the first PDCCH and the second PDCCH, identify a PUSCH preparation time based on the last symbol, and transmit, to a base station, the PUSCH based on the PUSCH preparation time.

In accordance with another aspect of the disclosure, a base station is provided for use in a communication system. The base station includes a transceiver; and a controller configured to transmit, to a terminal, a first PDCCH and a second PDCCH that are associated with PDCCH repetitive transmissions, transmit, to the terminal, a PDSCH scheduled by at least one of the first PDCCH or the second PDCCH, and receive, from the terminal, HARQ-ACK information for the PDSCH, wherein the HARQ-ACK information is received based on a PDSCH processing time, the PDSCH processing time is based on a largest $d_{1,1}$ value for the PDSCH processing time, and the largest $d_{1,1}$ value is from among a first $d_{1,1}$ value associated with the first PDCCH and the PDSCH, and a second $d_{1,1}$ value associated with the second PDCCH and the PDSCH.

In accordance with another aspect of the disclosure, a base station is provided for use in a communication system is provided. The base station includes a transceiver; and a controller configured to transmit, to the terminal, a first PDCCH and a second PDCCH that are associated with PDCCH repetitive transmissions, and receive, from the terminal, a PUSCH scheduled by at least one of the first PDCCH or the second PDCCH, wherein the PUSCH is received based on a PUSCH preparation time, and the PUSCH preparation time is based on a last symbol of a PDCCH candidate that ends later in time from among the first PDCCH and the second PDCCH.

BRIEF DESCRIPTION OF THE DRAWINGS

The above and other objects, features and advantages of certain embodiments of the disclosure will be more apparent from the following detailed description taken in conjunction with the accompanying drawings, in which:

FIG. 5 illustrates a control resource set (CORESET) in which a downlink control channel is transmitted in a wireless communication system according to an embodiment;

FIG. 6B illustrates a UE having a plurality of PDCCH monitoring locations within a slot through a span in a wireless communication system according to an embodiment;

DETAILED DESCRIPTION

Figure 1:
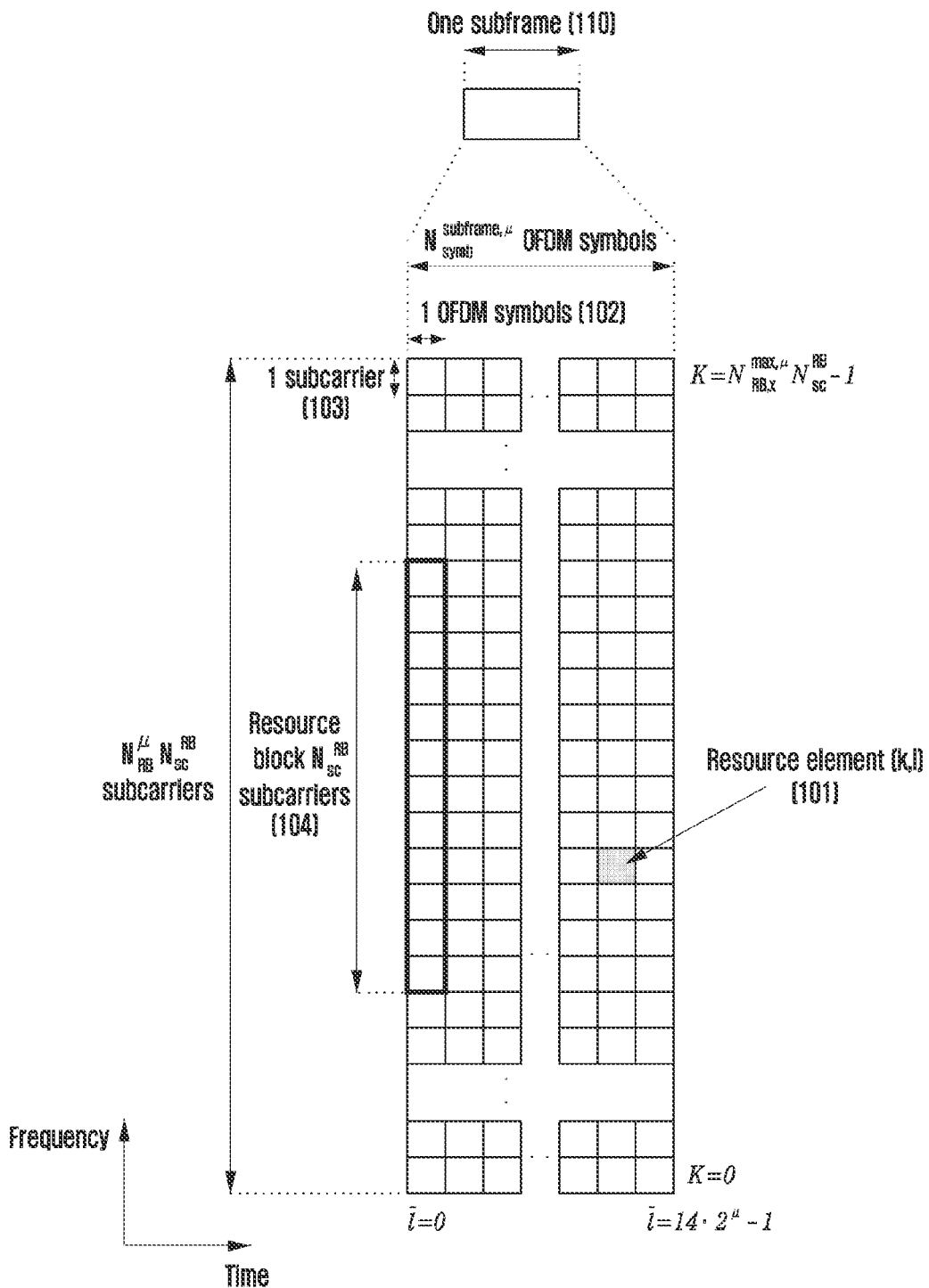
FIG. 1 illustrates a time-frequency domain in a wireless communication system according to an embodiment.

Hereinafter, various embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For similar reasoning, in the accompanying drawings, some elements may be exaggerated, omitted, or schematically illustrated. Further, the size of each element does not completely reflect the actual size. In the drawings, identical or corresponding elements are provided with identical reference numerals.

Some of the advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely describe the disclosure and inform those skilled in the art of the scope of the disclosure, and the disclosure is defined only by the scope of the appended claims.

The terms which will be described below are terms defined in consideration of the functions in the disclosure, and may be different according to users, intentions of the users, or customs. Therefore, the definitions of the terms should be made based on the contents throughout the specification.

In the following description, a BS is an entity that allocates resources to terminals, and may include at least one of a gNode B, ara eNode B, a Node B, a wireless access unit, a BS controller (BSC), and a node on a network. A terminal may include a UE, a mobile station (MS), a cellular phone, a smartphone, a computer, or a multimedia system capable of performing communication functions.

In the disclosure, a downlink refers to a radio link via which a BS transmits a signal to a terminal, and a uplink refers to a radio link via which a terminal transmits a signal to a BS. Further, although the following description may be directed to an UE or LTE-advanced (LTE-A) system by way of example, embodiments of the disclosure may also be applied to other communication systems having similar technical backgrounds or channel types. Examples of other communication systems may include 5G mobile communication technologies developed beyond LTE-A (e.g., new radio (NR)), and in the following description, "5G" may be a concept that covers exiting LTE, LTE-A, and other similar services. In addition, based on determinations by those skilled in the art, the disclosure may be applied to other communication systems through some modifications without significantly departing from the scope of the disclosure.

Herein, each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" may refer to a software element or a hardware element, such as a field programmable gate array (FPGA) or an application specific integrated circuit (ASIC), which performs a predetermined function. However, a "unit" does not always have a meaning limited to software or hardware. A "unit" may be constructed either to be stored in an addressable storage medium or to execute one or more processors. Therefore, the term "unit" may include software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by a "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, a "unit" may include one or more processors.

A wireless communication system has developed into a broadband wireless communication system that provides a high-speed and high-quality packet data service according to communication standards such as high-speed packet access (HSPA) of the $3^{rd}$ generation partnership project (3GPP), LTE or evolved universal terrestrial radio access (E-UTRA), LTE-A, LTE-Pro, high rate packet data (FIRM) of 3GPP2, ultra mobile broadband (UMB), and 802.16e of the Institute of Electrical and Electronics Engineers (IEEE) beyond the initially provided voice-based service.

An LTE system, which is a representative example of the broadband wireless communication system, employs an orthogonal frequency division multiplexing (OFDM) scheme for a downlink, and employs a single carrier frequency division multiple access (SC-FDMA) scheme for an uplink. The uplink is a radio link through which a UE (or an MS) transmits data or a control signal to a BS (or an eNode B), and the downlink is a radio link through which the BS transmits data or a control signal to the UE. In multiple access schemes as described above, time-frequency resources for carrying data or control information are allocated and operated in a manner to prevent overlapping of the resources, i.e., to establish the orthogonality, between users, in order to identify data or control information of each user.

A post-LTE communication system, e.g., a 5G communication system, should be able to freely reflect various requirements of a user and a service provider, and thus should support services that satisfy the various requirements. Services considered for the 5G communication system include enhanced mobile broadband (eMBB), massive MTC (mMTC), and ultra reliability low latency communication (URLLC).

The eMBB is intended to provide an improved data transmission rate that surpasses the data transmission speed supported by conventional LTE, LTE-A, or LTE-Pro. For example, in the 5G communication system, the eMBB should provide a peak downlink data rate of 20 Gbps and a peak uplink data rate of 10 Gbps from the viewpoint of one BS. Further, the 5G communication system should provide the peak data rate and also an increased user-perceived data rate.

In order to satisfy such requirements, improvement of various transmission/reception technologies, including a further improved MIMO transmission technology, is needed. Further, while the current LTE system uses transmission bandwidths from a bandwidth of 2 GHz to a maximum bandwidth of 20 MHz to transmit signals, the 5G communication system uses a frequency bandwidth wider than 20 MHz in frequency bands of 3 to 6 GHz or higher than or equal to 6 GHz, whereby the data transmission rate required by the 5G communication system can be satisfied.

To support an application service such as the IoT, mMTC is considered in the 5G communication system. The mMTC should support access of many UEs within a cell, improve coverage of the UEs, increase a battery lifetime, and reduce the costs of the UEs in order to efficiently provide IoT. IoT is attached to various sensors and devices to provide communication, and thus should support a large number of UEs (e.g., 1,000,000 UEs/km$^2$) within the cell. Since a UE supporting mMTC is highly likely to be located in a shaded area, such as a basement of a building, which a cell cannot cover due to service characteristics, mMTC may require wider coverage than other services provided by the 5G communication system.

A UE supporting mMTC should also be produced at low cost. Further, as it is often difficult to frequently exchange a battery of a UE supporting mMTC, a very long battery lifetime, e.g., 10 to 15 years, may also be required.

URLLC is a cellular-based wireless communication service used for a particular (mission-critical) purpose. For example, services used for remote control of robots or machinery, industrial automation, unmanned aerial vehicles, remote health care, and emergency alerts may be considered. Accordingly, communication provided by the URLLC should provide very low latency and very high reliability. Services supporting the URLLC should satisfy a radio access delay time (e.g., an air interface latency) shorter than 0.5 milliseconds and also have a requirement of a packet error rate less than or equal to 10$^{-5}$. Accordingly, for services supporting URLLC, the 5G system should provide a transmit time interval (TTI) smaller than that of other systems and also has a design requirement of allocating a wide array of resources in a frequency band in order to guarantee reliability of a communication link.

eMBB, URLLC, and mMTC may also be multiplexed and transmitted in one system. In order to meet the different requirements of the respective services, however, different transmission/reception schemes and transmission/reception parameters may be used for the services. Of course, 5G is not limited to the above-described three services.

NR Time-Frequency Resources

FIG. 1 illustrates a time-frequency domain wireless communication system according to an embodiment.

Referring to FIG. 1, a horizontal axis indicates a time domain and a vertical axis indicates a frequency domain. The basic unit of resources in the time and frequency domain is a resource element (RE) 101 and may be defined as 1 OFDM symbol 102 in the time axis and 1 subcarrier 103 in the frequency axis. In the frequency domain, $N_{SC}^{RB}$ (e.g., 12) successive REs may correspond to one resource block (RB) 104.

Figure 2:
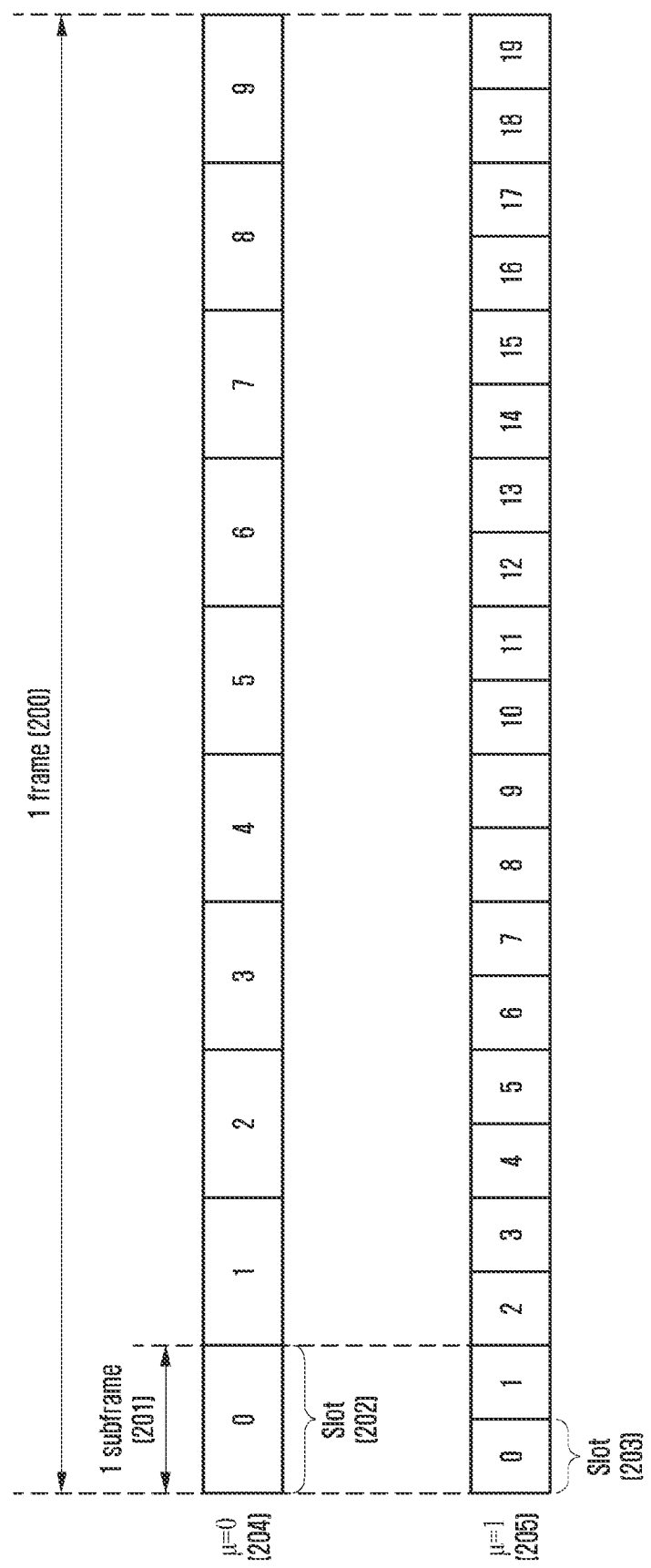
FIG. 2 illustrates frame; subframe, and slot structures in a wireless communication system according to an embodiment.

FIG. 2 illustrates frame, subframe, and slot structures in a wireless communication system according to an embodiment.

Referring to FIG. 2, a frame 200 may be defined as 10 ms, a subframe 201 may be defined as 1 ms, and accordingly one frame 200 may include a total of 10 subframes 201. A slot 202 or 203 may be defined as 14 OFDM symbols (i.e., the number symbols $N_{symb}^{slot}$) per slot=14). The subframe 201 may include one slot 202 or a plurality of slots 203, and the number of slots 202 or 203 per subframe 201 may vary depending on a configuration value μ 204 or 205 for SCS. FIG. 2 illustrates examples in which the SCS configuration value μ=0 204 and the SCS configuration value μ=1 205. The subframe 201 may include one slot 202 in the case of μ=$_0$ 204, and 1 subframe 201 may include 2 slots 203 in the case of μ=1 205. That is, the number ($N_{slot}^{subframe,μ}$) of slots per subframe may vary depending on the configuration value (μ) for SCS, and accordingly the number ($N_{slot}^{frame,μ}$) of slots per frame may vary. The number ($N_{slot}^{subframe,μ}$) and the number ($N_{slot}^{frame,μ}$) according to the SCS configuration value (μ) may be defined as shown in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

BWP

Figure 3:
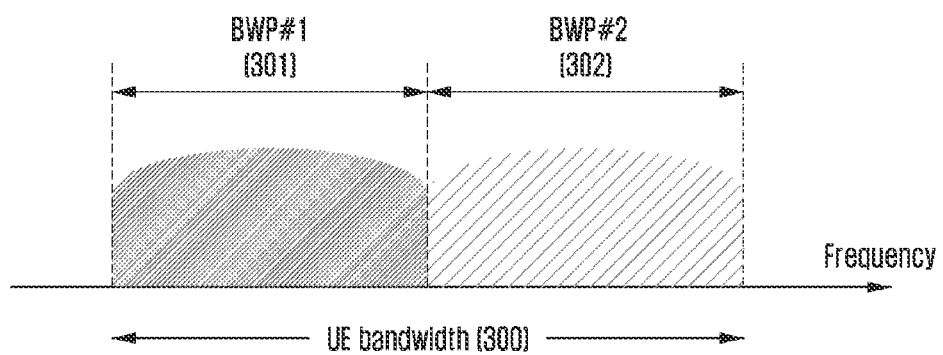
FIG. 3 illustrates a bandwidth part (BWP) in a wireless communication system according to an embodiment.

FIG. 3 illustrates a BWP in a wireless communication system according to an embodiment.

Referring to FIG. 3, a UE bandwidth 300 is configured as two BWPs; i.e., BWP #1 31 and BWP #2 302. The BS may configure one or a plurality of BWPs in the UE, and information as shown in Table 2 may be configured to each BWP.

TABLE 2

| BWP ::= | SEQUENCE { |
|---|---|
| bwp-Id | BWP-Id, |
| (bandwidth part identifier) | |
| locationAndBandwidth | INTEGER (1..65536), |
| (bandwidth part location) | |
| subcarrierSpacing | ENUMERATED {n0, n1, n2, n3, n4, n5}, |
| (subcarrier spacing) | |
| cyclicPrefix | ENUMERATED { extended } |
| (cyclic prefix) | |
| } | |

Of course, the disclosure is not limited to the example of Table 2 and FIG. 3, and various parameters related to a BWP as well as the configuration information may be configured in the UE. The information may be transmitted from to the UE by the BS through higher-layer signaling, e.g., radio resource control (RRC) signaling. Among one or a plurality of configured BWPs, at least one BWP may be activated. Information indicating whether to activate the configured BWPs may be semi-statically transferred from the BS to the UE through RRC signaling or may be dynamically transferred through DCI.

The UE, before an RRC connection, may receive a configuration of an initial BWP for initial access from the BS through a master information block (MIB). More specifically, the UE may receive configuration information for a CORESET and a search space in which a PDCCH for receiving system information remaining system information (RMSI) or system information block 1 (SIB1)) for initial access through the MIB can be transmitted in an initial access step. The CORESET and the search space configured as the MIB may be considered as an identity (ID) 0. The BS may inform the UE of configuration information such as frequency allocation information for CORESET #0, time allocation information, numerology, etc., through the MIB. Further, the BS may inform the UE of configuration information for a monitoring period and an occasion of CORESET #0, i.e., configuration information for search space #0, through the MIB. The UE may consider a frequency region configured as CORESET #0 acquired from the MIB as an initial BWP for initial access. At this time, the ID of the initial BWP may be considered as 0.

The configuration for the BWP supported ley the wireless communication system (e.g., a 5G system or an NR system) according to an embodiment of the disclosure may be used for various purposes.

When a bandwidth supported by the UE is narrower than a system bandwidth, it may be supported through the BWP configuration. For example, the BS may configure a frequency location (i.e., configuration information 2) of the BWP in the UE, and thus, the UE may transmit and receive data at a specific frequency location within the system bandwidth.

Further, in order to support different numerologies, the BS may configure a plurality of BWPs in the UE. For example, in order to support UE performing data transmission and reception using both SCS of 15 kHz and SCS of 30 kHz, two BWPs may be configured as SCSs of 15 kHz and 30 kHz, respectively. Different BWPs may be frequency division-multiplexed, and when data is to be transmitted and received at specific SCS, BWPs configured at the corresponding SCS may be activated.

In order to reduce power consumption of the UE, the BS may configure BWPs having different sizes of bandwidths in the UE. For example, when the UE supports a very large bandwidth, e.g., 100 MHz, but always transmits and receives data through the bandwidth, very high power consumption may be generated. Particularly, monitoring an unnecessary downlink control channel through a large bandwidth of 100 MHz while there is no traffic is very inefficient from the aspect of power consumption. In order to reduce power consumption of the UE, the BS may configure a BWP having a relatively narrow bandwidth, e.g., a bandwidth of 200 MHz. The UE may perform a monitoring operation in the BWP of 200 MHz in while there is no traffic, and if data is generated, may transmit and receive data through the BWP of 100 MHz according to an instruction from the BS.

In a method of configuring the BWP, a UE, before the RRC connection, may receive configuration information for an initial BWP through an MIB in an initial access step. More specifically, the UE may receive a configuration of a CORESET for a downlink control channel in which DCI for scheduling an SIB can be transmitted from an MIB of a physical broadcast channel (PBCH). A bandwidth of the CORESET configured as the MIB may be considered as an initial BWP, and the UE may receive a PDSCH, in which the SIB is transmitted, through the configured initial BMP. The initial BWP may be used for reception of the SIB and also other system information (OSI), paging, or random access.

BWP Change

When one or more BWPs are configured in the UE, the BS may indicate a change (e.g., switching or transition) in the BWPs to the UE through a BWP indicator field within the DCI. For example, referring again to FIG. 3, when a currently activated BWP of the UE is BWP #1 301, the BS may indicate BWP #2 302 to the UE through a BWP indicator within DCI and the UE may change to BWP #2 302 as indicated by the received BWP indicator within the DCI.

Since the DCI based BWP change may be indicated by the DCI for scheduling the PDSCH or the PUSCH, the UE should be able to receive or transmit the PDSCH or the PUSCH scheduled by the corresponding DCI in the changed BWP without any difficulty; if the UE receives a BWP change request. To this end, the standard has defined requirements for a delay time ($T_{BWP}$) required for the BWP change, e.g., as shown in Table 3.

TABLE 3

| | | BWP switch delay $T_{BWP}$ (slots) | |
|---|---|---|---|
| μ | NR Slot length (ms) | Type 1[Note 1] | Type 2[Note 1] |
| 0 | 1 | 1 | 3 |
| 1 | 0.5 | 2 | 5 |

TABLE 3-continued

| μ | NR Slot length (ms) | BWP switch delay $T_{BWP}$ (slots) | |
| --- | --- | --- | --- |
| | | Type 1[Note 1] | Type 2[Note 1] |
| 2 | 0.25 | 3 | 9 |
| 3 | 0.125 | 6 | 18 |

Note 1
Depends on UE capability.
Note 2:
If the BWP switch involves changing of SCS, the BWP switch delay is determined by the larger one between the SCS before BWP switch and the SCS after BWP switch.

The requirements for the BWP change delay time may support type 1 or type 2 according to a UE capability. The UE may report a supportable BWP delay time type to the BS.

When the UE receives DCI including a BWP change indicator in slot n according to the requirements for the BWP change delay time, the UE may complete the change to a new BWP indicated by the BWP change indicator at a time no later than slot n+$T_{BWP}$ and then transmit and/or receive a data channel scheduled by the corresponding DCI in the changed new BWP.

When the BS desires to schedule a data channel in the new BWP, the BS may determine time domain resource allocation for the data channel in consideration of the BWP change delay time ($T_{BWP}$) of the UE. That is, when scheduling the data channel in the new BWP, the BS may schedule the corresponding data channel after the BWP change delay time when determining the time domain resource allocation for the data channel. Accordingly, the UE may not expect that the DCI indicating the BWP change indicates a slot offset ($K_0$ or $K_2$) smaller than the BWP change delay time ($T_{BWP}$).

If the UE receives DCI (e.g., DCI format 1_1 or 0_1) indicating the BWP change, the UE may perform no transmission or reception during a time interval from a third symbol of a slot for receiving the PDCCH including the corresponding DCI to a start point of the slot indicated by the slot offset (K0 or K2) indicated through a time domain resource allocation field within the corresponding DCI. When the UE receives DCI indicating the BWP change in slot n and a slot offset value indicated by the corresponding DCI is K, the UE may perform no transmission or reception from the third symbol of slot n to a symbol before slot n+K (that is, the last symbol of slot n+K−1).

Synchronization Signal (SS)/PBCH Block

SS/PBCH block may be a physical layer channel block including a primary SS (PSS), a secondary SS (SSS), and a PBCH. A more detailed description thereof is provided below.

PSS: is a reference of downlink time/frequency synchronization and provides some pieces of information of a cell ID.

SSS: is a reference of downlink time/frequency synchronization and provides the remaining cell ID information, which the PSS does not provide. In addition, the SSS serves as a reference signal for demodulation of a PBCH.

PBCH: provides system information required for transmitting and receiving a data channel and a control channel by the UE. The system information may include search space-related control information indicating radio resource mapping information of the control channel and scheduling control information for a separate data channel for transmitting system information.

SS/PBCH block: includes a combination of a PSS, an SSS, and a PBCH. One or a plurality of SS/PBCH blocks may be transmitted within a time of 5 ms, and each of the transmitted SS/PBCH blocks may be separated by an index.

The UE may detect the PSS and the SSS in an initial access stage and decode the PBCH. The UE may acquire an MIB from the PBCH and receive a configuration of CORESET #0 (corresponding to a CORESET having CORESET index 0) therefrom. The UE may monitor CORESET #0 based on the assumption that the selected SS/PBCH block and a DMRS transmitted in CORESET #0 are quasi co-located (QCLed). The UE may receive SI through DCI transmitted in CORESET #0. The UE may acquire configuration information related to a random access channel (RACH) for initial access from the received system information. The UE may transmit a physical RACH (PRACH) to the BS in consideration of the selected SS/PBCH block index, and the BS receiving the PRACH may acquire the SS/PBCH block index selected by the UE. The BS may know which block is selected by the UE from among the SS/PBCH blocks and that CORESET #0 related thereto is monitored.

DRX

Figure 4:
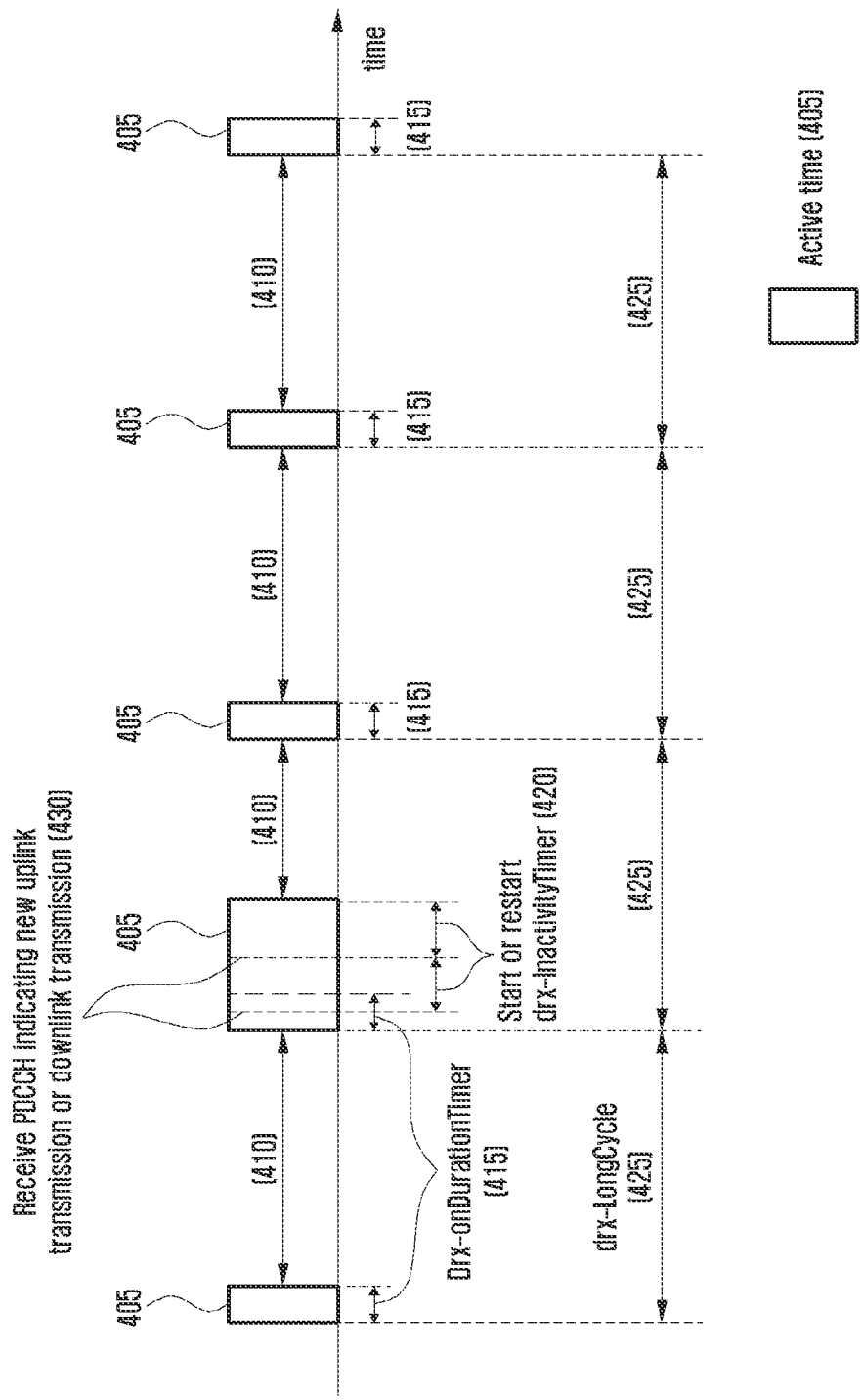
FIG. 4 illustrates a discontinuous reception (DRX) operation in a wireless communication system according to an embodiment.

FIG. 4 illustrates a DRX operation in a wireless communication system according to an embodiment.

DRX is an operation in which a UE using a service discontinuously receives data in an RRC-connected state in which a radio link is established between the BS and the UE. When DRX is applied, the UE may turn on a receiver at a specific time point and monitor a control channel, and when there is no data received for a predetermined period, turn off the receiver to reduce power consumption of the UE. The DRX operation may be controlled by a MAC layer device based on various parameters and a timer.

Referring to FIG. 4, an active time 405 is a time during which a UE wakes up every DRX cycle and monitors a PDCCH. The active time 405 may be defined as follows:

drx-onDurationTimer or drx-InactivityTimer or drx-RetransmissionTimerDL or drx-RetransmissionTimerUL or ra-ContentionResolutionTimer is running; or a Scheduling Request is sent on a physical uplink control channel (PUCCH) and is pending; or a PDCCH indicating a new transmission addressed to a cell-radio network temporary identifier (C-RNTI) of the MAC entity has not been received after successful reception of a random access response (RAR) for a random access preamble not selected by the MAC entity among the contention-based random access preamble;

drx-onDurationTimer, drx-InactivityTimer, drx-RetransmissionTimerDL, drx-RetransmissionTimerUL, ra-ContentionResolutionTimer, etc., are timers of which values are configured by the BS, and have functions configured to monitor a PDCCH by the UE in the state in which a predetermined condition is satisfied.

The drx-onDurationTimer 415 is a parameter for configuring a minimum time during which the UE is awake in a DRX cycle. The drx-InactivityTimer 420 is a parameter for configuring a time during which the UE is additionally awake when a PDCCH indicating new uplink transmission or downlink transmission is received as indicated by reference numeral 430. The drx-RetransmissionTimerDL is a parameter for configuring a maximum time during which the UE is awake in order to receive downlink retransmission in a downlink HARQ procedure. The drx-RetransmissionTimerUL is a parameter for configuring a maximum time during which the UE is awake in order to receive a grant of uplink retransmission in an uplink HARQ procedure. The drx-onDurationTimer, drx-InactivityTimer, drx-RetransmissionTimerDL, and drx-RetransmissionTimerUL may be configured as, e.g., a time, a number of subframes, a number of slots, etc. The ra-ContentionResolutionTimer is a parameter for monitoring a PDCCH in a random access procedure.

An inactive time 410 is a time in which no PDCCH monitoring is performed or a time in which no PDCCH reception is performed during the DRX operation, and the remaining time, except for the active time 405 in the entire time in which the DRX operation is performed. When the PDCCH is not monitored during the active time 405, the UE may enter a sleep or inactive state, thereby reducing power consumption.

The DRX cycle refers to a cycle in which the UE wakes up and monitors a PDCCH. That is, the DRX cycle is a time interval or a cycle of on duration from monitoring of the PDCCH to monitoring of the next PDCCH by the UE. The DRX cycle may be a short DRX cycle or a long DRX cycle. The short DRX cycle may be optionally applied.

The long DRX cycle 425 is a longer cycle among the two DRX cycles configured in the UE. The UE starts the drx-onDurationTimer 415 at a time point at which the long DRX cycle 425 passes after a start point (e.g., a start symbol) of the drx-onDurationTimer 415 while the long DRX cycle operates. In the operation of the long DRX cycle 425, the UE may start the drx-onDurationTimer 415 in a slot after drx-SlotOffset in a subframe that satisfies Equation (1) below. Here, the drx-SlotOffset is a delay before the drx-onDurationTimer 415 starts. The drx-SlotOffset may be configured as a time, a number of slots, etc.

$$[(SFN \times 10) + \text{subframe number}] \bmod (drx\text{-LongCycle}) = drx\text{-StartOfsset} \quad (1)$$

The drx-LongCycleStartOffset and drx-StartOffset may be used to define a subframe for starting the Long DRX cycle 425. The drx-LongCycleStartOffset may be configured as a time, a number of sub-frames, a number of slots, etc.

PDCCH: DCI-Related

In a 5G or NR wireless communication system, scheduling information for UL data (or a physical uplink data channel (e.g., a PUSCH) or downlink data (or physical downlink data channel (e.g., a PDSCH) is transmitted from the BS to the UE through DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field.

The DCI may be transmitted through a PDCCH via a channel coding and modulation process. A cyclic redundancy check (CRC) may be added to a DCI message payload and may be scrambled by an RNTI corresponding to the ID of the UE. Depending on the purpose of the DCI message, e.g., UE-specific data transmission, a power control command, a random access response, etc., different RNTIs may be used. That is, the RNTI may not be explicitly transmitted, but is included in a CRC calculation process to be transmitted. If the DCI message transmitted through the PDCCH is received, the UE may identify the CRC through the allocated RNTI, and may recognize that the corresponding message is transmitted to the UE when the CRC is determined to be correct based on the CRC identification result.

For example, DCI for scheduling a PDSCH for SI may be scrambled by an SI-RNTI. DCI for scheduling a PDSCH for an RAR message may be scrambled by a random access (RA)-RNTI. DCI for scheduling a PDSCH for a paging message may be scrambled by a paging (P)-RNTI. DCI for notifying of a slot format indicator (SFI) may be scrambled by an SFI-RNTI. DCI for notifying of transmit power control (TPC) may be scrambled with a TPC-RNTI. DCI for scheduling a UE-specific PDSCH or PUSCH may be scrambled by a C-RNTI.

DCI format 0_0 may be used for fallback DCI for scheduling a PUSCH, wherein the CRC may be scrambled by a C-RNTI. DCI format 0_0 in which the CRC is scrambled by the C-RNTI may include the following shown in Table 4.

TABLE 4

Identifier for DCI formats - [1] bit
Frequency domain resource assignment -
$[\lceil \log_2(N_{RB}^{UL, BWP} (N_{RB}^{UL, BWP} + 1)/2) \rceil]$ bits
Time domain resource assignment - X bits
Frequency hopping flag - 1 bit.
Modulation and coding scheme - 5 bits
New data indicator - 1 bit
Redundancy version - 2 bits
HARQ process number - 4 bits
Transmit power control (TPC) command for scheduled PUSCH - [2] bits
Uplink (UL)/supplementary UL (SUL) indicator - 0 or 1 bit DCI format 0_1 may be used for non-fallback DCI for scheduling a PUSCH, wherein the CRC may be scrambled by a C-RNTI. DCI format 0_1 in which the CRC is scrambled by the C-RNTI may include the information shown in Table 5.

TABLE 5

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, $\lceil N_{RB}^{ULBWP}/P \rceil$ bits
    For resource allocation type 1, $\lceil \log_2(N_{RB}^{ULBWP}(N_{RB}^{ULBWP} + 1)/2) \rceil$ bits
Time domain resource assignment - 1, 2, 3, or 4 bits
Virtual resource block (VRB)-to-physical resource block (PRB) mapping
- 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-codebooks;
    0 bit otherwise.
TPC command for scheduled PUSCH - 2 bits
Sounding reference signal (SRS) resource indicator $$\left\lceil \log_2 \left( \sum_{k=1}^{L_{max}} \binom{N_{SRS}}{k} \right) \right\rceil \text{ or } \lceil \log_2(N_{SRS}) \rceil \text{ bits}$$

$$\left\lceil \log_2 \left( \sum_{k=1}^{L_{max}} \binom{N_{SRS}}{k} \right) \right\rceil \text{ bits for non-codebook based PUSCH transmission;}$$

TABLE 5-continued

⌈log₂(N_{SRS})⌉ bits for codebook based PUSCH transmission.
Precoding information and number of layers -up to 6 bits
Antenna ports - up to 5 bits
SRS request - 2 bits
Channel state information (CSI) request - 0, 1, 2, 3, 4, 5, or 6 bits
Code block group (CBG) transmission information - 0, 2, 4, 6, or 8 bits
Phase tracking reference signal (PTRS) – DMRS association - 0 or 2 bits.
beta_offset indicator - 0 or 2 bits
DMRS sequence initialization - 0 or 1 bit DCI format 1_0 may be used for fallback DCI for scheduling a PDSCH, wherein the CRC may be scrambled by a C-RNTI. DCI format 1_0 in which the CRC is scrambled by the C-RNTI may include the information in Table 6.

TABLE 6

Identifier for DCI formats - [1] bit
Frequency domain resource assignment -
[⌈log2($N_{RB}^{DL, BWP}$ ($N_{RB}^{DL, BWP}$ + 1)/2)⌉] bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits DCI format 1_1 may be used for non-fallback DCI for scheduling a PDSCH, wherein the CRC may be scrambled by a C-RNTI. DCI format 1_1 in which the CRC is scrambled by the C-RNTI may include the information in Table 7.

TABLE 7

Carrier indicator - 0 or 3 bits
Identifier for DCI formats - [1] bits
BWP indicator - 0, 1 or 2 bits
Frequency domain resource assignment
For resource allocation type 0, ⌈$N_{RB}^{DL, BWP}$/P⌉ bits
For resource allocation type 1,
⌈log₂ ($N_{RB}^{DL, BWP}$ ($N_{RB}^{DL, BWP}$ + 1)/2)⌉ bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
Physical resource block (PRB) bundling size indicator - 0 or 1 bit
Rate matching indicator - 0, 1, or 2 bits
Zero power (ZP) channel state information (CSI)-reference signal (RS) trigger -
0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
TCI - 0 or 3 bits
SRS request - 2 bits
CBG transmission information - 0, 2, 4, 6, or 8 bits TABLE 7-continued Code block group (CBG) flushing out information - 0 or 1 bit
DMRS sequence initialization - 1 bit PDCCH: CORESET, REG, CCE, Search Space FIG. 5 illustrates a CORESET in which a downlink control channel is transmitted in a wireless communication system according to an embodiment.

Referring to FIG. 5, a UE BWP 510 is configured in the frequency axis and two CORESETs (CORESET #1 501 and CORESET #2 502) are configured within 1 slot 520 in the time axis. The CORESETs 501 and 502 may be configured in specific frequency resources 503 within a total UE BWP 510 in the frequency axis. The CORESET may be configured as one or a plurality of OFDM symbols in the time axis, which may be defined as a CORESET duration 504. Referring to the example illustrated in FIG. 5, CORESET #1 501 may be configured as a CORESET duration of 2 symbols, and CORESET #2 502 may be configured as a CORESET duration of 1 symbol.

The CORESETs in the wireless communication may be configured through higher-layer signaling (e.g., system information, an MIB, or RRC signaling) in the UE by the BS. Configuring the CORESET in the UE may include providing information such as a CORESET ID, a frequency location of the CORESET, and a symbol length of the CORESET. For example, the information in Table 8 may be provided.

TABLE 8

ControlResourceSet ::=          SEQUENCE {
    -- Corresponds to L1 parameter 'CORESET-ID'
    controlResourceSetId          ControlResourceSetId,
    (control resource set identity)
    frequencyDomainResources      BIT STRING (SIZE (45)),
    (frequency axis resource allocation information)
    duration                      INTEGER
(1..maxCoReSetDuration),
    (time axis resource allocation information)
    cce-REG-MappingType
        CHOICE {
    (CCE-to-REG mapping scheme)
        interleaved
        SEQUENCE {
            reg-BundleSize
            ENUMERATED {n2, n3, n6},
            (REG bundle size)
                precoderGranularity
            ENUMERATED {sameAsREG-bundle, allContiguousRBs},
                interleaverSize
            ENUMERATED {n2, n3, n6}
                (interleaver size)
                shiftIndex
        INTEGER(0..maxNrofPhysicalResourceBlocks-1)
                OPTIONAL
            (interleaver shift)
        },
        nonInterleaved                NULL
    },
    tci-StatesPDCCH
        SEQUENCE(SIZE (1..maxNrofTCI-StatesPDCCH)) OF TCI-StateId
            OPTIONAL,
    (QCL configuration information)
        tci-PresentInDCI              ENUMERATED
{enabled}
            OPTIONAL, -- Need S
}

In Table 8, tci-StatesPDCCH (referred to as a TCI state) configuration information may include information on one or a plurality of SS/PBCH block indexes or CSI-RS indexes having a QCL relationship with a DMRS transmitted in the corresponding CORESET.

Figure 6A:
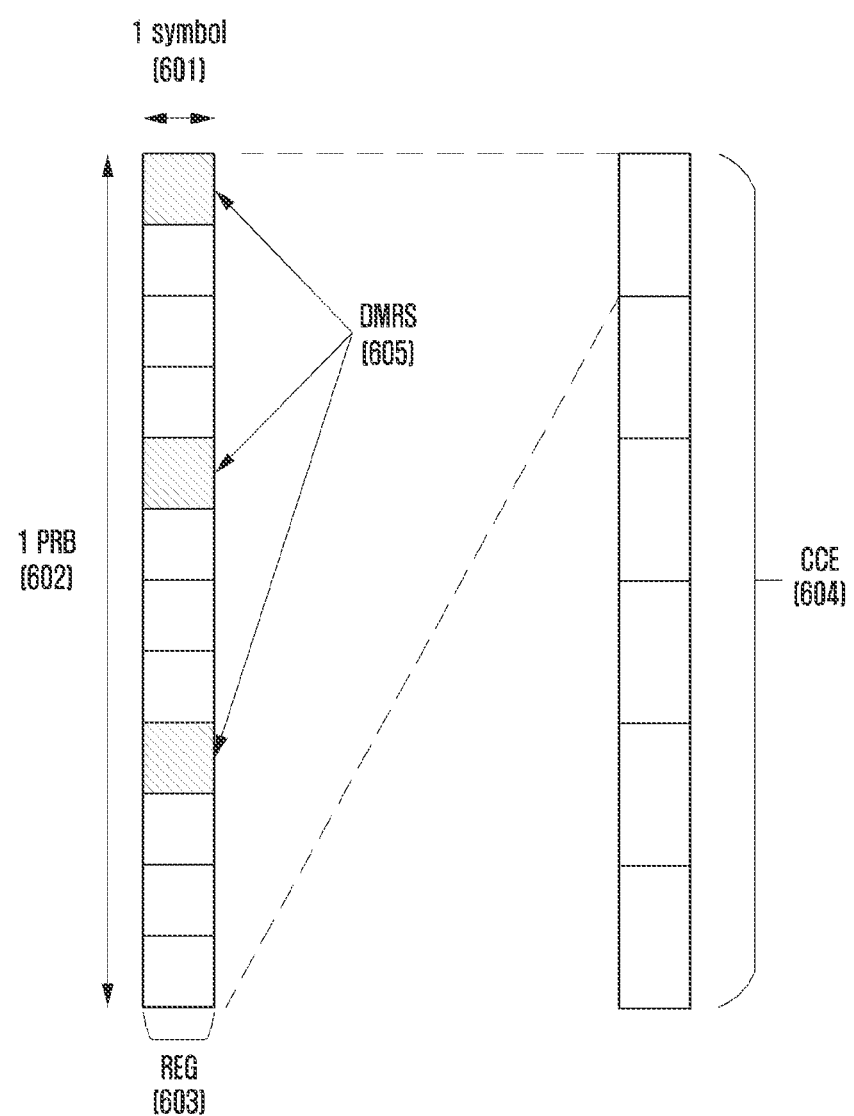
FIG. 6A illustrates a downlink control channel in a wireless communication system according to an embodiment.

FIG. 6A illustrates a downlink control channel in a wireless communication system according to an embodiment. More specifically, FIG. 6A illustrates an example of a basic unit of time and frequency resources included in a downlink control channel that can be used in a wireless communication system (e.g., a 5G or NR system) according to an embodiment.

Referring to FIG. 6A, the basic unit of time and frequency resources included in the control channel may be a RE group (REG) 603, which may be defined as 1 OFDM symbol 601 in the time axis and 1 PRB 602 in the frequency axis, i.e., as 12 subcarriers. The BS may configure a downlink control channel allocation unit by concatenating the REGs 603.

When the basic unit for allocation of the downlink control channel in the wireless communication system is a CCE 604, 1 CCE 604 may include a plurality of REGs 603. The REG 603 may include 12 REs and, when 1 CCE 604 includes 6 REGs 603, 1 CCE 604 may include 72 REs. When a downlink CORESET is configured, the corresponding area may include a plurality of CCEs 604, and a specific downlink control channel may be mapped to one or a plurality of CCEs 604 according to an aggregation level (AL) within the CORESET and then transmitted. CCEs 604 within the CORESET may be distinguished by numbers and the numbers of the CCEs 604 may be assigned according to a logical mapping scheme.

The REG 603 may include all of the REs to which the DCI is mapped and the areas to which DMRSs 605, which are reference signals for decoding the REs, are mapped. As illustrated in FIG. 6A, 3 DMRSs 605 may be transmitted in 1 REG 603. The number of CCEs required to transmit the PDCCH may be 1, 2, 4, 8, or 16 according to the AL, and the different number of CCEs may be used to implement link adaptation of the downlink control channel. For example, if AL=L, one downlink control channel may be transmitted through L CCEs. The UE should detect a signal in the state in which the UE does not know information on the downlink control channel, and a search space indicating a set of CCEs is defined to perform blind decoding in a wireless communication system. The search space is a set of downlink control channel candidates including CCEs for which the UE should attempt decoding at the given AL, and there are several ALs at which one set of CCEs is configured by 1, 2, 4, 8, and 16 CCEs, so that the UE may have a plurality of search spaces. A search space set may be defined as a set of search spaces at all the configured ALs.

The search space may be classified into a common search space (CSS) and a UE-specific search space. UEs in a predetermined group or all UEs may search for a CSS of the PDCCH in order to receive cell-common control information such as dynamic scheduling for system information or paging messages. For example, PDSCH scheduling allocation information for transmission of an SIB including information on a service provider of a cell may be received by searching for (or monitoring for) a CSS of the PDCCH. In the case of the CSS, UEs in a predetermined group or all UEs should receive the PDCCH, so that the common-search space may be defined as a set of pre-arranged CCEs. Scheduling allocation information for the UE-specific PDSCH or PUSCH may be received by searching for a UE-specific search space of the PDCCH. The UE-specific search space may be UE-specifically defined as a UE ID and a function of various system parameters.

A parameter for a search space of a PDCCH in a wireless communication system may be configured in the UE by the BS through higher-layer signaling (e.g., an SIB, an MIB, or RRC signaling). For example, the BS may configure, in the UE, the number of PDCCH candidates at each AL L, a monitoring period of the search space, a monitoring occasion in units of symbols within the slot for the search space, a search space type, i.e., a CSS or a UE-specific search space, a combination of a DCI format and an RNTI to be monitored in the corresponding search space, and a CORESET index for monitoring the search space. For example, the information in Table 9 may be configured.

TABLE 9

```
SearchSpace ::=                                          SEQUENCE {
       -- Identity of the search space. SearchSpaceId = 0 identifies the SearchSpace
    configured via PBCH (MIB) or ServingCellConfigCommon.
           searchSpaceId                                  SearchSpaceId,
           (search space identifier)
           controlResourceSetId                           ControlResourceSetId,
           (control resource set identifier)
           monitoringSlotPeriodicityAndOffset             CHOICE {
           (monitoring slot level period)
               sl1
               NULL,
               sl2
               INTEGER (0..1),
               sl4
               INTEGER (0..3),
               sl5
               INTEGER (0..4),
               sl8
               INTEGER (0..7),
               sl10
               INTEGER (0..9),
               sl16
               INTEGER (0..15),
               sl20
               INTEGER (0..19)
           }
                                                          OPTIONAL,
           duration (monitoring length)                   INTEGER (2..2559)
           monitoringSymbolsWithinSlot                    BIT STRING
       (SIZE (14))
               OPTIONAL,
       (monitoring symbol within slot)
```

TABLE 9-continued

```
    nrofCandidates                              SEQUENCE {
(number of PDCCH candidates at each aggregation level)
        aggregationLevel1
        ENUMERAfED {n0, n1, n2, n3, n4, n5, n6, n8},
        aggregationLevel2
        ENUMERATED {n0, n1, n2, n3, n4, n5, n6, n8},
        aggregationLevel4
        ENUMERATED {n0, n1, n2, n3, n4, n5, n6, n8},
        aggregationLevel8
        ENUMERAfED {n0, n1, n2, n3, n4, n5, n6, n8},
        aggregationLevel16
        ENUMERATED {n0, n1, n2, n3, n4, n5, n6, n8}
    },
    searchSpaceType                              CHOICE {
    (search space type)
        -- Configures this search space as CSS and DCI formats to monitor.
        common
    SEQUENCE {
    (common search space)
    }
    ue-Specific
    SEQUENCE {
    (UE-specific search space)
        -- Indicates whether the UE monitors in this USS for DCI formats
0-0 and 1-0 or for formats 0-1 and 1-1.
        formats
        ENUMERATED {formats0-0-And-1-0, formats0-1-And-1-1},
        ...
    }
```

The BS may configure one or a plurality of search space sets in the UE according to configuration information. The BS may configure search space set 1 and search space 2 in the UE; and the configuration may be performed such that DCI format A scrambled by an X-RNTI in search space set 1 is monitored in the CSS and DCI format B scrambled by a Y-RNTI in search space set 2 is monitored in the UE-specific search space.

One or a plurality of search space sets may exist in the CSS or the UE-specific search space. For example, search space set #1 and search space set #2 may be configured as CSSs, and search space set #3 and search space set #4 may be configured as UE-specific search spaces.

In the CSS, the following combinations of DCI formats and RNTIs may be monitored. Of course, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The described RNTIs may follow the following definition and use.

C-RNTI: used for scheduling UE-specific PDSCH

Temporary C-RNTI(TC-RNTI): used for UE-specific PDSCH scheduling

Configured scheduling (CS)-RNTI: used for semi-statically configured UE-specific PDSCH scheduling RA-RNTI: used for PDSCH scheduling at random access stage P-RNTI: used for PDSCH scheduling through which paging is transmitted SI-RNTI: used for PDSCH scheduling through which system information is transmitted Interruption RNTI (INT-RNTI): used for indicating whether puncturing is performed for PDSCH TPC for PUSCH RNTI (TPC-PUSCH-RNTI): used for indicating PUSCH power control command TPC for PUCCH RNTI (TPC-PUCCH-RNTI): used for indicating PUCCH power control command TPC for SRS RNTI (TPC-SRS-RNTI): used for indicating SRS power control command The DCI formats may follow the definitions in Table 10.

TABLE 10

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

A CORESET p and a search space of an AL L in a search space set s in a wireless communication system may be expressed as shown in Equation (2) below.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p} / L \rfloor \right\} + i \quad (2)$$

In Equation (2):
- L: aggregation level
- $n_{CI}$: carrier index
- $N_{CCE,p}$: total number of CCEs existing within CORESET p
- $n^\mu_{s,f}$: slot index
- $M^{(L)}_{p,s,max}$: number of PDCCH candidates at aggregation level L
- $m_{snCI} = 0, \ldots, M^{(L)}_{p,s,max} - 1$: PDCCH candidate index at aggregation level L
- $i = 0, \ldots, L-1$
- $Y_{p,n_{s,f}}^\mu = (A_p \cdot Y_{p,n_{s,f}-1}^\mu) \bmod D$, $Y_{p,-1} = n_{RNTI} \neq 0$, $A_0 = 39827$, $A_1 = 39829$, $A_2 = 39839$, $D = 65537$
- $n_{RNTI}$: UE identifier
- $Y_{p,n_{s,f}}^\mu$ may correspond to 0 in the case of the CSS.
- $Y_{p,n_{s,f}}^\mu$ may correspond to a value varying depending on a UE ID (e.g., a C-INTI or an ID configured in the UE by the BS) and a time index in the case of the UE-specific search space.

In a wireless communication system, a set of search space sets monitored by the UE at every time point may vary as a plurality of search space sets can be configured as different parameters (e.g., the parameters shown in Table 9 above). For example, when search space set #1 is configured on an X-slot period, search space set #2 is configured on a Y-slot period, and X and Y are different from each other, the UE may monitor all of search space set #1 and search space set #2 in a specific slot and monitor one of search space set #1 and search space set #2 in another specific slot.

PDCCH: Span

The UE may report a UE capability when a plurality of PDCCH monitoring locations exist within the slot and, at this time, the concept "span" may be used. A span includes consecutive symbols in which the UE can monitor a PDCCH within the slot, and each PDCCH monitoring location may be within 1 span. The span may be expressed by (X, Y), in which X refers to the minimum number of symbols which should be spaced apart between first symbols of two consecutive spans and Y refers to the number of consecutive symbols for monitoring a PDCCH within 1 span. The UE may monitor the PDCCH in a section within Y symbols from the first symbol of the span within the span.

FIG. 6B illustrates a UE having a plurality of PDCCH monitoring locations within a slot through a span in a wireless communication system according to an embodiment.

Referring to FIG. 6B, the span can be expressed by (X,Y)=(7,4), (4,3), and (2,2), and the three cases are expressed as (6b-00), (6b-05), and (6b-10). For example, (6b-00) indicates a case in which the number of spans that can be expressed by (7,4) is 2 in the slot. An interval between first symbols of the 2 spans is expressed as X=7, a PDCCH monitoring location may exist within a total of Y=3 symbols from the first symbol of each span, and search spaces 1 and 2 exist within Y=3 symbols. (6b-05) indicates a case in which a total number of spans that can be expressed by (4,3) is 3 in the slot, and an interval between a second span and a third span is X'=5 symbols larger than X=4.

PDCCH: UE Capability Report

The slot location of the CSS and the UE-specific search space is indicated by a monitoringSymbolsWitninSlot parameter as shown in Table 11, and the symbol location within the slot is indicated by a bitmap through a monitoringSymbolsWithinSlot parameter as shown in Table 9. The symbol location within the slot in which the UE can perform search space monitoring may be reported to the BS through the following UE capability.

UE capability 1 (hereinafter, referred to as FG 3-1). When the number of monitoring occasions for type 1 and type 3 search spaces or the UE-specific search space is 1 within the slot, the UE capability is to monitor the corresponding MO if the corresponding MO is within first 3 symbols in the slot. The capability is a mandatory capability which all LTEs supporting NR should support and whether to support the capability is not explicitly reported to the BS.

TABLE 11

| Feature Index | group | Components | Field name in TS 38.331 [2] |
|---|---|---|---|
| 3-1 | Basic DL control channel | 1) One configured CORESET per BWP per cell in addition to CORESET0- CORESET resource allocation of 6 RB bit-map and duration of 1-3 OFDM symbols for FR1<br>For type 1 CSS without dedicated RRC configuration and for type 0, 0A, and 2 CSSs, CORESET resource allocation of 6 RB bit-map and duration 1-3 OFDM symbols for FR2<br>For type 1 CSS with dedicated RRC configuration and for type 3 CSS, UE specific SS, CORESET resource allocation of 6 RB bit-map and duration 1-2 OFDM symbols for FR2<br>REG-bundle sizes of ⅔ RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled secondary cell (SCell) per BWP<br>This search space limit is before applying all dropping rules.<br>For type 1 CSS with dedicated RRC configuration, type 3 CSS, and UE-SS, the monitoring occasion is within the first 3 OFDM symbols of a slot | n/a |

TABLE 11-continued

| Feature Index group | Components | Field name in TS 38.331 [2] |
|---|---|---|
| | For type 1 CSS without dedicated RRC configuration and. for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for frequency division duplexing (FDD)<br>6) Processing one unicast DCI scheduling DL and 2 unicast DCI scheduling UL per slot per scheduled CC for time division duplexing (TDD) | |

UE capability 2 (hereinafter, referred to as FG 3-2). When the number of monitoring occasions for the CSS or the UE-specific search space is one within the slot as shown in Table 12 below, the UE capability is to perform monitoring regardless of the start symbol location of the corresponding MO. The UE capability can be optionally supported by the UE, and whether to support the capability is explicitly reported to the BS.

TABLE 12

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols m the slot | pdcchMonitoringSingleOccasion |

UE capability 3 (hereinafter, referred to as FG 3-5, 3-5a, or 3-5b). When the number of monitoring occasions for the CSS or the UE-specific search space is plural within the slot as shown in Table 13 below, the UE capability indicates a pattern of MOs which the UE can monitor. The pattern includes an interval X between start symbols of different MOs and a maximum symbol length Y of one MO. A combination of (X,Y) supported by the UE may be one or more of {(2,2), (4,3), (7,3)}. The UE capability can be optionally supported by the UE, and whether to support the capability and the combination (X,Y) are explicitly reported to the BS.

TABLE 13

| Index | Feature group | Components |
|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 |
| 3-5a | For type 1 CSS with dedicated RRC configuration, type 3 CSS, and UE-SS, monitoring occasion can be | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as |

TABLE 13-continued

| Index | Feature group | Components |
|---|---|---|
| | any OFDM symbol(s) of a slot for Case 2 with a DCI gap | 2OFDM symbols for 15 kHz<br>4OFDM symbols for 30 kHz<br>7OFDM symbols for 60 kHz with NCP<br>11OFDM symbols for 120 kHz<br>Up to one unicast DL DCI and up to one unicast UL DCI in a monitoring occasion except for the monitoring occasions of FG 3-1.<br>In addition for TDD the minimum separation between the first two UL unicast DCIs within the first 3 OFDM symbols of a slot can be zero OFDM symbols. |
| 3-5b | All PDCCH monitoring occasion can be any OFDM symbol(s) of a slot for Case 2 with a span gap | PDCCH monitoring occasions of FG-3-1, plus additional PDCCH monitoring occasion (s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max {maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary.<br>For the set of monitoring occasions which are within the same span:<br>Processing one unicast DCI scheduling DL and one unicast DCI scheduling UL per scheduled CC across this set of monitoring occasions for FDD<br>Processing one unicast DCI scheduling DL and two unicast DCI scheduling UL per scheduled CC across this set of monitoring occasions for TDD<br>Processing two unicast DCI scheduling DL and one unicast DCI scheduling UL per scheduled CC across this set of monitoring occasions for TDD<br>The number of different start symbol indices of spans for all PDCCH monitoring occasions per slot, including PDCCH monitoring occasions of FG-3-1, is no more than floor(14/X) (X is minimum among values reported by UE).<br>The number of different start symbol indices of PDCCH monitoring occasions per slot including PDCCH monitoring occasions of FG-3-1, is no more than 7.<br>The number of different start symbol indices of PDCCH monitoring occasions per half-slot including PDCCH monitoring occasions of FG-3-1 is no more than 4 in SCell. |

The UE may report whether to support UE capability 2 and/or UE capability 3 and a relevant parameter to the BS. The BS may allocate time axis resources for the CSS and the UE-specific search space based on the UE capability. In the resource allocation, the BS may not place the MO at the location at which the UE cannot perform monitoring.

PDCCH: BD/CCE Limit

If a plurality of search space sets are configured in the UE, a method of determining a search space set which the UE should monitor may consider the following conditions.

If the UE receives a configuration of a value of monitoringCapabilityConfig-r16, which is higher-layer signaling as r15monitoringcapability, the UE defines the number of PDCCH candidates which can be monitored and a maximum value for the number of CCEs included in entire search spaces (indicating a set of entire CCE sets corresponding to a union area of a plurality of search space sets).

When the UE receives a configuration of a value of monitoringCapabilityConfig-r16 as r16monitoringcapability, the UE may define the number of PDCCH candidates that can be monitored and a maximum value for the number of CCEs included in entire search spaces (indicating entire CCE sets corresponding to a union area of a plurality of search space sets) for each span.

Condition 1: Limits on Maximum Number of PDCCH Candidates

When the maximum number $M^\mu$ of PDCCH candidates that the UE can monitor according to the configuration value of higher-layer signaling as described above is defined based on a slot in a cell in which SCS is configured as $15 \cdot 2^\mu$ kHz, the maximum number $M^\mu$ follows Table 14 below, and when the maximum number $M^\mu$ of PDCCH candidates is defined based on a span, the maximum number $M^\mu$ follows Table 15 below.

TABLE 14

| μ | Maximum number of PDCCH candidates per slot and per serving cell ($M^\mu$) |
|---|---|
| 0 | 44 |
| 1 | 36 |
| 2 | 22 |
| 3 | 20 |

TABLE 15

| | Maximum number $M^\mu$ of monitored PDCCH candidates per span for combination (X, Y) and per serving cell | | |
|---|---|---|---|
| μ | (2, 2) | (4, 3) | (7, 4) |
| 0 | 14 | 28 | 44 |
| 1 | 12 | 24 | 36 |

Condition 2: Limits on Maximum Number of CCE

When the maximum number $C^\mu$ of CCEs included in all of search spaces (indicating a set of entire CCE sets corresponding to a union area of a plurality of search space sets) according to the configuration value of higher-layer signaling is defined based on a slot in a cell in which SCS is configured as $15 \cdot 2^\mu$ kHz, the maximum number $C^\mu$ follows Table 16 below, and when the maximum number $C^\mu$ of CCEs is defined based on a span, the maximum number $C^\mu$ follows Table 17 below.

TABLE 16

| μ | Maximum number of non-overlapped CCEs per slot and per serving cell ($C^\mu$) |
|---|---|
| 0 | 56 |
| 1 | 56 |
| 2 | 48 |
| 3 | 32 |

TABLE 17

| | Maximum number $C^\mu$ of non-overlapped CCEs per span for combination (X, Y) and per serving cell | | |
|---|---|---|---|
| μ | (2, 2) | (4, 3) | (7, 4) |
| 0 | 18 | 36 | 56 |
| 1 | 18 | 36 | 56 |

For convenience of description, a situation satisfying both conditions 1 and 2 at a specific time point is defined as "condition A". Accordingly, not satisfying condition A may indicate that at least one of conditions 1 and 2 is not satisfied.

PDCCH: Overbooking

Condition A may not be satisfied at a specific time point according to a configuration of search space sets by the BS. If condition A is not satisfied at a specific time point, the UE may select and monitor only some of the search space sets configured to satisfy condition A at the corresponding time point, and the BS may transmit the PDCCH through the selected search space sets.

The following method may be applied as a method of selecting some of all the configured search space sets.

If condition A for the PDCCH is not satisfied at a specific time point (e.g., a slot), the UE (or the BS) may select a search space set of which a search space type is configured as a common-search space among search space sets existing at the corresponding time point in preference to a search space set of which a search space type is configured as a UE-specific search space.

If search space sets configured as the common-search space are all selected (i.e., if condition A is satisfied even after all search spaces configured as the common-search space are selected), the UE (or BS) may select search space sets configured as the UE-specific search space. If the number of search space sets of configured as the UE-specific search space is plural, a search space set having a lower search space set index may have a higher priority. UE-specific search space sets may be selected within a range in which condition A is satisfied in consideration of the priority.

QCL, TCI State

In a wireless communication system, one or more different antenna ports (channels, signals, or combinations thereof) may be associated by a QCL configuration shown in Table 18 below. The TCI state is to inform of a QCL relation between a PDCCH (or a PDCCH DMRS) and another RS or channel, and a reference antenna port A (reference RS #A) and another purpose antenna port B (target RS #B) which are QCLed indicates that the UE is allowed to apply some or all of large-scale channel parameters estimated in the antenna port A to channel measurement from the antenna port B. The QCL is used to associate different parameters according to conditions such as: 1) time tracking influenced by average delay and delay spread, 2) frequency tracking influenced by Doppler shift and Doppler spread, 3) radio resource management (RRM) influenced by an average gain, and 4) beam management (BM) influenced by a spatial parameter. Accordingly, NR supports four types of QCL relations as shown in Table 18 below.

TABLE 18

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

A spatial RX parameter may refer to some or all of various parameters such as angle of arrival (AoA), power angular spectrum (PAS) of AoA, angle of departure (AoD), PAS of AoD, transmit/receive channel correlation, transmit/receive beamforming, and spatial channel correlation.

The QCL, relation can be configured in the UE through RRC parameter TCI-state and QCL-Info as shown in Table 19 below. Referring to Table 19, the BS may configure one or more TCI states in the UE and inform the UE of a maximum of two QCL relations (gcl-Type 1 and qcl-Type 2) for an RS referring to an ID of the TCI state, i.e., a target RS. Each piece of the QCL information (QCL-Info) included in the TCI state includes a serving cell index and a BWP index of a reference RS indicated by the corresponding QCL information, a type and an ID of the reference RS, and the QCL type as shown in Table 14 above.

CST is an NZP CSI RS for which a parameter (e.g., a repetition parameter) indicating repetition is not configured and trs-Info is not configured as true among the CSI-RSs.

TABLE 19

```
TCI-State ::=                        SEQUENCE {
  tci-StateId                          TCI-StateId,
  (ID of corresponding TCI state)
  qcl-Type1                            QCL-Info,
  (QCL information of first reference RS of RS (target RS) referring to
corresponding TCI state ID)
  qcl-Type2                            QCL-Info
        OPTIONAL, -- Need R
  (QCL information of second reference RS of RS (target RS) referring to
corresponding TCI state ID)
  ...
}
QCL-Info ::=                         SEQUENCE {
  cell                                 ServCellIndex
       OPTIONAL, -- Need R
  (serving cell index of reference RS indicated by corresponding QCL information)
  bwp-Id                               BWP-Id
         OPTIONAL, -- Cond CSI-RS-Indicated
  (BWP index of reference RS indicated by corresponding QCL information)
  referenceSignal                      CHOICE {
    csi-rs                               NZP-CSI-
RS-ResourceId,
    ssb
    SSB-Index
      (one of CSI-RSI ID or SSB ID indicated by corresponding QCL
information)
  },
  qcl-Type                             ENUMERALED
{typeA, typeB, typeC, typeD},
  ...
}
```

Figure 7:
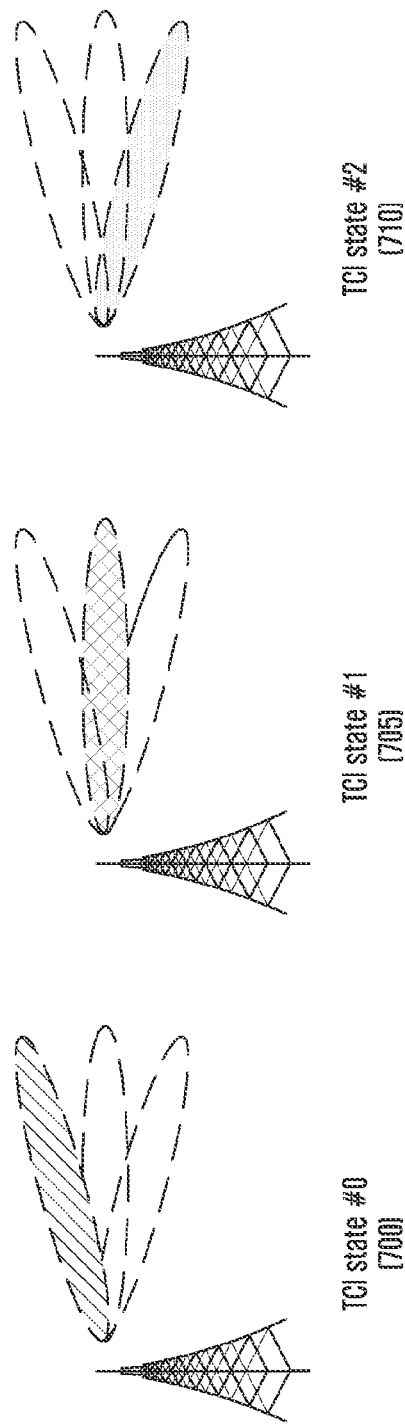
FIG. 7 illustrates BS beam allocation according to a transmission configuration indication (TCI) state configuration in a wireless communication system according to an embodiment.

FIG. 7 illustrates BS beam allocation according to a TCI state configuration in a wireless communication system according to an embodiment.

Referring to FIG. 7, the BS may, transmit information on N different beams to the UE through N different TCI states. For example, when N=3 as illustrated in FIG. 7, the BS may notify that a qcl-Type 2 parameter included in three TCI states 700, 705, and 710 is associated with a CSI-RS or an SS block (SSB) corresponding to different beams to be configured as QCL type D and antenna ports referring to the different TCI states 700, 705, and 710 are associated with different spatial Rx parameters, that is, different beams.

Tables 20 to 24 below show valid ICI state configurations according to the target antenna port type.

Specifically, Table 20 shows valid TCI state configurations when the target antenna port is a CSI-RS for tracking (e.g., a tracking RS (TRS)). The TRS is a non-ZP (NZP) CSI-RS for which a repetition parameter is not configured and trs-Info is configured as true among CSI-RSs. The third configuration in Table 20 may be used for an aperiodic TRS.

TABLE 20

| Valid TCI state configuration | DL RS 1 | qcl-Type 1 | DL RS 2 (if configured) | qcl-Type 2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 21 shows valid TCI state configurations when the target antenna port is a CSI-RS for CST The CSI-RS for

TABLE 21

| Valid TCI state configuration | DL RS 1 | qcl-Type 1 | DL RS 2 (if configured) | qcl-Type 2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS(same as DL RS1) | QCL-TypeD |
| 4 | TRS | QCL-TypeB | | |

Table 22 shows valid TCI state configurations when the target antenna port is a CSI-RS for BM (i.e., the same meaning as a CSI-RS for L1 RSRP reporting). The CSI-RS for BM is an NZP CSI-RS for which a repetition parameter is configured to have a value of on or off and trs-Info is not configured as true.

TABLE 22

| Valid TCI state configuration | DL RS 1 | qcl-Type 1 | DL RS 2 (if configured) | qcl-Type 2 (if configured) |
|---|---|---|---|---|
| 1 | TRS | QCL-TypeA | TRS(same as DL RS1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 23 shows valid TCI state configurations when the target antenna port is a PDCCH DMRS.

TABLE 23

| Valid TCI state configuration | DL RS 1 | qcl-Type 1 | DL RS 2 (if configured) | qcl-Type 2 (if configured) |
| --- | --- | --- | --- | --- |
| 1 | TRS | QCL-TypeA | TRS(same as DL RS1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 24 shows valid TCI state configurations when the target antenna port is a PDCCH DMRS.

TABLE 24

| Valid TCI state configuration | DL RS 1 | qcl-Type 1 | DL RS 2 (if configured) | qcl-Type 2 (if configured) |
| --- | --- | --- | --- | --- |
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In a representative QCL configuration method based on Tables 20 to 24, the target antenna port and the reference antenna port for each step are configured and operated as "SSB"→"TRS"→"CSI-RS for CSI, CSI-RS for BM, PDCCH DMRS, or PDSCH DMRS."
PDCCH: DCI-Related TCI state combinations that can be applied to the PDCCH DMRS antenna port are as shown in Table 25 below. In Table 25, a fourth row is a combination assumed by the UE before the RRC configuration, and configurations after RRC are impossible.

TABLE 25

| Valid TCI state Configuration | DL RS 1 | qcl-Type1 | DL RS 2 (if configured) | qcl-Type2 (if configured) |
| --- | --- | --- | --- | --- |
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
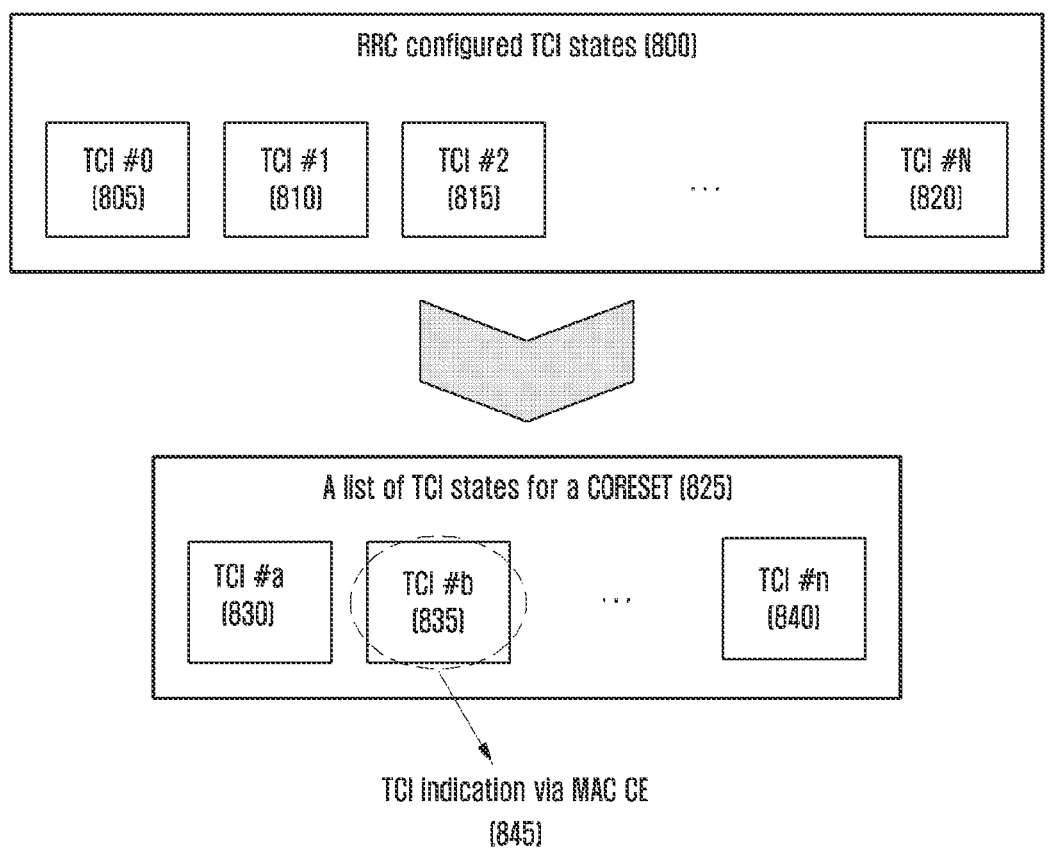
FIG. 8 illustrates a method of allocating TCI states for a PDCCH in a wireless communication system according to an embodiment.

FIG. 8 illustrates a method of allocating TCI states for a PDCCH in a wireless communication system according to an embodiment. Specifically, in a wireless communication system, a hierarchical signaling method as illustrated in FIG. 8 is supported for dynamic allocation for a PDCCH beam.

Referring to FIG. 8, the BS may configure N TCI states 805, 810, . . . , 820 in the UE through RRC signaling 800 and configure some thereof as TCI states for the CORESET as indicated by reference numeral 825. Thereafter, the BS may indicate one of the TCI states 830, 835, and 840 for the CORESET to the UE through MAC CE signaling as indicated by reference numeral 845. Subsequently, the UE may receive a PDCCH based on beam information included in the TCI states indicated ley the MAC CE signaling.

Figure 9:
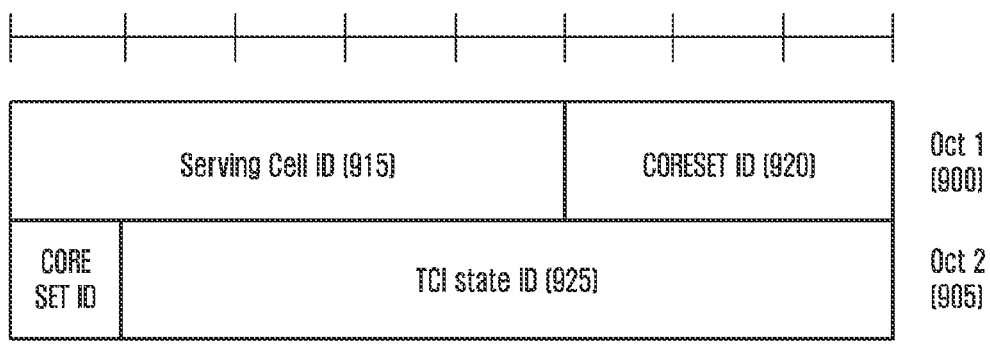
FIG. 9 illustrates a TCI indication medium access control (MAC) control element (CE) signaling structure for a PDCCH demodulation reference signal (DMRS) in a wireless communication system according to an embodiment of the disclosure.

FIG. 9 illustrates a TCI indication MAC CE indication signaling structure for a PDCCH DMRS in a wireless communication system according to an embodiment.

Referring to FIG. 9, TCI indication MAC CE signaling for the PDCCH DMRS includes 2 bytes (16 bits), and includes a serving cell ID 915 of 5 bits, a CORESET ID 920 of 4 bits, and a TCI state ID 925 of 7 bits.

Figure 10:
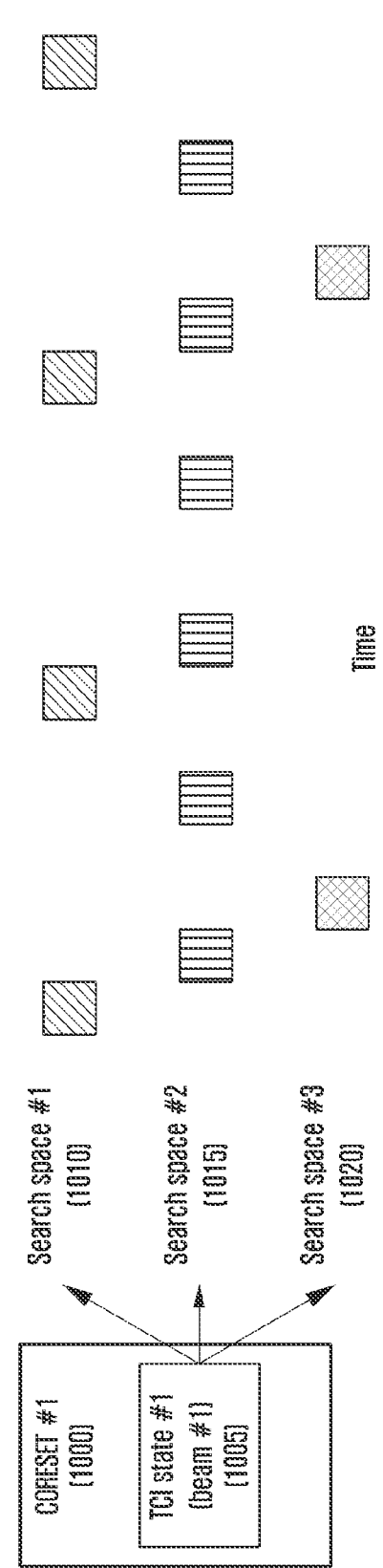
FIG. 10 illustrates a CORESET and search space beam configuration in a wireless communication system according to an embodiment.

FIG. 10 illustrates a CORESET and search space beam configuration in a wireless communication system according to an embodiment.

Referring to FIG. 10, the BS may indicate one of the TCI state list included in the configuration of a CORSET 1000 through MAC CE signaling as indicated by reference numeral 1005. Thereafter, before another TCI state is indicated to the corresponding CORSET through other MAC CE signaling, the UE may consider that the same QCL information (beam #1) 1005 is applied to one or more search spaces 1010, 1015, and 1020 associated with the CORESET. However, the PDCCH beam allocation method has difficulty in indicating a beam change earlier than a MAC CE signaling delay and has a disadvantage of applying the same beam to all CORESETs regardless of a search space characteristic. Consequently, this makes flexible PDCCH beam operation difficult.

Hereinafter, embodiments of the disclosure are described, which provide more flexible PDCCH beam configurations and operation methods. In the following embodiments, some distinguished examples are provided for convenience of description, but they are not exclusive and can be applied through a proper combination thereof according to circumstances.

A BS may configure one or a plurality of TCI states for a specific CORESET in the UE and activate one of the configured TCI states through a MAC CE activation command. For example, {TCI state #0, TCI state #1, TCI state #2} are configured in CORESET #1 as the TCI states, and the BS may transmit a command for activating TCI state #0 assumed as the TCI state for CORESET #1 to the UE through the MAC CE. The UE may correctly receive a DMRS of the corresponding CORESET based on QCL information within the activated TCI state by means of the activation command for the TCI state received through MAC CE.

When the UE does not receive the MAC CE activation command for the TCI state of CORESET #0 for the CORE-SET (CORESET #0) having an index of 0, the UE may assume that a DMRS transmitted in CORESET #0 is QCLed with an SS/PBCH block identified in an initial access process or a non-contention-based random access process which is not triggered by a PDCCH command.

When the UE does not receive a configuration of the TCI state for CORESET #X or the UE receives the configuration of one or more TCI states, but does not receive a MAC CE activation command for activating one thereof, the UE may assume that a DMRS transmitted in CORESET #X is QCLed with an SS/PBCH block identified in an initial access process.

PDSCH: Frequency Resource Allocation-Related

Figure 11:
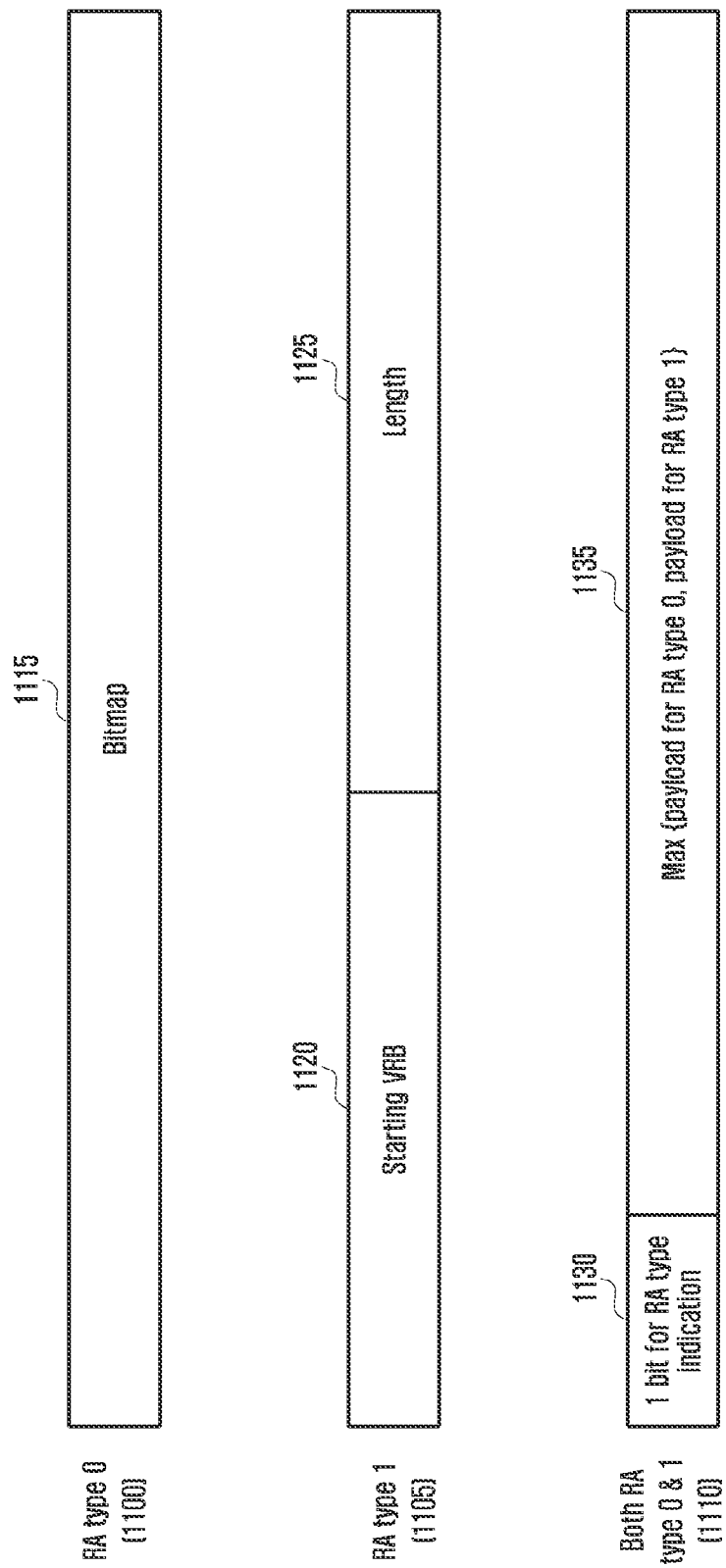
FIG. 11 illustrates a time axis resource allocation of a PDSCH in a wireless communication system according to an embodiment.

FIG. 11 illustrates time axis resource allocation of a PDSCH in a wireless communication system according to an embodiment. Specifically, FIG. 1 illustrates three frequency axis resource allocation methods of type 0 1100, type 1 1105, and dynamic switch 1110, which can be configured through a higher layer in the wireless communication system.

Referring to FIG. 11, when the UE is configured to use only resource type 0 through higher-layer signaling as indicated by reference numeral 1100, some pieces of DCI for allocating the PDSCH to the corresponding UE includes a bitmap of $N_{RBG}$ bits. $N_{RBG}$ is the number of RB groups (RBGs) determined as shown in Table 26 below, according to a BWP size allocated by a BWP indicator and a higher-layer parameter rbg-Size, and data is transmitted in an RBG indicated as 1 by the bitmap.

TABLE 26

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use only resource type 1 through higher-layer signaling as indicated by reference numeral 1105, some pieces of DCI for allocating the PDSCH to the corresponding UE includes frequency axis resource allocation information of $\lceil \log_2 (N_{RB}^{DL,BWP} (N_{RB}^{DL,BWP}+1)/2 \rceil$ bits. The BS may configure a starting VRB 1120 and a length 1125 of frequency axis resources allocated successively therefrom.

When the UE is configured to use both resource type 0 and resource type 1 through higher-layer signaling as indicated by reference numeral 1110, some pieces of DCI for allocating the PDSCH to the corresponding UE includes frequency axis resource allocation information of bits of a larger value 1135 among payload 1115 for configuring resource type 0 and payload 1120 and 1125 for configuring resource type 1. One bit may be added to the first part (e.g., a most significant bit (MSB)) of the frequency axis resource allocation information within the DCI, and the use of resource type 0 may be indicated when the corresponding bit is "0" and the use of resource type 1 may be indicated when the corresponding bit is "1".

PDSCH Time Resource Allocation-Related

A BS may configure a table for time domain resource allocation information for a downlink data channel (e.g., a PDSCH) and an uplink data channel (e.g., a PDSCH) in a UE through higher-layer signaling (e.g., RRC signaling). A table including a maximum of maxNrofDL-Allocations=16 entries may be configured for the PDSCH, and a table including a maximum of maxNrofUL-Allocations=16 entries may be configured for the PUSCH. The time domain resource allocation information may include PDCCH-to-PDSCH slot timing (corresponding to a time interval in units of slots between a time point at which a PDCCH is received and a time point at which a PDSCH scheduled by the received PDCCH is transmitted, and indicated by K0) or PDCCH-to-PUSCH slot timing (corresponding to a time interval in units of slots between a time point at which a PDCCH is received and a time point at which a PUSCH scheduled by the received PDCCH is transmitted, and indicated by K2), a location and a length of a start symbol in which a PDSCH or a PUSCH is scheduled within the slot, a mapping type of a PDSCH or a PUSCH, etc. For example, information shown in Table 27 or Table 28 may be transmitted from the BS to the UE.

TABLE 27

PDSCH-TimeDomainResourceAllocationList information element

PDSCH-TimeDomainResourceAllocationList ::= SEQUENCE (SIZE(1..
maxNrofDL-
Allocations)) OF PDSCH-TimeDomainResourceAllocation
PDSCH-TimeDomainResourceAllocation ::= SEQUENCE {
 k0 INTEGER (0..32)
 OPTIONAL, --Need S
 (PDCCH-to-PDSCH timing, slot units)

TABLE 27-continued

PDSCH-TimeDomainResourceAllocationList information element mapping type ENUMERATED {typeA, typeB},
 (PDSCH mapping type)
 startSymbolAndLength INTEGER (0..127)
 (Start symbol and length of PDSCH)
}

TABLE 28

PUSCH-TimeDomainResourceAllocationList information element

PUSCH-TimeDomainResourceAllocationList ::= SEQUENCE (SIZE(1..
maxNrofUL-
Allocations)) OF PUSCH-TimeDomainResource Allocation
PUSCH-TimeDomainResourceAllocation ::= SEQUENCE {
 k2 INTEGER (0..32)
 OPTIONAL, --Need S
 (PDCCH-to-PUSCH timing, slot units)
 mapping type ENUMERATED {typeA, typeB},
 (PUSCH mapping type)
 startSymbolAndLength INTEGER (0..127)
 (Start symbol and length of PUSCH)
}

The BS may inform the UE of one of the entries in the table for the time domain resource allocation information through L1 signaling (e.g DCI) (e.g indicated through a 'time domain resource allocation field within DCI). The UE may acquire time domain resource allocation information for a PDSCH or a PUSCH based on the DCI received from the BS.

Figure 12:
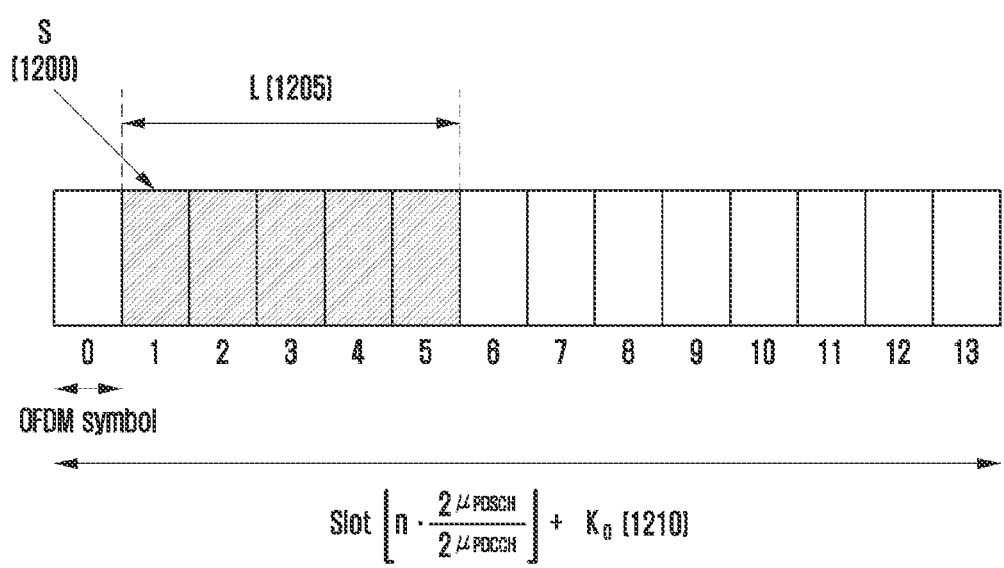
FIG. 12 illustrates an allocation of time axis resources of a PDSCH in a wireless communication system according to an embodiment.

FIG. 12 illustrates allocation of time axis resources of a PDSCH in a wireless communication system according to an embodiment.

Referring to FIG. 12, the BS may indicate a time axis location of PDSCH resources according to SCS ($\mu_{PDSCH}$, $\mu_{PDCCH}$) of a data channel and a control channel configured using a higher layer, a scheduling offset (K0) value, and an OFDM symbol start location 1200 and length 1205 within one slot dynamically indicated through DCI.

Figure 13:
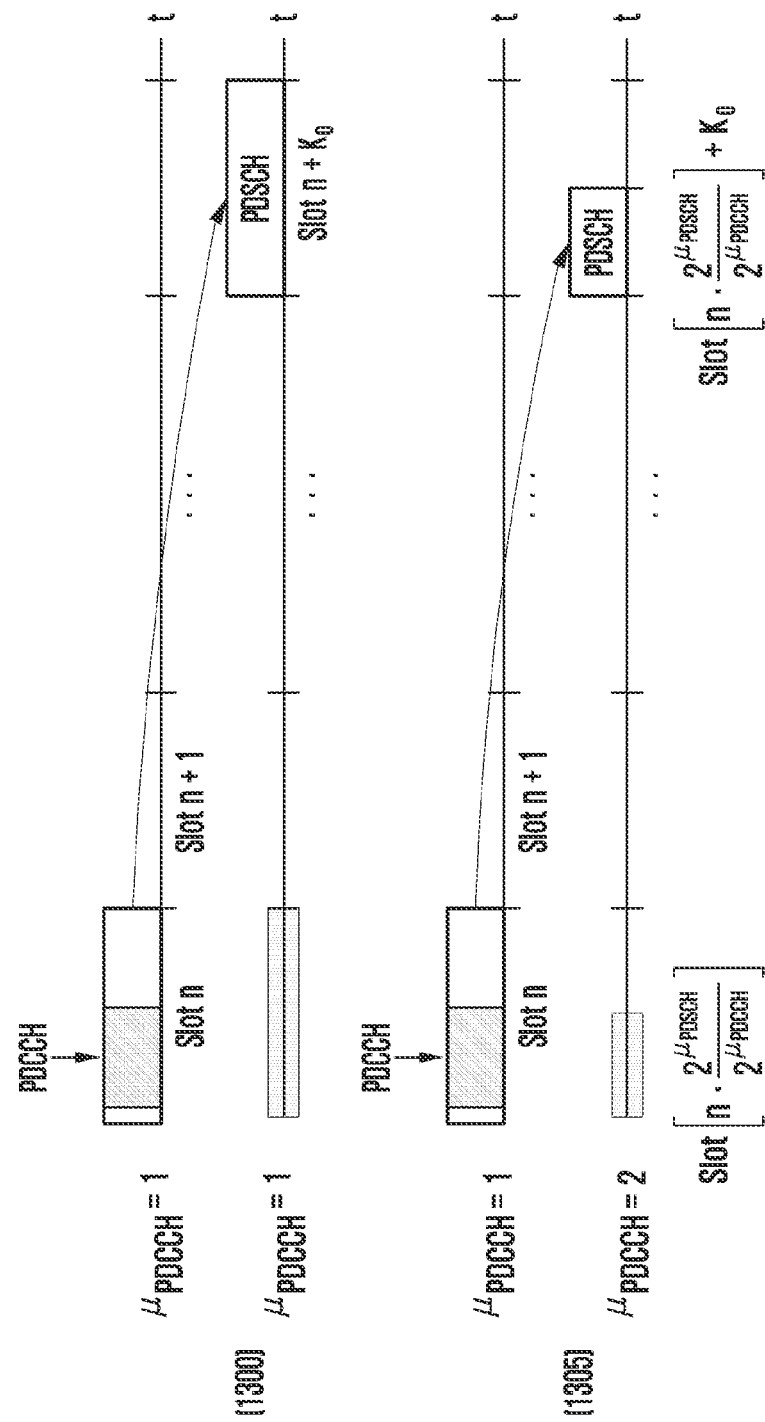
FIG. 13 illustrates an allocation of time-axis resources according to subcarrier spacing (SCS) of a data channel and a control channel in a wireless communication system according to an embodiment.

FIG. 13 illustrates allocation of time-axis resources according to SCS of a data channel and a control channel in a wireless communication system according to an embodiment.

Referring to FIG. 13, when SCSs of a data channel and a control channel are the same as each other ($\mu_{PDSCH}=\mu_{PDCCH}$) as indicated by reference numeral 1300, slot numbers for the data and the control are the same as each other, and thus, the BS and the UE may generate a scheduling offset according to a predetermined slot offset K0. However, when SCSs of a data channel and a control channel are different from each other ($\mu_{PDSCH}\neq\mu_{PDCCH}$) as indicated by reference numeral 1305, slot numbers for the data and the control are different from each other, and thus, the BS and the UE may generate a scheduling offset according to a predetermined slot offset K0 based on SCS of the PDCCH.

PDSCH: Processing Time

When a BS schedules to transmit a PDSCH to a UE through DCI format 1_0 1_1, or 1_2, the UE may need a PDSCH processing time for receiving the PDSCH by applying a transmission method indicated through DCI (modulation/demodulation and coding indication index, DMRS-related information, and frequency resource allocation information). In a wireless communication system (according to an embodiment of the disclosure, a PDSCH processing time is defined in consideration thereof. For example, the PDSCH processing time of the UE may follow Equation (3) below.

$$T_{proc,1}=(N_1+d_{1,1}+d_2)(2048+144)\kappa 2^{-\mu}T_c+T_{ext} \quad (3)$$

In Equation (3), each variable may have the following meanings:

$N_1$: the number of symbols determined according to UE processing capability 1 or 2 based on a UE capability and numerology $\mu$. $N_1$ may have a value as shown in Table 29 when UE processing capability 1 is reported according to a UE capability report, and may have a value as shown in Table 30 when UE processing capability 2 is reported and information indicating that UE processing capability 2 can be used is configured through higher-layer signaling. The numerology $\mu$ may correspond to a minimum value among $\mu_{PDCCH}$, $\mu_{PDSCH}$, and $\mu_{UL}$ to maximize $T_{proc,1}$, and $\mu_{PDCCH}$, $\mu_{PDSCH}$, and $\mu_{UL}$ may be numerology of a PDCCH scheduling a PDSCH, numerology of a scheduled PDSCH, and numerology of a UL channel to transmit HARQ-ACK, respectively.

TABLE 29

PDSCH processing time in PDSCH processing capability 1

| | PDSCH decoding time $N_1$ [symbols] | |
|---|---|---|
| $\mu$ | Case in which dmrs-AdditionalPosition = pos0 within DMRS-DownlinkConfig that is higher-layer signaling in both PDSCH mapping types A and B | Case in which AdditionalPosition ≠ pos0 within DMRS-DownlinkConfig that is higher-layer signaling or a higher-layer parameter is not configured in both PDSCH mapping types A and B |
| 0 | 8 | $N_{1,0}$ |
| 1 | 10 | 13 |
| 2 | 17 | 20 |
| 3 | 20 | 24 |

TABLE 30

PDSCH processing time in PDSCH processing capability 2

| | PDSCH decoding time $N_1$ [symbols] Case in which dmrs-AdditionalPosition = pos0 within DMRS-DownlinkConfig that is higher-layer signaling in both PDSCH mapping types A and B |
|---|---|
| $\mu$ | |
| 0 | 3 |
| 1 | 4.5 |
| 2 | 9 for frequency range (FR) 1 |

$\kappa$: 64

$T_{ext}$: the UE may calculate $T_{ext}$ and apply the same to a PDSCH processing time when the UE uses a shared spectrum channel access scheme. Otherwise, it is assumed that $T_{ext}$ is 0.

When $l_1$ indicating a location value of a PDSCH DMRS is 12, N1,0 in Table 29 has a value of 14 and, otherwise, has a value of 13.

When the last symbol of the PDSCH is an $i^{th}$ symbol in a slot for transmitting the PDSCH and i<7 for PDSCH mapping type A, $d_{1,1}$ is 7-i and, otherwise, $d_{1,1}$ is 0.

$d_2$: $d_2$ of a PUCCH having a high priority index may be configured as a value reported from the UE when the PUCCH having the high priority index and a PUCCH or PDSCH having a low priority index overlap in the time. Otherwise, $d_2$ is 0.

$d_{1,1}$ may be determined according to the number L of symbols of the scheduled PDSCH and the number d of overlapping symbols between the PDCCH scheduling the PDSCH and the scheduled PDSCH as described below when PDSCH mapping type B is used for UE processing capability 1.

If L≥7, $d_{1,1}$=0.
If L≥4 and L≤6, $d_{1,1}$=7−L.
if L=3, $d_{1,1}$=min (d, 1).
If L=2, $d_{1,1}$=3+d.

$d_{1,1}$ may be determined according to the number L of symbols of the scheduled PDSCH and the number d of overlapping symbols between the PDCCH scheduling the PDSCH and the scheduled PDSCH as described below when PDSCH mapping type B is used for UE processing capability 2.

If L≥7, $d_{1,1}$=0.
L≥4 and L≤6, $d_{1,1}$=7−L.
In the case of L=2,
  if the PDCCH performing scheduling exists within a CORESET including 3 symbols and the corresponding CORESET and the scheduled PDSCH have the same start symbol, $d_{1,1}$=3.
  Otherwise, $d_{1,1}$=d.

A UE supporting capability 2 within a given serving cell may apply a PDSCH processing time according to UE processing capability 2 when processingType2Enabled that is higher-layer signaling is configured as enable for the corresponding cell.

When a location of a first uplink transmission symbol of a PUCCH including HARQ-ACK information (e.g., the corresponding location may consider $K_1$ defined as a transmission time point of HARQ-ACK, PUCCH resources used for HARQ-ACK transmission, and a timing advance effect) does not start earlier than a first uplink transmission symbol appearing after a time of $T_{proc,1}$ from a last symbol of a PDSCH, the UE should transmit a valid HARQ-ACK message. That is, the UE should transmit the PUCCH including a HARQ-ACK only when the PDSCH processing time is sufficient. Otherwise, the UE cannot provide the BS with valid HARQ-ACK information corresponding to the scheduled PDSCH. $T_{proc,1}$ may be used for all of the normal or expanded cyclic prefix (CP). When the number of PDSCH transmission locations within one slot is 2, $d_{1,1}$ is calculated based on the first PDSCH transmission location within the corresponding slot.

PDSCH: Reception Preparation Time in Cross-Earner Scheduling

Hereinafter, in a case of cross-carrier scheduling in which numerology $\mu_{PDCCH}$ for transmitting the PDCCH performing scheduling and numerology $\mu_{PDSCH}$ for transmitting the PDSCH scheduling the corresponding PDCCH are different from each other, a PDSCH reception preparation time $N_{pdsch}$ of the UE defined for a time interval between the PDCCH and the PDSCH is described.

When $\mu_{PDCCH}<\mu_{PDSCH}$, the scheduled PDSCH cannot be transmitted earlier than the first symbol of the slot existing after $N_{pdsch}$ symbols from the last symbol of the PDCCH scheduling the corresponding PDSCH. Transmission symbols of the corresponding PDSCH may include a DM-RS.

When $\mu_{PDCCH}>\mu_{PDSCH}$, the scheduled PDSCH may be transmitted after $N_{pdsch}$ symbols from the last symbol of the PDCCH scheduling the corresponding PDSCH. Transmission symbols of the corresponding PDSCH may include a DM-RS.

TABLE 31

$N_{pdsch}$ according to SCS of scheduled PDCCH

| $\mu_{PDCCH}$ | $N_{pdsch}$ [symbols] |
|---|---|
| 0 | 4 |
| 1 | 5 |
| 2 | 10 |
| 3 | 14 |

PUSCH: Preparation Process Time

When a BS schedules to transmit a PUSCH to a UE by using DCI format 0_0, 0_1, or 0_2, the UE may need a PUSCH preparation process time for transmitting a PUSCH by applying a transmission method (e.g., a transmission precoding method of SRS resources, the number of transmission layers, and a spatial domain transmission filter) indicated through DCI. In a wireless communication system (according to an embodiment of the disclosure, a PUSCH preparation process time is defined in consideration thereof. For example, the PUSCH preparation process time of the UE may follow Equation (4) below.

$$T_{proc,2}=\max((N_2+d_{2,1}+d_2)(2048+144)\kappa 2^{-\mu}T_c+T_{ext}+T_{switch},d_{2,2}) \quad (4)$$

In Equation (4), each variable may have the following meaning.

$N_2$: the number of symbols determined according to UE processing capability 1 or 2 based on a UE capability and numerology $\mu$. $N_2$ may have a value as shown in Table 32 when UE processing capability 1 is reported according to a UE capability report, and may have a value as shown in Table 33 when UE processing capability 2 is reported and information indicating that UE processing capability 2 can be used is configured through higher-layer signaling.

TABLE 32

| $\mu$ | PUSCH preparation time $N_2$ [symbols] |
|---|---|
| 0 | 10 |
| 1 | 12 |
| 2 | 23 |
| 3 | 36 |

TABLE 33

| $\mu$ | PUSCH preparation time $N_2$ [symbols] |
|---|---|
| 0 | 5 |
| 1 | 5.5 |
| 2 | 11 for frequency rage 1 |

$d_{2,1}$: the number of symbols determined as 0 when all REs of a first OFDM symbol in PUSCH transmission include only DM-RSs and, otherwise, determined as 1.

$\kappa$: 64

$\mu$: follows a value among $\mu_{DL}$ or $\mu_{UL}$ makes $T_{proc,2}$ larger. $\mu_{DL}$ is downlink numerology for transmitting a PDCCH including DCI scheduling a PUSCH and $\mu_{UL}$ is uplink numerology for transmitting a PUSCH.

$T_c$: has $1/(\Delta f_{max} \cdot N_f)$, $\Delta f_{max} = 480 \cdot 10^3$ Hz, $N_f = 4096$.

$d_{2,1}$: follows a BWP switching time when DCI scheduling a PUSCH indicates BWP switching and, otherwise, has 0.

$d_2$: a value of $d_2$ of a PUSCH having a high priority index is used when OFDM symbols of the PUCCH, the PUSCH having the high priority index, and a PUCCH having a low priority index overlap in the time. Otherwise, $d_2$ is 0.

$T_{ext}$: the UE may calculate $T_{ext}$ and apply the same to a PUSCH processing time when the UE uses a shared spectrum channel access scheme. Otherwise, it is assumed that $T_{ext}$ is 0.

$T_{switch}$: it is assumed that $T_{switch}$ is a switching interval time when an uplink switching interval is triggered. Otherwise, it is assumed that $T_{switch}$ is 0.

In consideration of time axis resource mapping information of the PUSCH scheduled through DCI and an effect of uplink-downlink timing advance, the BS and the UE may determine that the PUSCH preparation process time is not sufficient when a first symbol of the PUSCH starts earlier than a first uplink symbol at which the CP starts after $T_{proc,2}$ from a last symbol of the PDCCH including the DCI scheduling the PUSCH. Otherwise, the BS and the UE determine that the PUSCH preparation process time is sufficient. The UE may transmit the PUSCH only when the PUSCH preparation process time is sufficient, and may ignore scheduling of the PUSCH when the PUSCH preparation process time is not sufficient.

UE Capability Report-Related

A UE may perform a procedure for repotting a capability supported by the UE to a corresponding BS while the UE is connected to a serving BS. In the following description, this is referred to as a UE capability report.

The BS may transmit a UE capability enquiry message requesting a capability report from the UE in the connected state. The message may include a UE capability request for each radio access technology (RAT) type of the BS. The request for each RAT type may include supported frequency band combination (BC) information. A plurality of UE capabilities for respective RAT types may be requested through one RRC message container transmitted by the BS or the BS may insert a UE capability inquiry message including the UE capability request for each RAT type multiple times and transmit the same to the UE. That is, the UE capability inquiry may be repeated multiple times within one message and the UE may configure a UE capability information message corresponding thereto and report the same multiple times.

In a next-generation mobile communication system, a UE capability request for NR, LTE, E-UTRA NR DC (EN-DC), and multi-RAT DC (MR-DC) may be made. The UE capability inquiry message is generally transmitted initially after the UE is connected to the BS, but may be requested at any time when the BS needs the same.

The UE receiving the request for the UE capability report from the BS in the above step may configure a UE capability according to RAT type and band information requested by the BS.

1. When the UE receives a list of LTE and/or NR bands from the BS through a UE capability request, the UE configures a BC for EN-DC and NR stand-alone (SA). That is, the UE configures a candidate list of BCs for EN-DC and NR SA based on requested bands in FreqBandList. The bands sequentially have priorities as stated in FreqBandList.

2. When the BS sets a "eutra-nr-only" flag or an "eutra" flag and makes a request for the UE capability report, the UE completely removes NR SA BCs from the configured candidate list of BCs. Such an operation may occur only when an LTE BS (e.g., an eNB) makes a request for an "eutra" capability.

3. Thereafter, the UE removes fallback BCs from the candidate list of BCs configured in the above stage. The fallback BC can be obtained by removing a band corresponding to at least one SCell from a predetermined BC, and a BC before the removal of the band corresponding at least one SCell can cover the fallback BC and thus the fallback BC can be omitted. This stage is applied to MR-DC, i.e., LTE bands. BCs left after the stage are a final "candidate BC list".

4. The UE selects BCs suitable for a requested RAT type in the final "candidate BC list" and selects BCs to be reported. In this stage, the UE configures supportedBandCombinationList according to a determined order. That is, the UE configures BCs and UE capability to be reported according to an order of a preset rat-Type (nr→eutra-ur→eutra). Further, the UE configures featureSetCombination for the configured supportedBandCombinationList and configures a list of "candidate feature set combination" in a candidate BC list from which a list for fallback BCs (including capability at the same or lower stage) is received. The "candidate feature set combination" may include all feature set combinations for NR and EUTRA-NR BCs, and may be acquired from a feature set combination of UE-NR-Capabilities and UE-MRDC-Capabilities containers.

When the requested rat Type is eutra-nr and influences, featureSetCombinations are included in all of the two containers of UE-MRDC-Capabilities and UE-NR-Capabilities. However, the NR feature set includes only UE-NR-Capabilities.

After configuring the UE capability, the UE may transfer a UE capability information message including the UE capability to the BS. The BS may perform scheduling for the corresponding UE and transmission/reception management based on the UE capability received from the UE.

CA/DC-Related

Figure 14:
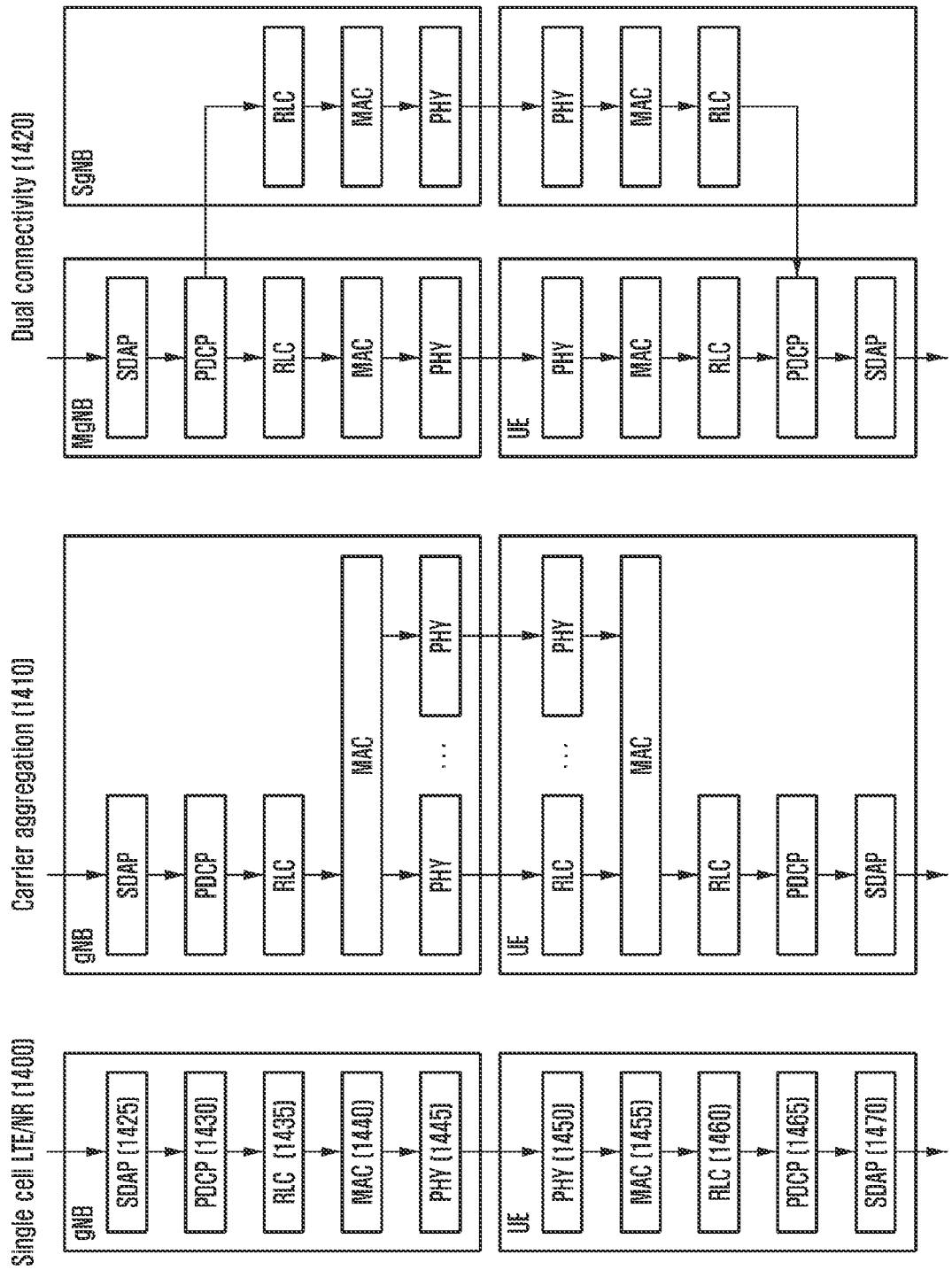
FIG. 14 illustrates a wireless protocol structure of a BS and a UE in single cell, carrier aggregation (CA), and dual connectivity (DC) in a wireless communication system according to an embodiment.

FIG. 14 illustrates a wireless protocol structure of a BS and a UE in single cell, CA, and DC in a wireless communication system according to an embodiment.

Referring to FIG. 14, a wireless protocol of a wireless communication system includes an NR service data adaptation protocol (SDAP) 1425 or 1470, an NR packet data convergence protocol (PDCP) 1430 or 1465, an NR radio link control (RLC) 1435 or 1460, and an NR MAC 1440 or 1455 in each of the UE and the NR gNB.

Functions of the NR SDAP 1425 or 1470 may include some of the following functions.
  User data transmission function (transfer of user-plane data)
  Function of mapping quality of service (QoS) flow and a data bearer for UL and DL (mapping between a QoS flow and a data radio bearer (DRB) for both DL and UL)
  Function of marking a QoS flow ID for uplink and downlink (marking QoS flow ID in both DL and UL packets)
  Function of mapping reflective QoS flow to a data bearer for uplink (UL) SDAP protocol data units (PDUs) (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

Functions of the NR PDCP 1430 or 1465 may include some of the following functions
  Header compression and decompression function (header compression and decompression: Robust header compression (ROHC) only)
  User data transmission function (transfer of user data)
  Sequential delivery function (in-sequence delivery of upper-layer PDUs)
  Non-sequential delivery function (out-of-sequence delivery of upper-layer PDUs)
  Reordering function (PDCP PDU reordering for reception)
  Duplicate detection function (duplicate detection of lower-layer service data units (SDUs))
  Retransmission function (retransmission of PDCP SDUs)
  Ciphering and deciphering function (Ciphering and deciphering)
  Timer-based SDU removal function (timer-based SDU discard in uplink)

The reordering function of the NR PDCP layer device is a function of sequentially reordering PDCP PDUs received from a lower layer based on a PDCP sequence number (SN), and may include a function of sequentially transferring the reordered data to a higher layer The reordering function of the NR PDCP layer device may include a function of directly transmitting data regardless of the sequence, a function of recording PDCP PDUs lost due to the reordering, a function of reporting statuses of the lost PDCP PDUs to a transmitting side, and a function of making a request for retransmitting the lost PDCP PDUs.

Functions of the NR RLC 1435 or 1460 may include some of the following functions.
  Data transmission function (transfer of upper-layer PDUs)
  Sequential delivery function (in-sequence delivery of upper-layer PDUs)
  Non-sequential delivery function (out-of-sequence delivery of upper-layer PDUs)
  Automatic repeat request (ARQ) function (error correction through ARQ)
  Concatenation, segmentation, and reassembly function (concatenation, segmentation and reassembly of RLC SDUs)
  Re-segmentation function (re-segmentation of RlX data PDUs)
  Reordering function (reordering of RLC data PDUs)
  Duplicate detection function (duplicate detection)
  Error detection function (protocol error detection)
  RLC SDU deletion function (RLC SDU discard)
  RLC reestablishment function (RLC reestablishment)

The sequential delivery function (in-sequence delivery) of the NR RLC layer device is a function of sequentially transmitting RLC SDUs received from a lower layer to the higher layer. When an original RLC SDU is divided into a plurality of RLC SDUs and then received, the sequential delivery function (in-sequence delivery) of the NR RLC layer device may include a function of reassembling and transmitting the RLC SDUs, a function of reordering the received RLC PDUs based on an RLC SN or a PDCP SN, a function of recording RLC PDUs lost due to the reordering, a function of reporting statuses of the lost RLC PDUs to a transmitting side, and a function of making a request for retransmitting the lost RLC PDUs. When there are lost RLC SDUs, the sequential delivery function of the NR RLC layer device may include a function of sequentially transferring only RLC SDUs preceding the lost RLC SDUs to the higher layer or a function of, if a predetermined timer expires even though there are lost RLC SDUs, sequentially transferring all RLC SDUs received before the tinier starts to the higher layer.

Alternatively, the sequential delivery function of the NR RLC layer device may include a function of, if a predetermined timer expires even though there are lost RLC SDUs, sequentially transferring all RLC SDUs received up to now to the higher layer. Further, the NR RLC device may process the RLC PDUs sequentially in the order of reception thereof (e.g., according to an arrival order regardless of a serial number or an SN) and may transfer the RLC PDUs to the PDCP device regardless of the sequence thereof (out-of-sequence delivery).

In the case of segments, the NR RLC device may receive segments that are stored in the buffer or are to be received in the future, reconfigure the segments to be one RLC PDU, process the RLC PDU, and then transmit the same to the PDCP device. The NR RLC layer device may not include a concatenation function, and the function may be performed by the NR MAC layer, or may be replaced with a multiplexing function of the NR MAC layer.

The non-sequential function (out-of-sequence delivery) of the NR RLC layer device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RlX PDUs, reordering the RLC PDUs, and recording lost RLC PDUs.

The NR MAC 1410 or 1455 may be connected to a plurality of NR RLC layer devices configured in one UE and main functions of the NR MAC may include some of the following functions.

Mapping function (Mapping between logical channels and transport channels)
Multiplexing and demultiplexing function (multiplexing/demultiplexing of MAC SDUs)
Scheduling information report function (scheduling information reporting)
HARQ function (error correction through HARQ)
Logical channel priority control function (priority handling between logical channels of one UE)
UE priority) function (priority handling between UEs by use of dynamic scheduling)
Multimedia broadcast multicast service (MBMS) service identification function (MBMS service identification)
Transport format selection function (transport format selection)
Padding function (padding)

The NR PHY layer 1445 or 1450 may perform an operation for channel-coding and modulating higher-layer data to generate an OFDM symbol and may transmit the OFDM symbol through a radio channel or demodulate and channel-decode the OFDM symbol received through the radio channel and transmit the demodulated and channel-decoded OFDM symbol to the higher layer.

A detailed structure of the wireless protocol structure may be variously changed according to a carrier (or cell) operation scheme. For example, when the BS transmits data to the UE based on a single carrier (or cell), the BS and the UE use a protocol structure having a single structure for each layer as indicated by reference numeral 1400. However, when the BS transmits data to the UE based on CA using multiple carriers in a single transmission reception point (TRP), the BS and the UE may use a protocol structure in which layers up to an RLC have a single structure, but the PHY layer is multiplexed through the MAC layer as indicated by reference numeral 1410. As another example, when the BS transmits data to the LE based on DC using multiple carriers in multiple TRPs, the BS and the UE may use a protocol structure in which layers up to an RLC have a single structure, but the PHY layer is multiplexed through the MAC layer as indicated by reference numeral 1420.

Non-Coherent-Joint Transmission (NC-JT)-Related

According to an embodiment of the disclosure, in order to receive a PDSCH from a plurality of TRPs, a UE may use NC-JT.

A wireless communication system according to an embodiment of the disclosure may support all of the service having very short transmission latency and the service requiring a high connectivity density as well as the service requiring a high transmission rate, unlike conventional systems. In a wireless communication network including a plurality of cells, TRPs, or beams, cooperative communication (coordinated transmission) between respective cells. TRPs, or/and beams may satisfy various service requirements by increasing the strength of a signal received by the UE or efficiently controlling interference between the cells, TRPs, or/and beams.

JT is a representative transmission technology for the cooperative communication and may increase the strength of a signal received by the UE or throughput by transmitting signals to one UE through different cells, TRPs, or/and beams. A channel between each cell, TRP, or/and beam and the UE may have different characteristics, and particularly, NC-JT supporting non-coherent precoding between respective cells, TRPs, or/and beams may need individual precoding, MCS, resource allocation, and TCI indication according to the channel characteristics for each link between each cell, TRP, or/and beam and the UE.

The NC-JT may be applied to at least one of a downlink data channel (e.g., a PDSCH), a downlink control channel (e.g., a PDCCH), an uplink data channel (e.g., a PUSCH), and an uplink control channel (e.g., a PUCCH). In a PDSCH transmission, transmission information such as precoding, MCS, resource allocation, and TCI may be indicated through DL DCI, and should be independently indicated for each cell, TRP, or/and beam for the NC-JT. However, this may increase that payload required for DL DCI transmission, which may have a bad influence on reception performance of a PDCCH for transmitting the DCI. Accordingly, in order to support JT of the PDSCH, careful design tradeoff between an amount of DCI information and reception performance of control information is required.

Figure 15:
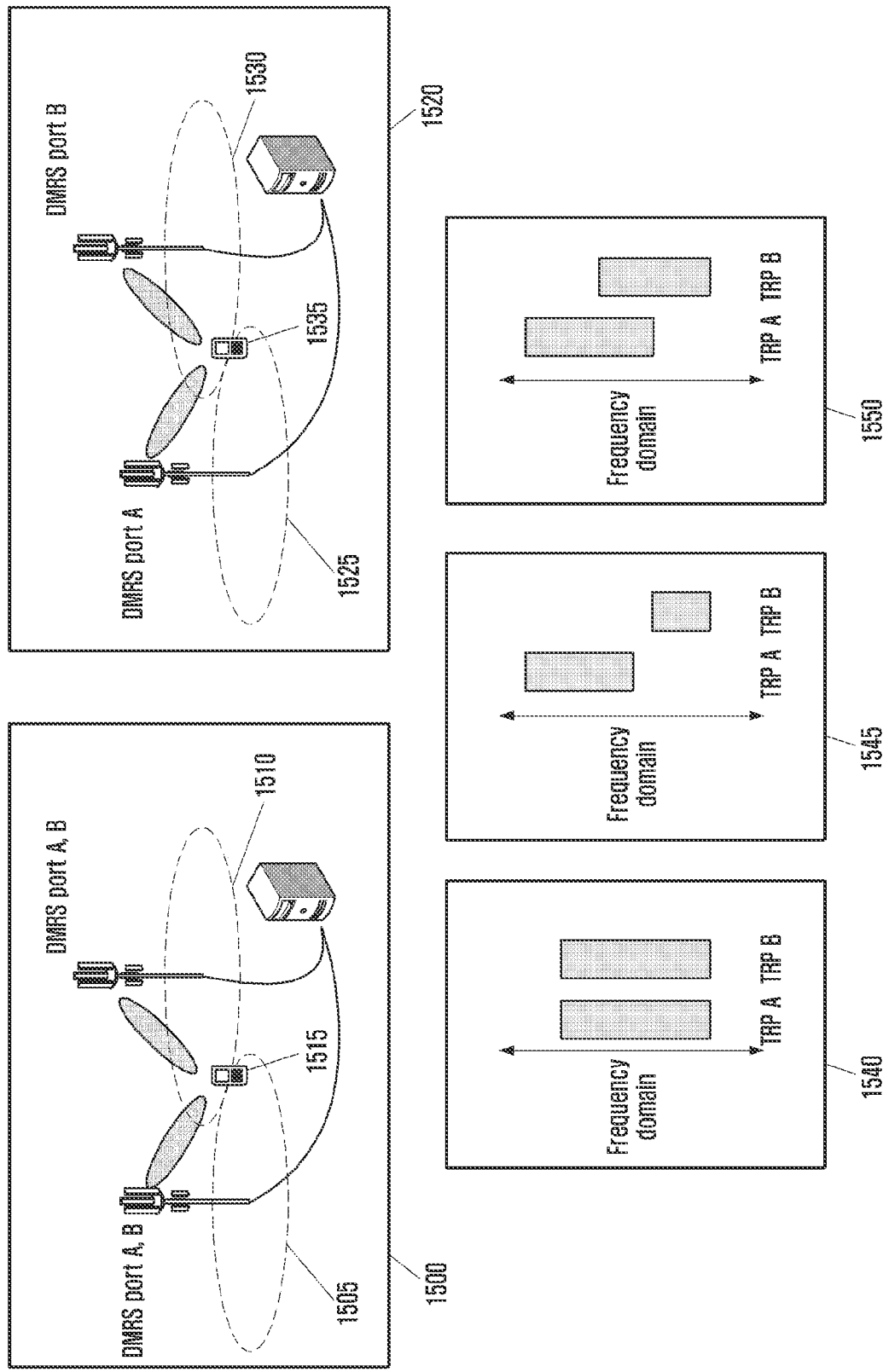
FIG. 15 illustrates antenna ports and resource allocation for cooperative communication in a wireless communication system according to an embodiment.

FIG. 15 illustrates antenna ports and resource allocation for cooperative communication in a wireless communication system according to an embodiment. Specifically, in FIG. 15, the example for PDSCH transmission is described for each scheme of JT, and examples for allocating radio resources for each TRP are described.

Referring to FIG. 15, an example 1500 of coherent JT (C-JT) supporting coherent precoding between respective cells, TRPs, or/and beams is illustrated.

In the case of C-HT, a TRP A N 1505 and a TRP B 1510 transmit single data (e.g., a PDSCH) to a UE 1515, and the plurality of TRPs may perform joint precoding. Accordingly, the TRP A 1505 and the TPR B 1510 may transmit DMRSs through the same DMRS ports in order to transmit the same PDSCH. For example, the TRP A 1505 and the TPR B 1510 may transmit DMRSs to the UE through a DMRS port A and a DMRS port B, respectively. In this case, the UE may receive one piece of DCI information for receiving one PDSCH demodulated based on the DMRSs transmitted through the DMRS port A and the DMRS port B.

FIG. 15 also illustrates an example 1520 of NC-JT supporting non-coherent precoding between respective cells, TRPs, or/and beams for PDSCH transmission.

In the case of NC-JT, the PDSCH is transmitted to a UE 1535 for each cell, TPR, or/and beam, and individual precoding may be applied to each PDSCH. Respective cells, TRPs, or/and beams may transmit different PDSCHs or different PDSCH layers to the UE, thereby improving throughput compared to single cell, TRP, or/and beam transmission. Further, respective cells, TRPs, or/and beams may repeatedly transmit the same PDSCH to the UE, thereby improving reliability compared to single cell, TRP, or/and beam transmission. For convenience of description, the cell, TRP, or/and beam are commonly referred to as a TRP.

Various wireless resource allocations such as the case 1540 in which frequency and time resources used by a plurality of TRPs for PDSCH transmission are the same, the case 1545 in which frequency and time resources used by a plurality of TRPs do not overlap at all, and the case 1550 in which some of the frequency and time resources used by a plurality of TRPs overlap each other may be considered.

In order to support NC-JT, DCIs in various forms, structures, and relations may be considered to simultaneously allocate a plurality of PDSCHs to one UE.

Figure 16:
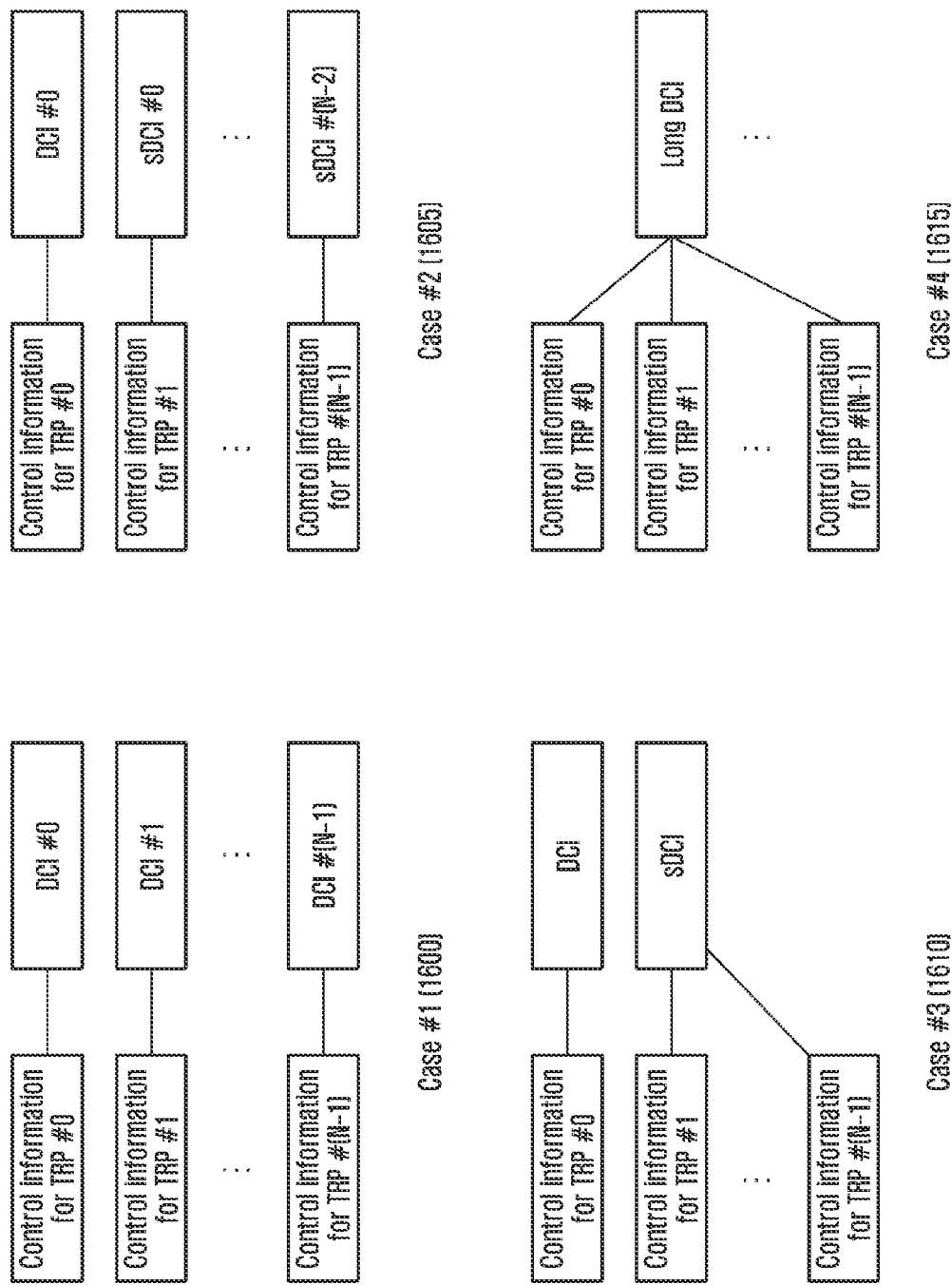
FIG. 16 illustrates a configuration of downlink control information (DCI) for cooperative communication in a wireless communication system according to an embodiment.

FIG. 16 illustrates DCI for cooperative communication in a wireless communication system according to an embodiment. Specifically, FIG. 16 illustrates DCI for NC-JT in which respective TRPs transmit different PDSCHs or different PDSCH layers to a UE in a wireless communication system.

Referring to FIG. 16, case #1 1600 is an example in which control information for PDSCHs transmitted from (N−1) additional TRPs is transmitted independently from control information for a PDSCH transmitted by a serving TRP in a situation in which (N−1) different PDSCHs are transmitted from the (N−1) additional TRPs (TRP #1 to TRP # (N−1)) other than the serving TRP (TRP #0) used for single PDSCH transmission. That is, the UE may acquire control information for PDSCHs transmitted from different TRPs (TRP #0 to TRP #(N−1)) through independent DCIs (DCI #0 to DCI #(N−1)). Formats between the independent DCIs may be the same as or different from each other, and payload between the DCIs may also be the same as or different from each other. In case #1, a degree of freedom of PDSCH control or allocation can be completely guaranteed, but when respective pieces of DCI are transmitted by different TRPs, a difference between DCI coverages may be generated and reception performance may deteriorate.

Case #2 1605 is an example in which pieces of control information for PDSCHs of (N−1) additional TRPs are transmitted and each piece of the DCI is dependent on control information for the PDSCH transmitted from the serving TRP in a situation in which (N−1) different PDSCHs are transmitted from (N−1) additional TRPs (TRP #1 to TRP #(N−1)) other than the serving TRP (TRP #0) used for single PDSCH transmission.

For example, DCI #0, which is control information for a PDSCH transmitted from the serving TRP (TRP #0), may include all information elements (IEs) of DCI format 1_0, DCI format 1_1, and DCI format 1_2, but shortened (supplementary or secondary) DCIs (sDels) (sDCI #0 to sDCI #(N−2)) that are control information for PDSCHs transmitted from the cooperative TRPs (TRP #1 to TRP #(N−1)) may include only some of the IEs of DCI format 1_0, DCI format 1_1, and DCI format 1_2. Accordingly, the sDCI for transmitting control information of PDSCHs transmitted from cooperative TPRs have smaller payload compared to the normal DCIs (nDCIs) for transmitting control information related to the PDSCH transmitted from the serving TRP, and thus, can include reserved bits compared to the nDCI.

In case #2 1605, a degree of freedom of each PDSCH control or allocation may be limited according to content of IEs included in the sDCI, but reception capability of the sDCI is better than the nDCI, and thus a probability of the generation of difference between DCI coverages may become lower.

Case #3 1610 is an example in which one piece of control information for PDSCHs of (N−1) additional TRPs is transmitted and the DCI is dependent on control information for the PDSCH transmitted from the serving TRP in a situation in which (N−1) different PDSCHs are transmitted from (N−1) additional TRPs (TRP #1 to TRP # (N−1)) other than the serving TRP (TRP #0) used for single PDSCH transmission.

For example, in the case of DCI #0 that is control information for the PDSCH transmitted from the serving TRP (TRP #0), all IEs of DCI format 1_0, DCI format 1_1, and DCI format 1_2 may be included, and in the case of control information for PDSCHs transmitted from cooperative TRPs (TRP #1 to TRP #(N−1)), only some of the IEs of DCI format 1_0, DCI format 1_1, and DCI format 1_2 may be gathered in one "shortened (or secondary)" DCI (sDCI) and transmitted. For example, the sDCI may include at least one piece of HARQ-related information such as frequency domain resource assignment and time domain resource assignment of the cooperative TRPs and the MCS. In addition, information that is not included in the sDCI, such as a RWP indicator and a carrier indicator, may follow DCI (DCI #0, normal DCI, or nDCI) of the serving TRP.

In case #3 1610, a degree of freedom of PDSCH control or allocation may be limited according to content of the IEs included in the sDCI, but reception performance of the sDCI can be controlled, and case #3 1610 may have smaller complexity of DCI blind decoding of the UE compared to case #1 1600 or case #2 1605.

Case #4 1615 is an example in which control information for PDSCHs transmitted from (N−1) additional TRPs is transmitted in DCI (long DCI) that is the same as that of control information for the PDSCH transmitted from the serving TRP in a situation in which different (N−1) PDSCHs are transmitted from the (N−1) additional TRPs (TRP #1 to TRP # (N−1)) other than the serving TRP (TRP #0) used for single PDSCH transmission. That is, the UE may acquire control information for PDSCHs transmitted from different TRPs (TRP #0 to TRP #(N−1)) through single DCI. In case #4 1615, complexity of DCI blind decoding of the UE may not increase, but a degree of freedom of PDSCH control or allocation may be low since the number of cooperative TRPs is limited according to long DCI payload restriction.

In the following description and embodiments, the sDCI may refer to various pieces of supplementary DCI, such as shortened DCI, secondary DCI, or normal DCI (DCI formats 1_0 and 1_1) including PDSCH control information transmitted in the cooperative TRP, and unless specific restriction is mentioned, the corresponding description may be similarly applied to the various pieces of supplementary DCI.

In the following description and embodiments, case #1 1600, case #2 1605, and case #3 1610 in which one or more pieces of DCI (or PDCCHs) are used to support NC-JT may be classified as multiple PDCCH-based NC-JT and case #4 1615 in which single DCI (or PDCCH) is used to support NC-JT may be classified as single PDCCH-based NC-JT. In multiple PDCCH-based PDSCH transmission, a CORESET for scheduling DCI of the serving TRP (TRP #0) is separated from CORESETs for scheduling DCI of cooperative TRPs (TRP #1 to TRP #(N−1)).

A method of distinguishing the CORESETs may include a distinguishing method through a higher-layer indicator for each CORESET and a distinguishing method through a beam configuration for each CORESET. Further, in single PDCCH-based NC-JT, single DCI schedules a single PDSCH having a plurality of layers instead of scheduling a plurality of PDSCHs, and the plurality of layers may be transmitted from a plurality of TRPs. Association between a layer and a TRP transmitting the corresponding layer may be indicated through a TCI for the layer.

In embodiments of the disclosure, the "cooperative TRP" may be replaced with various terms such as a "cooperative panel" or a "cooperative beam" when actually applied.

In embodiments of the disclosure, "the case in which NC-JT is applied" may be variously interpreted as "the case in which the UE simultaneously receives one or more PDSCHs in one BWP", "the case in which the UE simultaneously receives PDSCHs based on two or more TCIs in one BWP", and "the case in which the PDSCHs received by the UE are associated with one or more DMRS port groups" according to circumstances, but is used by one expression for convenience of description.

A wireless protocol structure for NC-JT may be variously used according to a TRP development scenario. For example, when there is no backhaul delay between cooperative TRPs or there is a small backhaul delay, a method (e.g., a CA-like method) using a structure based on MAC layer multiplexing can be used similarly to reference numeral 1410 of FIG. 14. However, when the backhaul delay between cooperative TRPs is too large to be ignored (e.g., when a time of 2 ms or longer is needed to exchange information such as CSI, scheduling, and HARQ-ACK between cooperative TRPs), method (e.g., a DC-like method) of securing a characteristic robust to a delay can be used through an independent structure for each TRP from an RLC layer similarly to reference numeral 1420 of FIG. 14.

The UE supporting C-JT/NC-JT may receive a C-JT/NC-JT-related parameter or a setting value from a higher-layer configuration and set an RRC parameter of the UE on the basis thereof. For the higher-layer configuration, the UE may use a UE capability parameter, for example, tci-StatePDSCH. The UE capability parameter, e.g., tci-StatePDSCH may define TCI states for PDSCH transmission, the number of TCI states may be configured as 4, 8, 16, 32, 64, and 128 in FR1 and as 64 and 128 in FR2, and a maximum of 8 states which can be indicated by 3 bits of a TCI field of the DCI may be configured through a MAC CE message among the configured numbers. A maximum value 128 is a value indicated by maxNumberConfiguredTCistatesPerCC within the parameter tci-StatePDSCH which is included in capability signaling of the UE. As described above, a series of configuration processes from the higher-layer configuration to the MAC CE configuration may be applied to a beamforming indication or a beamforming change command for at least one PDSCH in one TRP.

Multi-DCI-Based Multi-TRP

According to an embodiment of the disclosure, a downlink control channel for NC-JT may be configured based on a multi-PDCCH.

In NC-JT based on multiple PDCCHs, there may be a CORESET or a search space separated for each TRP when DCI for scheduling the PDSCH of each TRP is transmitted. The CORESET or the search space for each TRP can be configured as in at least one of the following cases.

A configuration of a higher-layer index for each CORESET: CORESET configuration information configured by a higher layer may include an index value, and a TRP for transmitting a PDCCH in the corresponding CORESET may be identified by the configured index value for each CORESET. That is, in a set of CORESETs having the same higher-layer index value, it may be considered that the same TRP transmits the PDCCH or the PDCCH for scheduling the PDSCH of the same TRP is transmitted. The index for each CORESET may be named CORESETPoolIndex, and it may be considered that the PDCCH is transmitted from the same TRP in CORESETs in which the same CORESETPoolIndex value is configured. In the CORESET in which the same CORESETPoolIndex value is not configured, it may be considered that a default value of CORESETPoolIndex is configured, and the default value may be 0.

A configuration of multiple PDCCH-Config: a plurality of PDCCH-Config are configured in one BWP, and each PDCCH-Config may include a PDCCH configuration for each TRP. That is, a list of CORESETs for each TRP and/or a list of search spaces for each TRP may be included in one PDCCH-Config, and one or more CORESETs and one or more search spaces included in one PDCCH-Config may be considered to correspond to a specific TRP.

A configuration of a CORESET beam/beam group: a TRP corresponding to the corresponding CORESET may be identified through a beam or a beam group configured for each CORESET. For example, when the same TCI state is configured in a plurality of CORESETs, it may be considered that the corresponding CORESETs are transmitted through the same TRP or a PDCCH for scheduling a PDSCH of the same TRP is transmitted in the corresponding CORESET.

A configuration of a search space beam/beam group: a beam or a beam group is configured for each search space, and a TRP for each search space may be identified therethrough. For example, when the same beam/beam group or TCI state is configured in a plurality of search spaces, it may be considered that the same TRP transmits the PDCCH in the corresponding search space or a PDCCH for scheduling a PDSCH of the same TRP is transmitted in the corresponding search space.

As described above, by separating the CORESETs or search spaces for each TRP, it is possible to divide PDSCHs and HARQ-ACKs for each TRP and accordingly to generate an independent HARQ-ACK codebook for each TRP and use an independent PUCCH resource.

The configuration may be independent for each cell or BWP. For example, while two different CORESETPoolIndex values may be configured in a primary cell (PCell), no CORESETPoolIndex value may be configured in a specific SCell. In this case, it may be considered that NC-JT is configured in the PCell, but NC-JT is not configured in the SCell in which no CORESETPoolIndex value is configured.

Single-DCI-Based Multi-TRP

According to an embodiment of the disclosure, a downlink beam for NC-JT may be configured based on a single PDCCH.

In single PDCCH-based NC-JT, a PDSCH transmitted by a plurality of TRPs may be scheduled by one piece of DCI. As a method of indicating the number of TRPs transmitting the corresponding PDSCHs, the number of TCI states may be used. That is, single PDCCH-based NC-JT may be considered when the number of TCI states indicated by DCI for scheduling the PDSCHs is 2, and single-TRP transmission may be considered when the number of TCI states is 1. The TCI states indicated by the DCI may correspond to one or two TCI states among TCI states activated by the MAC CE. When the TCI states of DCI correspond to two TCI states activated by the MAC CE, a TCI codepoint indicated by the DCI is associated with the TCI states activated by the MAC CE, in which case the number of TCI states activated by the MAC CE, corresponding to the TCI codepoint, may be 2.

The configuration may be independent for each cell or BWP. For example, while a maximum number of activated TCI states corresponding to one TCI codepoint is 2 in the PCell, a maximum number of activated Tel states corresponding to one TCI codepoint may be 1 in a specific SCell. It may be considered that NC-JT is configured in the PCell but NC-JT is not configured in the SCell.

Referring to the PDCCH and beam configuration-related description, PDCCH repetitive transmission is not supported in current Rel-15 and Rel-16 NR, and thus, it is difficult to achieve required reliability in a scenario requiring high reliability such as URLLC. Accordingly, the disclosure provides a method of improving PDCCH reception reliability of the UE by providing a PDCCH repetitive transmission method through a plurality of TRPs.

In the following description, a cell, a TRP, a panel, a beam, or/and a transmission direction distinguished by an indicator such as a higher layer/L1 parameter of a TCI state and spatial relation information, a cell ID, a TRP ID, or a panel ID is commonly described as a TRP. Accordingly, in the actual application, the TRP can be appropriately replaced with one of the terms.

When determining whether to apply cooperative communication, a UE can use various methods by which PDCCH(s) allocating PDSCHs to which cooperative communication is applied have specific formats, PDCCH(s) allocating PDSCHs to which cooperative communication is applied include a specific indicator informing of whether cooperative communication is applied, PDCCH(s) allocating PDSCHs to which cooperative communication is applied are scrambled by a specific RNTI, or the application of cooperative communication to a specific section indicated by a higher layer is assumed. Thereafter, reception of, by the UE, a PDSCH to which cooperative communication is applied based on conditions similar to the above conditions is referred to as an NC-JT case.

Although embodiments of the disclosure are described with an example of the 5G system, the embodiments may be applied to other communication systems having a similar technical background or channel form. For example, a mobile communication technology developed after LTE or LTE-A mobile communication and 5G may be included therein. Accordingly, embodiments of the disclosure may be applied to other communication systems through some modifications without departing from the scope of the disclosure based on a determination of those skilled in the art. The content in the disclosure can be applied to FDD and TDD systems.

In the following description of the disclosure, higher-layer signaling may correspond to at least one of or a combination of one or more of the following signaling.
MIB
SIB or SIB X (X=1, 2, . . . )
RRC
MAC CE L1 signaling may correspond to at least one of or a combination of one or more of signaling methods using the following physical layer channels or signaling.
PDCCH
DCI
UE-specific DCI
Group common DCI
Common DCI
Scheduling DCI (e.g., DCI used to schedule DL or UL data)
Non-scheduling DCI (e.g., Del other than DCI used to schedule downlink or uplink data)
PUCCH
UCI (uplink control information)

Herein, PDCCH transmission or reception may include DCI transmission or reception through the PDCCH. PDSCH transmission or reception may include data transmission or reception through the PDSCH, and PDSCH transmission or reception may include data transmission or reception through the PDSCH.

Hereinafter, determining priorities of A and B in the disclosure may be variously expressed as selecting one having a higher priority according to a predetermined priority rule and performing an operation corresponding thereto or omitting (or dropping) an operation for one having a lower priority.

Embodiment 1: Multi-TRP-Based PDCCH Repetitive Transmission Method

In a PDCCH repetitive transmission considering multiple TRPs, there may be various methods of how to apply each TCI state to be applied for PDCCH transmission by each TRP to various parameters used for PDCCH transmission. For example, various parameters used for PDCCH transmission to which different TCI states are applied may include a CCE, a PDCCH candidate, a CORESET, and a search space. In PDCCH repetitive transmission considering multiple TRPs, a reception scheme of the UE may include soft combining and a selection scheme.

For PDCCH repetitive transmission through multiple TRPs, five (5) methods are described below, and a BS may configure at least one the five methods in the UE through higher-layer signaling, indicate the same through L1 signaling, or configure and indicate the same through a combination of higher-layer signaling and L1 signaling. The following methods are only examples and the disclosure is not limited thereto. That is, PDCCH repetitive transmission according to the disclosure may be performed based on a method obtained by combining the following methods.
Method 1-1: Repetitive Transmission Method of Multiple PDCCHs Having Same Payload Method 1-1 includes repeatedly transmitting a plurality of pieces of control information having the same DCI format and the same payload. The control information may indicate information for scheduling repeatedly transmitted PDSCHs, e.g., {PDSCH #1, PDSCH #2, . . . , PDSCH #Y} repeatedly transmitted over a plurality of slots. The same payload of repeatedly transmitted control information may mean that all of pieces of PDSCH scheduling information of control information, e.g., the number of PDSCH repetitive transmissions, time axis PDSCH resource allocation information, that is, a slot offset ($K_0$) between control information and PDSCH #1 and the number of PDSCH symbols, frequency axis PDSCH resource allocation information, DMRS port allocation information, PDSCH-to-HARQ-ACK timing, and a PUCCH resource indicator are the same as each other. The UE may improve reception reliability of control information by soft-combining repetitive transmission control information having the same payload.

In order to perform soft combining, the UE should know in advance the resource location of control information to be repeatedly transmitted and the number of repetitive transmissions. To this end, the BS may indicate in advance time domain, frequency domain, and spatial domain resource configurations of the repeatedly transmitted control information. When control information is repeatedly transmitted in the time axis, the control information may be repeatedly transmitted over different CORESETs, repeatedly transmitted over different search space sets within one CORESET, or repeatedly transmitted over different PDCCH monitoring occasions within one CORESET and one search space set. The unit of resources repeatedly transmitted in the time axis (CORESET unit, search space set unit, or PDCCH monitoring occasion unit) and the location of repetitive transmission resources (e.g., a PDCCH candidate index) may be indicated through a higher-layer configuration of the BS. The number of PDCCH repetitive transmissions and/or a list of TRPs participating in repetitive transmission, and a transmission pattern may be explicitly indicated, and a higher-layer indication or a MAC-CE/L1 signaling may be used as an explicit indication method. The list of TRPs may be indicated by the TCI state or in the form of QCL, assumption.

When control information is repeatedly transmitted in the frequency axis, the control information may be repeatedly transmitted over different CORESETs, repeatedly transmitted over different PDCCH candidates within one CORESET, or repeatedly transmitted for each CCE. The unit of resources repeatedly transmitted in the frequency axis and the location of resources of repetitive transmission may be indicated through a higher-layer configuration. Further, the number of repetitive transmissions and/or a list of TRPs participating in repetitive transmission, and a transmission pattern may be explicitly indicated, and a higher-layer indication or a MAC-CE/L1 signaling may be used as an explicit indication method. The list of TRPs may be indicated by the TCI state or in the form of QCL assumption.

When control information is repeatedly transmitted in the spatial axis, the control information may be repeatedly transmitted over different CORESETs or two or more TCI states may be configured in one CORESET and the control information may be repeatedly transmitted.

Method 1-2: Method of Repeatedly Transmitting Plurality of Pieces of Control Information Having Different DCI Formats and/or Payloads Method 1-2 includes repeatedly transmitting a plurality of pieces of control information having the different DCI formats and/or payloads. The control information schedules repetitive transmission PDSCHs, and the number of PDSCH repetitive transmissions indicated by each pieces of the control information may be different. For example, while PDCCH #1 may indicate information scheduling {PDSCH #1, PDSCH #2, . . . , PDSCH #Y}, PDCCH #2 may indicate information scheduling {PDSCH #2, . . . , PDSCH #Y}, . . . , and PDCCH #X may indicate information scheduling {PDSCH Y}. The method of repeatedly transmitting the control information has an advantage of reducing a total of delay time required for control information and PDSCH repetitive transmission compared to Method 1-1.

Using Method 1-2, the UE may not need to know in advance the location of resources of control information to be repeatedly transmitted and the number of repetitive transmissions, and may independently decode and process each piece of the repeatedly transmitted control information. When the UE decodes a plurality of pieces of repeatedly transmitted control information scheduling the same PDSCH, only the first repeatedly transmitted control information may be processed and the other repeatedly transmitted control information from the second control information may be ignored.

Alternatively, the BS may indicate in advance the location of resources of control information to be repeatedly transmitted and the number of repetitive transmissions, and an indication method may be the same as the method described in Method 1-1.

Method 1-3: Method of Repeatedly Transmitting Each Piece of Plurality of Control Information Having Different DCI Formats and/or Payloads Method 1-3 includes repeatedly transmitting each piece of a plurality of control information having different DCI formats and/or payloads. Each piece of repeatedly transmitted control information may have the same DCI format and payload. Since the plurality of pieces of control information in Method 1-2 may not be soft-combined, it may have lower reliability than Method 1-1, and Method 1-1 may have a longer total delay time required for control information and PDSCH repetitive transmission. Method 1-3 uses advantages of Method 1-1 and Method 1-2 and may transmit control information with higher reliability compared to Method 1-2, while reducing the total delay time required for control information and PDSCH repetitive transmission compared to Method 1-1.

In order to decode and soft-combine repeatedly transmitted control information, Method 1-3 may use the soft combining of Method 1-1 and individual decoding of Method 1-2. For example, in repetitive transmission of a plurality of pieces of control information having different DCI formats and/or payload, the first transmitted control information may be decoded through Method 1-2 and repetitive transmission of the decoded control information may be soft-combined through Method 1-1.

The BS may select and configure one of Method 1-1, Method 1-2, or Method 1-3 for repetitive transmission of control information. The method of repeatedly transmitting control information may be explicitly indicated to the UE by the BS through higher-layer signaling.

Alternatively, the method of repeatedly transmitting control information may be indicated after a combination with other configuration information. For example, a higher-layer configuration indicating the PDSCH repetitive transmission scheme may be combined with an indication of control information repetitive transmission. When repetitive transmission of the PDSCH in a frequency division multiplexing (FDM) scheme is indicated, it may be interpreted that control information is repeatedly transmitted only through Method 1-1, because there is no reduction in the delay time for PDSCH repetitive transmission in the FDM scheme by Method 1-2. For similar reasoning, when repetitive transmission of the PDSCH in an intra-slot TDM scheme is indicated, it may be interpreted that control information is repeatedly transmitted through Method 1-1. However, when repetitive transmission of the PDSCH in an inter-slot TDM scheme is indicated, Method 1-1, Method 1-2, or Method 1-3 for control information repetitive transmission may be selected through higher-layer signaling or L1 signaling.

The BS may explicitly indicate the unit of control information repetitive transmission to the UE through a configuration such as higher layer.

Alternatively, the unit of control information repetitive transmission may be combined with other configuration information and indicated. For example, the higher-layer configuration indicating the PDSCH repetitive transmission scheme may be combined with the unit of control information repetitive transmission. When repetitive transmission of the PDSCH in the FDM scheme is indicated, it may be interpreted that control information is repeatedly transmitted in an FDM or space-division multiplexing (SDM) scheme, because, if control information is repeatedly transmitted in the inter-slot TDM scheme, there is no reduction in the delay time by the PDSCH repetitive transmission in the FDM scheme. For similar reasoning, when repetitive transmission of the PDSCH in the intra-slot TDM scheme is indicated, it may be interpreted that control information is repeatedly transmitted in a TDM, FDM or SDM scheme. However, when repetitive transmission of the PDSCH in the inter-slot TDM scheme is indicated, higher-layer signaling may be selected for repetitive transmission of control information in the inter-slot TDM scheme or the intra-slot TDM, FDM, or SDM scheme.

Method 1-4: PDCCH Transmission Scheme Applying Respective TCI States to Different CCEs within Same PDCCH Candidate Group In order to improve reception performance of the PDCCH without PDCCH repetitive transmission, Method 1-4 may perform transmission after applying different TCI states, resulting in transmission from multiple TRPs to different CCEs within a PDCCH candidate group. The corresponding scheme is not PDCCH repetitive transmission, but is transmission after the application of different TCI states to different CCEs within a PDCCH candidate group by respective TRPs, and thus, may acquiring spatial diversity within the PDCCH candidate group. Different CCEs to which different TCI states are applied may be separated in a time or frequency dimension, and the UE should know in advance the location of resources to which different TCI states are applied. The UE may receive different CCEs to which different TCI states are applied within the same PDCCH candidate group, and independently decode the CCEs or simultaneously decode the CCEs.

Method 1-5: PDCCH Transmission Scheme Applying a Plurality of TCI States to all CCEs within Same PDCCH Candidate (SFN Scheme)

In order to improve PDCCH reception performance without PDCCH repetitive transmission, Method 1-5 may perform transmission in an SFN scheme after the application of a plurality of TCI states to all CCEs within the PDCCH candidate group. The corresponding scheme is not PDCCH repetitive transmission, but acquires spatial diversity through SFN transmission at the same CCE location within the PDCCH candidate group. The UE may receive CCEs at the same location to which different TCI states are applied within the same PDCCH candidate group, and independently decode the CCEs by using some or all of the plurality of TO states or simultaneously decode the CCEs.

Embodiment 2: Limit on Maximum Number of PDCCH Candidate Groups and CCEs According to PDCCH Repetitive Transmission Method In accordance with an embodiment of the disclosure, a limit on the maximum number of PDCCH candidate groups and CCEs according to a PDCCH repetitive transmission method considering multiple TRPs is described. A UE may separately report a supportable method in Methods 1-1 to 1-5 for the PDCCH repetitive transmission of the BS through a UE capability. The UE may report information indicating whether to support soft combining for a UE reception scheme of PDCCH repetitive transmission through the UE capability. Further, the UE may report a UE capability for the limit on the maximum number of PDCCH candidate groups and the maximum number of CCEs according to PDCCH repetitive transmission. The corresponding UE capability may include limit for each slot, limit for each of a plurality of slots, limit for each span, and limit for each of a plurality of spans. Further, the UE may report a scheme for counting the number of PDCCH candidate groups and CCEs for the supportable method among the PDCH repetitive transmission methods through the UE capability.

The scheme for counting the number of PDCCH candidate groups and CCEs may vary depending on the UE capability report and a transmission condition of the BS.

Figure 17:
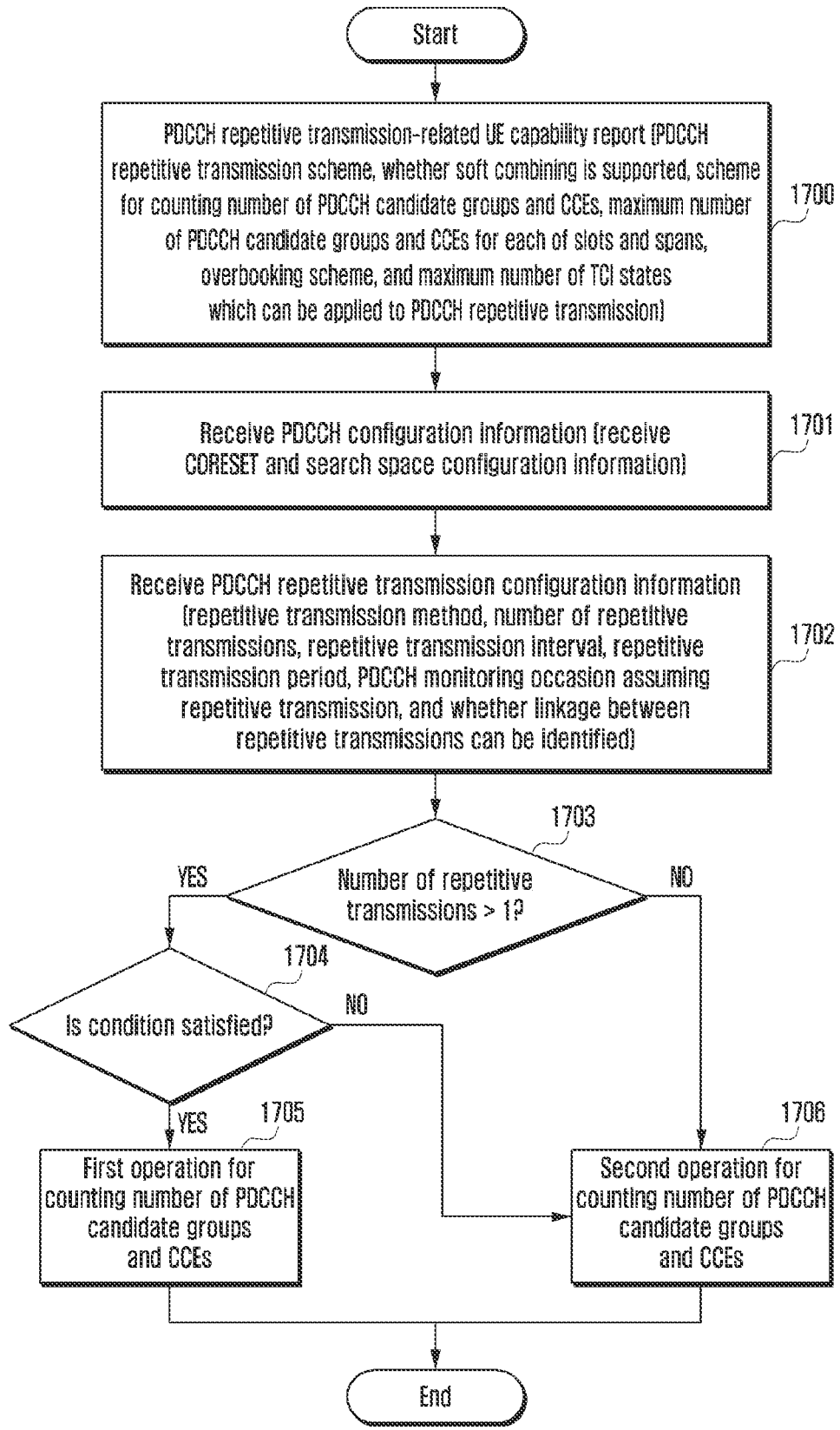
FIG. 17 is a flowchart illustrating an operation of a UE for counting a number of PDCCH candidate groups and a number of control channel elements (CCEs) according to a LTE capability report in PDCCH repetitive transmission and whether a BS transmission condition is satisfied in a wireless communication system according to an embodiment.

FIG. 17 is a flowchart illustrating an operation of a UE for counting a number of PDCCH candidate groups and a number of CCEs according to a UE capability report in PDCCH repetitive transmission and whether a BS transmission condition is satisfied in a wireless communication system according to an embodiment.

Referring to FIG. 17, in step 1700, the UE reports a UE capability related to PDCCH repetitive transmission to the BS. An available UE capability report may include information on at least one of a PDCCH repetitive transmission scheme (e.g., one of Method 1-1 to Method 1-5), whether soft combining according to PDCCH repetitive transmission is supported, PDCCH candidates, a method of counting the number of CCEs, a maximum number of PDCCH candidates and CCEs for each slot/a plurality of slots and for each span/a plurality of spans, the overbooking scheme, and a new UE processing capability. Alternatively, when information on the UE capability is preconfigured for the corresponding UE, step 1700 may be omitted. Also, when the same default information is applied as the information on the UE capability for UEs in a predetermined group, step 1700 may be omitted.

In step 1701, the UE receives first configuration information for the PDCCH from the BS.

In step 1702, the UE receives second configuration information for PDCCH repetitive transmission. The second configuration information may include at least one piece of information such as a repetitive transmission method, the number of repetitive transmissions, a repetitive transmission interval, a repetitive transmission period, a PDCCH monitoring occasion in which repetitive transmission is assumed, and whether linkage or association between repetitive transmissions can be identified. The UE may receive at least some pieces of the first configuration information and the second configuration information through L1 signaling or implicitly determine at least some pieces thereof based on other configuration information. Alternatively, the first configuration information and the second configuration information may be included in one piece of configuration information and provided to the UE.

In step 1703, the UE receiving the configuration information identifies whether the number N of repetitive transmissions is greater than 1 (N is an integer).

When the number of repetitive transmissions is larger than 1 in step 1703, the UE identifies whether a BS transmission condition is satisfied in step 1704. The transmission condition may be a combination of at least one of Condition 2-1 to Condition 2-4 as will be described below.

When the number of repetitive transmissions is not larger than 1 in step 1703 or when the BS transmission condition is not satisfied in step 1704, the UE operates using the conventional scheme for counting the number of PDCCH candidate groups and the number of CCEs (i.e., utilizes a second scheme for counting the number of PDCCH candidate groups and CCEs) in step 1706. The number of repetitive transmissions corresponding to only 1 in step 1703 indicates that repetitive transmission is not performed.

When the BS transmission condition is satisfied in step 1704, the UE utilizes a first scheme for counting the number of first PDCCH candidate groups and CCEs, i.e., counting the number of PDCCH candidate groups and the number of CCEs, in step 1705. That is, when the number of PDCCH candidate groups and the number of CCEs are counted by applying a new reference, one of Operation 1 to Operation 3 below may be applied if the number of PDCCH repetitive transmissions is N.

Operation 1: Number N of Repetitive Transmissions is Counted as 1

Even though the UE repeatedly transmit PDCCHs N times according to the UE capability, the UE may consider the N repetitive transmissions as 1 transmission and count the number of PDCCH candidates and the number of CCEs. For example, in two repetitive transmissions, the UE may consider two repeatedly transmitted PDCCHs as one PDCCH and count the number of PDCCHs.

Operation 2: Conventional Counting Scheme

For PDCCH candidates repeatedly transmitted N times, the UE may count the number of PDCCH candidate groups or the number of CCEs N times like the conventionally scheme based on the assumption that soft combining is not performed and individual (selective) decoding is performed. For example, in two repetitive transmissions, the UE may count the number of PDCCH candidate groups or the number of CCEs for two different PDCCHs as two.

Operation 3: Counting as 2N−1

The UE may count the number of N repetitive transmissions as 2N−1 based on the assumption that one counting is performed whenever soft combing is performed for a combination of at least one of PDCCH candidates repeatedly transmitted N times. For example, when the UE receives two PDCCH repetitive transmissions from the BS, the UE may separately count first transmission and second transmission and additionally count one more transmission based on the assumption of soft combining of the first transmission and the second transmission, and thus, count a total of 2*2−1=3.

Items that can be considered as conditions for counting the number of PDCCH candidate groups and the number of CCEs through the application of the operation for applying a new reference may be a combination of at least one of Condition 2-1 to Condition 2-4 below.

Condition 2-1: Whether Soft Combining is Supported

The UE may differently count the number of PDCCH candidate groups or the number of CCEs according to information indicating whether soft combining is supported transmitted to the BS through the capability report. For example, when the UE can support soft combining according to PDCCH repetitive transmission, the UE may select one of Operation 1 to Operation 3, and count the number of PDCCH candidate groups and the number of CCEs.

When the UE receives a configuration or an indication of PDCCH repetitive transmission in which soft combining is possible from the BS (e.g., the same DMRS location according to the same scrambling sequence and the same PDCCH candidate group location according to the same hash function result), the UE may select one of Operation 1 to Operation 3, and count the number of PDCCH candidate groups and the number of CCEs.

Condition 2-2: Existence or Nonexistence within Same/Different CORESET(s)

The UE may differently count the number of PDCCH candidate groups and the number of CCEs according to whether PDCCHs transmitted by PDCCH repetitive transmission from the BS exist within the same CORESET or different CORESETs. That is, the UE may select one of Operation 1 to Operation 3, and perform a count operation according to whether PDCCHs transmitted by PDCCH repetitive transmission from the BS exist within the same CORESET or different CORESET.

Condition 2-3: PDCCH Repetitive Transmission Scheme

The UE may differently count the number of PDCCH candidate groups and the number of CCEs according to the PDCCH repetitive transmission scheme (e.g., at least one of Method 1-1 to Method 1-5). When the PDCCH repetitive transmission schemes according to Method 1-1 and Method 1-3 in which soft combining is possible are configured in the UE and indicated to the UE by the BS and when the number of PDCCH candidate groups and the number of CCEs are counted for the repetitive transmission schemes according to Method 1-4 and Method 1-5, i.e., the PDCCH transmission schemes considering non-repetition-based multiple TRPs, the UE may apply a new reference (i.e., a first scheme for counting the number of PDCCH candidate groups and the number of CCEs) to the operation for counting the number of PDCCH candidate groups and the number of CCEs.

Condition 2-4: Number of Applied TCI States or Whether Same/Different TCI State(s) are Applied The UE may differently count the number of PDCCH candidate groups and the number of CCEs according to the number of TCI states applied to PDCCHs transmitted from the BS or whether the same or different TCI states are applied. That is, the UE may select one of Operation 1 to Operation 3, and perform the count operation according to the number of TCI states applied to PDCCHs transmitted from the BS or whether the same or different TCI states are applied.

Embodiment 3: Condition and Scheme for Changing PDSCH Processing Time Calculation Scheme in PDCCH Repetitive Transmission In accordance with an embodiment of the disclosure, a PDSCH processing time calculation scheme in multiple TRPs-based PDCCH repetitive transmission is described. More specifically, a PDSCH processing time may be determined by the following factors.

PDSCH processing time-related UE capability report: processing capability 1 or

Numerology for PDCCH, PDSCH, and PDCCH transmission

PDSCH mapping type (A or B)

PDSCH and PDCCH symbol length

Number of overlapping symbols between PDCCHs and PDSCHs

In addition, when the PDCCH scheduling the PDSCH is repeatedly transmitted, some or all of the five considered factors are influenced by a PDCCH repetitive transmission scheme configured in the UE through higher-layer signaling, indicated to the UE through L1 signaling, or configured in and indicated to the UE by a combination of higher-layer signaling and L1 signaling, and thus, the calculation for the PDSCH processing time may differ. As a simple example, when the PDCCH is TDMed using two TCI states and repeatedly transmitted, redefinition of each of the repeatedly transmitted PDCCH symbol length or the number of overlapping symbols between PDCCHs and PDSCHs may be needed. Conditions for changing the PDSCH processing time calculation scheme according to the PDCCH repetitive transmission are described below.

Condition 3-1: New UE Capability Report Related to PDSCH Processing Time According to PDCCH Repetitive Transmission The UE may report a new UE capability related to a PDSCH processing time according to PDCCH repetitive transmission to the BS. The BS and the UE may change the PDSCH processing tune calculation scheme by defining a new UE processing capability in addition to UE processing capabilities 1 and 2 conventionally defined according to the new UE capability. Through the UE capability report related to the PDCCH repetitive transmission, the new UE processing capability may be defined and used. That is, information on the UE processing capability related to the PDSCH processing time is inserted into the UE capability report related to the PDCCH repetitive transmission and then transmitted to the BS. Herein, the report on the UE capability for the PDCCH repetitive transmission may include a report indicating that the UE is capable of calculating a new PDSCH processing time to the BS. The UE capability report related to the PDCCH repetitive transmission may include information on at least one of whether soft combining according to the PDCCH repetitive transmission is supported, the scheme for counting the PDCCH candidate groups and the number of CCEs, the maximum number of PDCCH candidates and CCEs for each slot/each of a plurality of slots and each span/each of a plural of spans, the overbooking scheme, and the maximum number of TCI states which can be applied to PDCCH repetitive transmission.

Condition 3-2: PDCCH Repetitive Transmission Method

For a PDCCH repetitive transmission method, a UE may receive a configuration of at least one scheme among Method 1-1 to Method 1-5, from the BS, through a higher layer, receive an indication thereof through L1 signaling, or receive a configuration or an indication through a combination of higher-layer signaling or L1 signaling, and change the PDSCH processing time calculation scheme according to the corresponding PDCCH repetitive transmission method. For example, in the case of TDM in Method 1-1 (i.e., a method of repeatedly transmitting a plurality of PDCCHs having the same payload), FDM in Method 1-1, or a PDCCH transmission scheme (SFN transmission scheme) in which a plurality of Tel states are applied to all CCEs within the same PDCCH candidate group) in Method 1-5, a PDSCH processing time calculation scheme for the PDSCH scheduled by repeatedly transmitted PDCCHs may be changed or the existing PDSCH processing time calculation scheme may be used.

Condition 3-3: Whether there is Explicit Linkage Between PDCCH Repetitive Transmissions The PDSCH processing time calculation scheme may vary depending on information on an explicit linkage or association between repeatedly transmitted PDCCHs of which the UE receives a configuration through higher-layer signaling, the UE receives an indication through L1 signaling, or the UE receives a configuration or an indication through a combination of higher-layer signaling or L1 signaling.

Condition 3-4: Method of Receiving PDCCH Repetitive Transmission

The PDSCH processing time calculation scheme may vary depending on a scheme for receiving PDCCH repetitive transmission such as individual decoding or soft combining of which the UE receives a configuration through higher-layer signaling, the LTE receives an indication through L1 signaling, or the UE receives a configuration or an indication through a combination of higher-layer signaling or L1 signaling.

Condition 3-5: Possibility of Applying Different Numerologies to PDCCH Repetitive Transmissions and PDCCH Repetitive Transmission and the Scheduled PDSCH When the UE receives a downlink control channel and a data channel through a plurality of subcarriers having different numerologies, the UE may receive repeatedly transmitted PDCCHs through different subcarriers having different numerologies in order to receive the PDCCH and the PDSCH by efficiently using available subcarriers. Alternatively, the UE may receive repetitive PDCCHs within one subcarrier having one numerology and receive a PDSCH indicated by the corresponding PDCCHs through another subcarrier having numerology different from that of the subcarrier receiving the PDCCH. That is, when scheduling subcarriers having different numerologies, the UE may change the PDSCH processing time calculation scheme.

The PDSCH processing time calculation scheme may be changed by a combination of one or more of Condition 3-1 to Condition 3-5. For example, a calculation method of determining a changeable PDSCH processing time includes Scheme 3-1 to Scheme 3-4 below.

Scheme 3-1: Definition of New $N_1$ According to PDSCH Processing Time-Related New UE Capability Report Scheme 3-1 may use Equation (3) in the same way as described above, but also use a new value which has not been defined for $N_1$ among variables in Equation (3). Values that can be newly defined for $N_1$ may vary depending on numerology as shown in Table 34 below, and $X_1$ to $X_4$ may be time units in units of symbols (e.g., $X_1$ to $X_4$ are symbol offsets equal to or smaller than the two-slot length and may have one value among 1 to 28 symbols.) Further, new $N_1$ values according to the new UE capability report can be applied only after higher-layer configuration information is received.

TABLE 34

| | $N_1$ which can be newly defined according to new UE capability report |
|---|---|
| $\mu$ | PDSCH decoding time $N_1$ [symbols] In the case of dmrs-AdditionalPosition = pos0 within DMRS-DownlinkConfig in which both PDSCH mapping types A and B are higher-layer signaling |
| 0 | $X_1$ |
| 1 | $X_2$ |
| 2 | $X_3$ |
| 3 | $X_4$ |

Scheme 3-2: New Definition of $d_{1,1}$ According to PDCCH Repetitive Transmission Scheme 3-2 newly defines $d_{1,1}$, which is a value included in a PDSCH processing time calculation equation according to a PDCCH repetitive transmission scheme. As described above, $d_{1,1}$ may be differently determined according to PDSCH mapping type A or B.

For example, when PDSCH mapping type A is configured, the last symbol of the PDSCH scheduled through PDCCH repetitive transmission is an $i^{th}$ symbol in a slot for transmitting the PDSCH, and $i<Y_1$, $d_{1,1}$ is $Y_1-i$ and, otherwise, $d_{1,1}$ is 0. $Y_1$ may have one value among 7 to 14 symbols.

As another example, when PDSCH mapping type B is configured, $d_{1,1}$ is determined according to the length L of the scheduled PDSCH and the number d of overlapping symbols between the scheduled PDSCH and the PDCCH scheduling the corresponding PDSCH. When the PDCCH is repeatedly transmitted, reference values for L may be redefined. Similarly, $d_{1,1}$ may be different for UE processing capability 1 or 2.

In a case in which PDCCH repetitive transmission is performed and a case corresponding to UE processing capability 1, if $L \geq Y_1$, $d_{1,1}=0$.
if $L \geq Y_2$ and $L \leq Y_1-1$, $d_{1,1}=Y_1-L$.
if $L=Y_3$, $d_{1,1}=\min(d, Y_4)$.
if $L=Y_5$, $d_{1,1}=Y_6+d$.

In a case in which PDCCH repetitive transmission is performed and a case corresponding to UE processing capability 2, if $L \geq Y_1$, $d_{1,1}=0$.
if $L \geq Y_2$ and $L \leq Y_1-1$, $d_{1,1}=Y_1-L$.
if $L=Y_5$,
if the PDCCH performing scheduling exists within a CORESET including 3 symbols and the corresponding CORESET and the scheduled PDSCH have the same start symbol, $d_{1,1}=3+Y_7$.
Otherwise, $d_{1,1}=d$.

In a case in which PDCCH repetitive transmission is performed and a case corresponding to UE processing capability 3 based on a new UE capability report, a UE may operate according to the existing definition of $d_{1,1}$ of UE processing capability 1 or 2, or operate according to the new definition of $d_{1,1}$ of UE processing capability 1 or 2. $Y_1$ to $Y_6$ may have one value among 1 to 14 symbols for UE processing capabilities 1 to 3. For example, when the UE operates according to the existing definition of $d_{1,1}$, $Y_1=7$, $Y_2=4$ as described above, $Y_3=3$, $Y_4=1$, $Y_5=2$, $Y_6=3$, and $Y_7=0$.

As another example, when PDSCH mapping type B is configured, the number d of overlapping symbols between the scheduled PDSCH and the repeatedly transmitted PDCCH scheduling the corresponding PDSCH in PDCCH repetitive transmission may be newly defined. In the new definition, the following cases may exist.

Case 3-1: In PDCCH Repetitive Transmission Based on FDM in Method 1-1 or Based on SFN in Method 1-5

Since FDM is a scheme in which two PDCCH repetitive transmissions are performed without overlapping in the frequency and the SEN is a scheme in which two PDCCH repetitive transmissions are performed in the same frequency and time resources, two PDCCH repetitive transmissions do not use more time resources compared to PDCCH single transmission, and thus, d may be calculated as the number of overlapping symbols between the PDSCH and the PDCCH as the original definition. Compared to PDCCH single transmission, in the case of FDM or SFN, a PDCCH reception and decoding process uses fewer time resources than the PDCCH single transmission, but is more complex or needs a longer time than reception and decoding of the PDCCH single transmission. Thus, a symbol offset corresponding to several symbols may be further considered in addition to the number of overlapping symbols between the PDSCH and the PDCCH that is the existing definition of d. For example, $d_{new}=d+Z$ may be newly defined, where d is the number of symbols overlapping between the PDSCH and the PDCCH and Z is an additional symbol offset considering a PDCCH repetitive transmission and reception scheme.

Case 3-2: In TDM-Based PDCCH Repetitive Transmission within Slot

In a case of TDM based PDCCH repetitive transmission within the slot, a total of the time resource length of all PDCCH repetitive transmission within the slot may increase compared to PDCCH single transmission. Accordingly; the length of symbols overlapping between the PDSCH and the PDCCH may also increase compared to PDCCH single transmission.

When the number of symbols overlapping between $i^{th}$ PDCCH repetitive transmission and the scheduled PDSCH is $d_{rep,i}$ and the total number of repetitive transmissions is rep_max, $d_{new}=d_{rep,1}+d_{rep,2}+ \ldots +d_{rep,rep\_max}$. That is, a value obtained by adding the numbers of symbols overlapping between the scheduled PDSCH and each PDCCH repetitive transmission may use new definition of d.

An additional symbol offset according to a repetitive PDCCH reception scheme may be considered in addition to $d_{new}$. For example, $d_{new}=d_{rep,1}+d_{rep,2}+ \ldots +d_{rep,rep\_max}+Z$, and Z may be an additional symbol offset considering a PDCCH repetitive transmission and reception scheme.

Further, only the number of symbols overlapping between the temporally last transmitted PDCCH and the scheduled PDSCH may be considered without consideration of all the repeatedly transmitted PDCCHs. In this case, $d_{new}=d_{rep,rep\_max}+Z$, and Z may be an additional symbol offset considering a PDCCH repetitive transmission and reception scheme or may have a value of 0.

Case 3-3: In Inter-Slot TDM Based PDCCH Repetitive Transmission

In a case of inter-slot TDM-based PDCCH repetitive transmission, the PDSCH scheduled through all PDCCH repetitive transmissions is not transmitted earlier than at least the first symbol of the last PDCCH repetitive transmission, and thus, d may be calculated using the existing definition considering the symbol overlapping between the PDSCH and the PDCCH without redefinition thereof similarly to Case 3-1. Also, similar to Case 3-1, in a case of into TDM based PDCCH repetitive transmission, a symbol offset corresponding to several symbols may be further considered, in addition to the number of symbols overlapping between the PDSCH and the PDCCH that is the existing definition of d according to a reception method of the PDCCH repetitive transmission. For example, $d_{new}=d+Z$ may be newly defined, where d is the number of symbols overlapping between the PDSCH and the PDCCH and Z is an additional symbol offset considering a PDCCH repetitive transmission and reception scheme.

Scheme 3-3: New Definition of Symbol Offset $d_3$ According to PDCCH Repetitive Transmission Scheme 3-3 defines an offset in additional symbol units when a PDSCH processing time is calculated according to PDCCH repetitive transmission. For example, a time spent for decoding final PDCCH according to PDCCH repetitive transmission may vary depending on various PDCCH reception schemes, control resources and resources of search spaces, and the number of PDCCH candidates, so that a symbol offset is defined for each representative case and considered for calculating the PDSCH processing time. For example, when the PDCCH repetitive transmission scheme is based on TDM or according to whether the PDCCH reception scheme is individual decoding or soft combining, different symbol offset values may be used.

As another example, with respect to the time spent for PDCCH decoding, a single symbol offset which can be applied to all cases may be defined and considered for calculating the PDSCH processing time without defining symbol offsets for respective cases. For example, a symbol offset between 1 to 28 symbols additionally considered for calculating the PDSCH processing time in PDCCH repetitive transmission may be defined regardless of a PDCCH repetitive transmission scheme and a reception scheme. As shown in Equation (5) below, the PDSCH processing time may be calculated in consideration of an additional symbol offset value $d_3$.

$$T_{proc,1} = (N_1 + d_{1,1} + d_2 + d_3)(2048 + 144)\kappa 2^{-\mu} T_c + T_{ext} \quad (5)$$

Scheme 3-4: Definition of New Time Offset $T_{rep}$ Related to PDSCH Processing Time Scheme 3-4 defines an offset in additional time units when a PDSCH processing time is calculated according to PDCCH repetitive transmission. For example, an absolute time unit may be defined and used without defining an additional PDCCH decoding time in units of symbols according to a PDCCH reception scheme used for PDCCH repetitive transmission. A time spent for decoding the final PDCCH according to PDCCH repetitive transmission may vary depending on various PDCCH repetitive transmission schemes and reception schemes, control resources and resources of search spaces, and the number of PDCCH candidates, so that a time unit value which can be conservatively applied to all cases may be newly defined and used without separately defining time unit values for individual cases. Accordingly, Equation (6) below may be reflected in an equation of a total PDSCH processing time by additionally defining a new time offset $T_{rep}$ related to the PDSCH processing time in PDCCH repetitive transmission.

$$T_{proc,1} = (N_1 + d_{1,1} + d_2)(2048 + 144)\kappa 2^{-\mu} T_c + T_{ext} + T_{rep} \quad (6)$$

Figure 18:
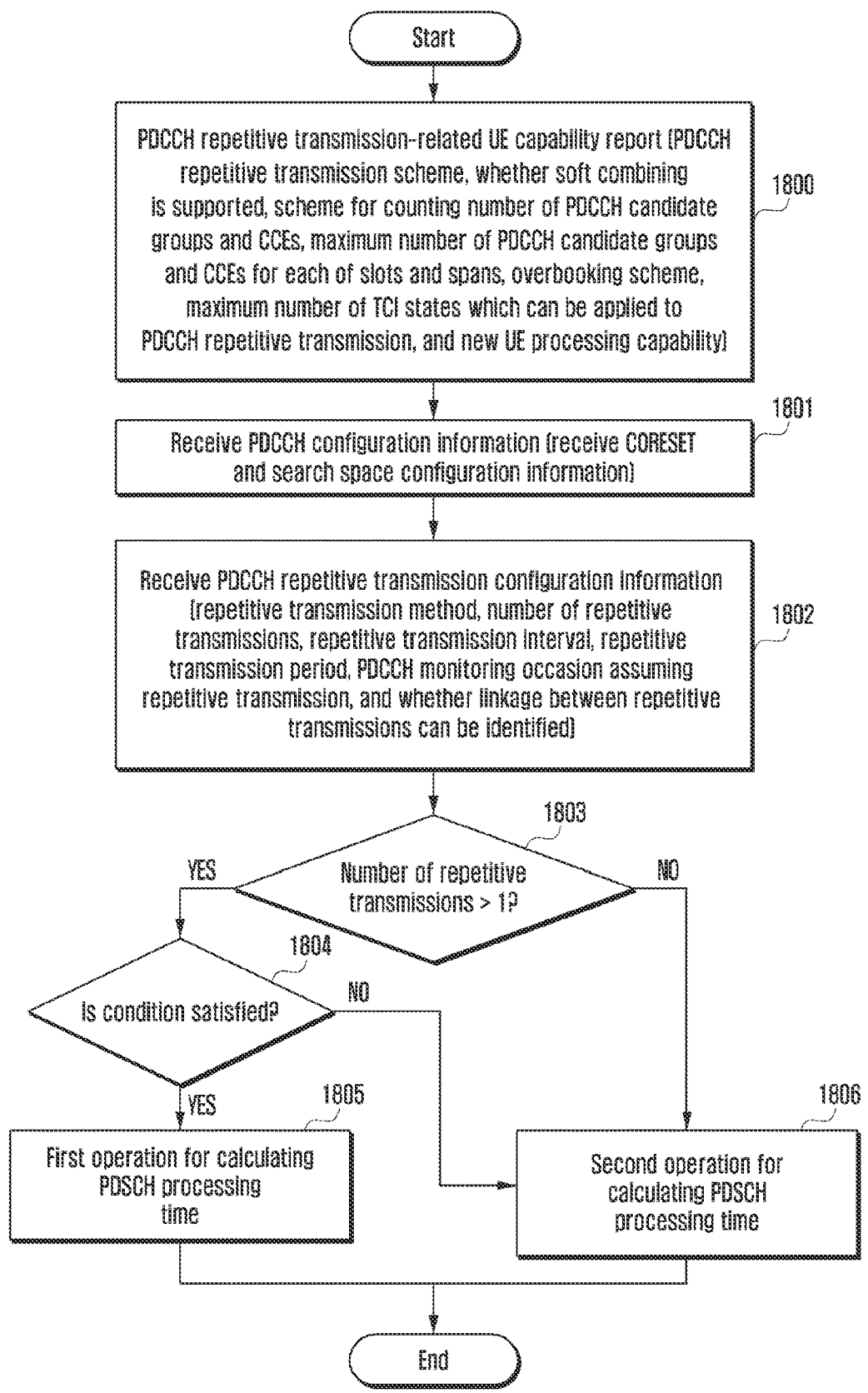
FIG. 18 is a flowchart illustrating an operation of a UE for a PDSCH processing time calculation according to a UE capability report in PDCCH repetitive transmission and whether a BS transmission condition is satisfied in a wireless communication system according to an embodiment.

FIG. 18 is a flowchart illustrating an operation of a UE for PDSCH processing time calculation according to a UE capability report in PDCCH repetitive transmission and whether a BS transmission condition is satisfied in a wireless communication system according to an embodiment.

Referring to FIG. 18, in step 1800, the UE reports a UE capability related to PDCCH repetitive transmission to the BS. An available UE capability report may include information on at least one of a PDCCH repetitive transmission scheme (e.g., one of Methods 1-1 to 1-5), whether soft combining according to PDCCH repetitive transmission is supported, PDCCH candidates, a method of counting the number of CCEs, a maximum number of PDCCH candidates and the number of CCEs for each slot/a plurality of slots and for each span/a plurality of spans, the overbooking scheme, and a new UE processing capability.

Alternatively, when information on the UE capability is preconfigured for the corresponding UE, or when the same default information is applied as the information on the UE capability for UEs in a predetermined group, step 1800 may be omitted.

In step 1801, the UE receives first configuration information for the PDCCH from the BS In step 1802, the UE receives second configuration information for PDCCH repetitive transmission. The second configuration information may include at least one piece of information such as a repetitive transmission method, the number of repetitive transmissions, a repetitive transmission interval, a repetitive transmission period, a PDCCH monitoring occasion in which repetitive transmission is assumed, and whether linkage or association between repetitive transmissions can be identified. The UE may receive at least some pieces of the first configuration information and the second configuration information through L1 signaling or implicitly determine at least some pieces thereof based on other configuration information. Alternatively, the first configuration information and the second configuration information may be included in one piece of configuration information and provided to the UE.

In step 1803, the UE identifies whether the number N of repetitive transmissions is greater than 1 (N is an integer).

When the number of repetitive transmissions is greater than 1 in step 1803, the UE identifies whether a BS transmission condition is satisfied in step 1804. The transmission condition may be a combination of at least one of Conditions 3-1 to 3-5 as described above.

When the BS transmission condition is not satisfied in step 1804 or when the number of repetitive transmissions is not greater than 1 in step 1803, the UE operates based on a conventional PDSCH processing time calculation scheme (i.e., a second PDSCH processing time calculation scheme) in step 1806. The number of repetitive transmissions corresponding to 1 may indicate that repetitive transmission is not performed.

However, when the BS transmission condition is satisfied in step 1804, the UE operates through application of a new scheme (i.e., first PDSCH processing time calculation scheme) to the PDSCH processing time calculation scheme in step 1805.

When the PDSCH processing time is calculated through the application of the new reference, a combination of at least one of Scheme 3-1 to Scheme 3-1 may be applied when the number of PDCCH repetitive transmissions is N.

A PDSCH processing time in PDCCH repetitive transmission is described in detail through the following detailed embodiments by way of example of a combination of least one of Condition 3-1 to Condition 3-5 and at least one of Scheme 3-1 to Scheme 3-4.

Embodiment 3-1: PDSCH Processing Time According to Specific Combination of Conditions and Calculation Schemes Embodiment 3-1 includes a PDSCH processing time according to a specific combination of Condition 3-1 to Condition 3-5 and some of Scheme 3-1 to Scheme 3-4. Various combinations of conditions and schemes considered in this embodiment may be described below.

Conditions
  PDCCH repetitive transmission method: intra-slot TDM-based PDCCH repetitive transmission in Method 1-1
  Existence of explicit connection between PDCCH repetitive transmissions
  Availability of soft combining in reception of PDCCH repetitive transmission.
Schemes
  Definition of new $d_{1,1}$ according to PDCCH repetitive transmission This embodiment corresponds to Case 3-2 in Scheme 3-2 (in intra-slot TDM-based PDCCH repetitive transmission in Method 1-1) based on the assumption that a UE capability corresponding to UE processing capability 1 is performed and PDSCH mapping type B is used. As described above, $d_{1,1}$ may be defined as follows according to the PDSCH length L.
   if L≥$Y_1$, $d_{1,1}$=0.
   if L≥$Y_2$ and L≤$Y_1$−1, $d_{1,1}$=$Y_1$−L.
   if L=$Y_3$, $d_{1,1}$=min ($d_{new}$, $Y_4$).
   if L=$Y_5$, $d_{1,1}$=$Y_6$+$d_{new}$.

It is assumed that $Y_1$=10, $Y_2$=7, $Y_3$=6, $Y_4$=3, $Y_5$=5, and $Y_6$=6. In the case of Scheme 3-2, as defined in Case 3-2, $d_{new}$=$d_{rep,1}$+$d_{rep,2}$+ . . . +$d_{rep,rep\_max}$+Z, $d_{rep,1}$ is the number of symbols overlapping between the scheduled PDSCH and the PDCCH, and Z is an additional symbol offset considering the PDCCH repetitive transmission and reception scheme. It is assumed that Z=2. However, this is only the assumption for convenience of description, and this embodiment is not limited thereto.

Figure 19:
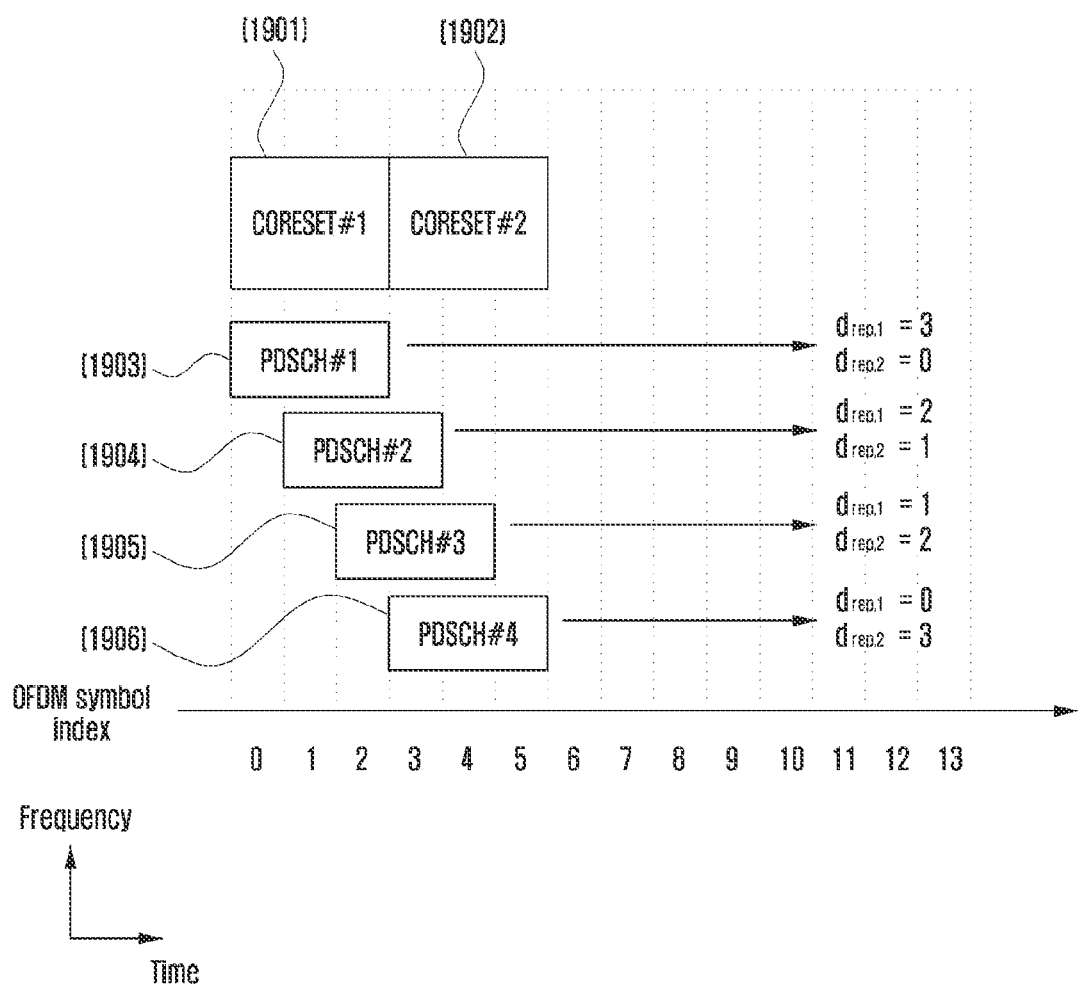
FIG. 19 illustrates time axis locations of a PDCCH and a PDSCH for expressing various values of $d_{1,1}$ in intra-slot time division multiplexing (TDM)-based PDCCH repetitive transmission in a wireless communication system according to an embodiment.

FIG. 19 illustrates time axis locations of a PDCCH and a PDSCH for expressing values of $d_{1,1}$ in intra-slot TDM-based PDCCH repetitive transmission in a wireless communication system according to an embodiment.

Referring to FIG. 19, the number of PDCCH repetitive transmission schemes is rep_max=2 and the PDSCH length is L=3 based on the assumption above. PDCCHs are TDMed and repeatedly transmitted in CORESET #1 1901 and CORESET #2 1902, and a total of 4 locations of PDSCHs scheduled based on the repeatedly transmitted PDCCHs are illustrated as indicated by reference numerals 1903 and 1906.

As illustrated in FIG. 19, $d_{rep,1}$=3 and $d_{rep,2}$=0 at the PDSCH location 1903, $d_{rep,1}$=2 and $d_{rep,2}$=1 at the PDSCH location 1904, $d_{rep,1}$=1 and $d_{rep,2}$=2 at the PDSCH location 1905, and $d_{rep,1}$=0 and $d_{rep,2}$=3 at the PDSCH location 1906. Accordingly, $d_{new}$ may be calculated as 5 in all cases according to an equation of $d_{new}$=$d_{rep,1}$+$d_{rep,2}$+Z based on the PDSCH locations 1903, 1904, 1905, and 1906, and finally $d_{1,1}$=min($d_{new}$, 3)=3. Final $T_{proc,1}$, may be calculated by putting the calculated $d_{1,1}$ into Equation (3) above.

The UE may perform valid PUCCH transmission containing HARQ-ACK information from the first symbol after a time of $T_{proc,1}$ from the last symbol of the PDSCH. That is, if the first symbol of the PUCCH containing HARQ-ACK information does not start earlier than symbol $L_1$ ($L_1$ is defined as a first uplink symbol at which CP starts after $T_{proc,1}$), the UE may transmit the MATH containing valid HARQ-ACK information.

Embodiment 3-2: PDSCH Processing Time According to Specific Combination of Conditions and Calculation Schemes Embodiment 3-2 describes a PDSCH processing time according to another specific combination of some of Condition 3-1 to Condition 3-5 and some of Scheme 3-1 to [Scheme 3-4. Various combinations of conditions and schemes considered in this embodiment are described below.
Conditions
   PDCCH repetitive transmission method: intra-slot TDM-based PDCCH repetitive transmission in Method 1-1
   Existence of explicit connection between PDCCH repetitive transmissions
   Availability of soft combining in reception of PDCCH repetitive transmission
Schemes
   Definition of new $d_{1,1}$ according to PDCCH repetitive transmission
   Definition of new $d_3$ according to PDCCH repetitive transmission This embodiment corresponds to Case 3-2 in Scheme 3-2 (in intra-slot TDM-based PDCCH repetitive transmission in Method 1-1) based on the assumption that a UE capability corresponding to UE processing capability 1 is performed and PDSCH mapping type A is used. As described above, when a last symbol of the PDSCH scheduled through PDCCH repetitive transmission is an $i^{th}$ symbol in a slot for transmitting the PDSCH, and i<$Y_1$, $d_{1,1}$ is $Y_1$−i and, otherwise, $d_{1,1}$ is 0. $Y_1$ may have one value among 7 to 14 symbols. It is assumed that $Y_1$=10. However, this is only the assumption for convenience of description, and the embodiment is not limited thereto.

Figure 20:
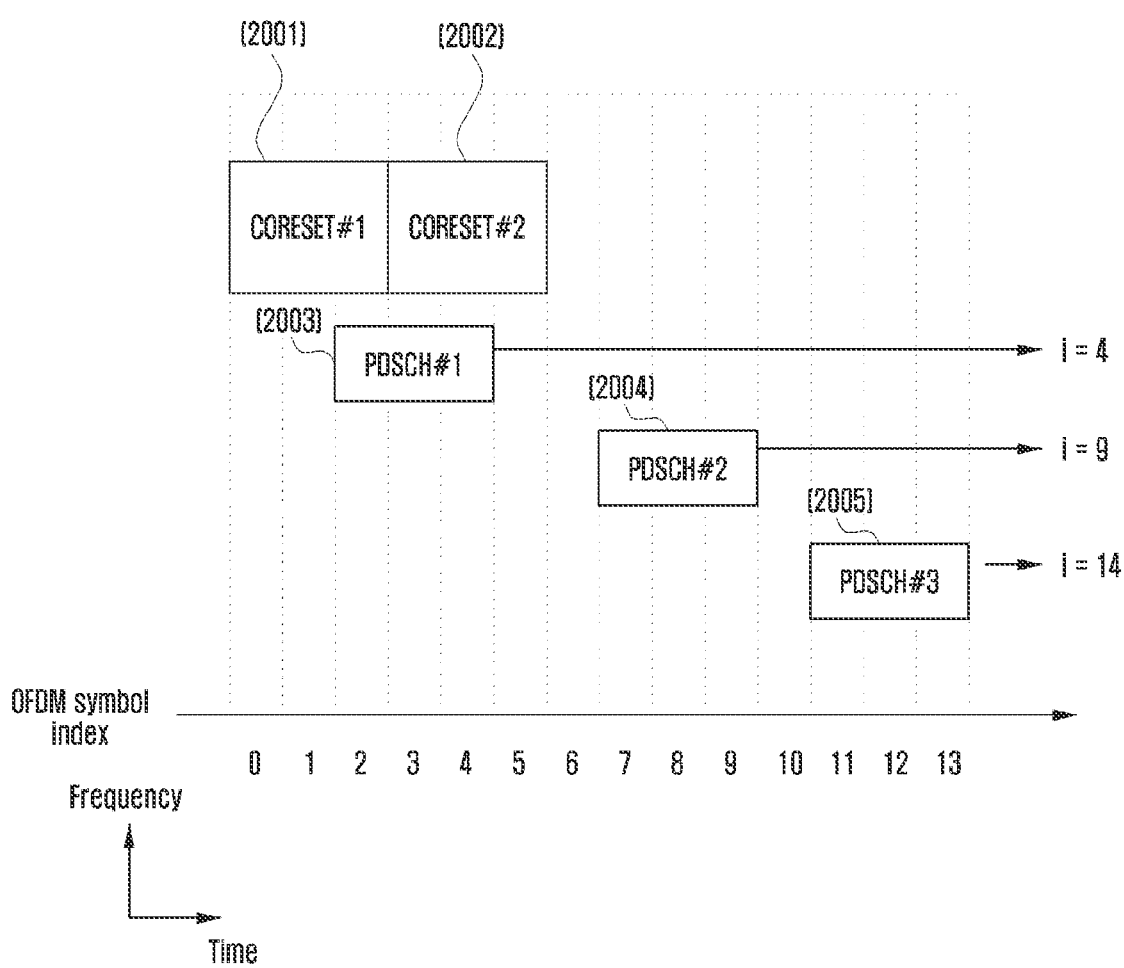
FIG. 20 illustrates time axis locations of a PDCCH and a PDSCH for expressing various values of $d_{1,1}$ in intra-slot TDM-based PDCCH repetitive transmission in a wireless communication system according to an embodiment.

FIG. 20 illustrates time axis locations of a PDCCH and a PDSCH for expressing values of $d_{1,1}$ in intra-slot TDM-based PDCCH repetitive transmission in a wireless communication system according to an embodiment.

Referring to FIG. 20, the number of PDCCH repetitive transmissions is rep_max=2 and the PDSCH length is L=3 based on the assumption. PDCCHs are TDMed and repeatedly transmitted in CORESET #1 2001 and CORESET #2 2002, and a total of 3 locations of PDSCHs scheduled based on the repeatedly transmitted PDCCHs are illustrated as indicated by reference numerals 2003 and 2005.

As illustrated in FIG. 20, the last symbols of the PDSCHs are $4^{th}$, $9^{th}$, and $14^{th}$ symbols in a slot for transmitting the PDSCHs at PDSCH locations 2003, 2004, and 2005, respectively. Accordingly, values of $d_{1,1}$ may be 6 and 1 at the PDSCH locations 2003 and 2004 according to the equation of $d_{1,1=10}$−i. Further, the value of $d_{1,1}$ may be 0 at the PDSCH location 2005.

A new symbol offset $d_3$ according to PDCCH repetitive transmission is defined according to the listed schemes, and it is assumed that $d_3$=2 in this embodiment. Final $T_{proc,1}$ may be calculated by putting the calculated $d_{1,1}$ and $d_3$ into Equation (5) above. The UE may perform valid PUCCH transmission containing HARQ-ACK information from the first symbol after a time of $T_{proc,1}$ from the last symbol of the PDSCH. That is, if the first symbol of the PUCCH containing HARQ-ACK information does not start earlier than symbol $L_1$ ($L_1$ is defined as a first uplink symbol at which CP starts after $T_{proc,1}$), the UE may transmit the PUCCH containing valid HARQ-ACK information.

Embodiment 3-3: PDSCH Processing Time According to Specific Combination of Conditions and Calculation Schemes Embodiment 3-3 describes a PDSCH processing time according to another specific combination of some of Condition 3-1 to Condition 3-5 and some of Scheme 3-1 to Scheme 3-4.
Conditions
   New UE capability report elated to a PDSCH processing time according to PDCCH repetitive transmission
   PDCCH repetitive transmission method: SEN transmission-based PDCCH
repetitive transmission in [Method 1-5]
Schemes
   Definition of a new time offset $T_{rep}$ related to a PDSCH processing time In this embodiment, a new UE capability report related to a PDSCH processing time may be performed and $N_1$ according to the corresponding UE capability report may be separately defined. $N_1$ according to numerology used according to a new UE capability report may be defined according to, e.g, Table 35 below.

TABLE 35

Definition of $N_1$ according to new UE capability report related to PDSCH processing time

| μ | PDSCH decoding time $N_1$ [symbols] In the case in which dmrs-AdditionalPosition = pos0 within DMRS-DownlinkConfig in which both PDSCH mapping types A and B are higher-layer signaling |
|---|---|
| 0 | $X_1$ |
| 1 | $X_2$ |
| 2 | $X_3$ |
| 3 | $X_4$ |

Embodiment 3-3 assumes that $X_1$=10, $X_2$=14, $X_3$=20, and $X_4$=28 as one example. Further, Embodiment 3-3 assumes that a PDSCH processing time is calculated in the same way to the scheme of UE processing capability 2 when a new UE capability report is performed. It is also assumed that PDSCH mapping type B is used and numerology μ=0. This corresponds to Case 3-1 in Scheme 3-2 (FDM-based PDCCH repetitive transmission in Method 1-1 or SFN-based PDCCH repetitive transmission in Method 1-5). In a case in which PDCCH repetitive transmission is performed and a case corresponding to UE processing capability 2, $d_{1,1}$ may be calculated as follows.

if $L \geq Y_1$, $d_{1,1}$=0.
if $L \geq Y_2$ and $L \leq Y_1-1$, $d_{1,1}=Y_1-L$.
if $L=Y_5$,
if the PDCCH performing scheduling exists within a CORESET including 3 symbols and the corresponding CORESET and the scheduled PDSCH have the same start symbol, $d_{1,1}=3+Y_7$.
otherwise, $d_{1,1}=d_{new}$.

Embodiment 3-3 assumes that $Y_1$=7, $Y_2$=4, $Y_5$=2, and $Y_7$=3 as one example. However, this assumption is only for convenience of description, and this embodiment is not limited thereto.

Figure 21:
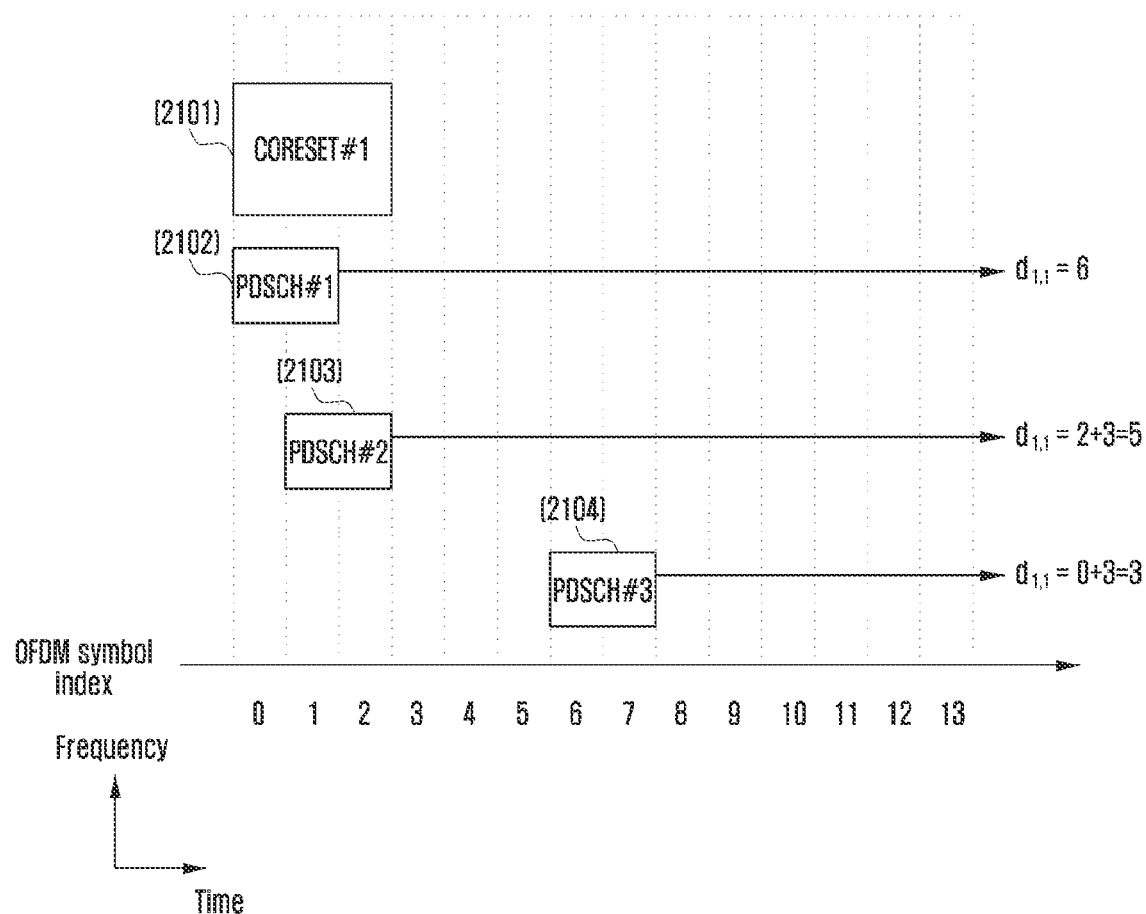
FIG. 21 illustrates time axis locations of a PDCCH and a PDSCH for expressing various values of $d_{1,1}$ in system frame number (SFN) transmission-based PDCCH repetitive transmission in a wireless communication system according to an embodiment.

FIG. 21 illustrates time axis locations of a PDCCH and a PDSCH for expressing various values of $d_{1,1}$ in SEN transmission-based PDCCH repetitive transmission in a wireless communication system according to an embodiment.

Referring to FIG. 21, the number of PDCCH repetitive transmissions is rep_max=2 and the PDSCH length is L=2 based on the assumption. The PDCCH is repeatedly transmitted based on SFN transmission through 2 TCI states in CORESET #1 2101. FIG. 21 illustrates a total of 3 locations of PDSCHs scheduled based on the repeatedly transmitted corresponding PDCCH as indicated by reference numerals 2102 to 2104. The case of L=2 in the case at the PDSCH location 2102 corresponds to the case in which the PDCCH performing scheduling exists within a CORESET including 3 symbols and the corresponding CORESET and the scheduled PDSCH have the same start symbol. Further, $d_{1,1}$=3+3=6, and $d_{1,1}=d_{new}$ is calculated at locations 2103 and 2104 by the condition. The number of symbols overlapping between the PDCCH and the PDSCH may be newly defined through $d_{new}$=d+Z according to a PDCCH repetitive transmission and reception scheme, and Z may be assumed as 3 in this embodiment. Accordingly, d=2 at the PDSCH location 2103 and thus, $d_{new}$=5, and d=0 at the PDSCH location 2101 and thus $d_{new}$=3.

In addition, a new time offset $T_{rep}$ related to a PDSCH processing time is defined, and it is assumed that $T_{rep}$=0.2 ms in this embodiment. Final $T_{proc,1}$ may be calculated by putting the determined $d_{1,1}$ and $T_{rep}$ into Equation (6) above.

The UE may perform valid PUCCH transmission containing HARQ-ACK information from the first symbol after a time of $T_{proc,1}$ from the last symbol of the PDSCH. That is, if the first symbol of the PDCCH containing HARQ-ACK information does not start earlier than symbol $L_1$ ($L_1$ is defined as a first uplink symbol at which CP starts after $T_{proc,1}$), the UE may transmit the PUCCH containing valid HARQ-ACK information.

Embodiment 3-4: PDSCH Processing Time According to Specific Combination of Conditions and Calculation Schemes Embodiment 3-4 describes a PDSCH processing time according to a specific combination of some of Condition 3-1 to Condition 3-5 and some of Scheme 3-1 to Scheme 3-4. Various combinations of conditions and schemes considered in this embodiment are described below.

Conditions
  PDCCH repetitive transmission method: intra-slot TDM-based, FDM-based, or SFN PDCCH transmission in Method 1-1
  Existence of explicit connection between PDCCH repetitive transmissions
  Both cases in which soft combining is available or not in reception of PDCCH repetitive transmission are included.

Schemes
  Definition of new $d_{1,1}$ according to PDCCH repetitive transmission In Embodiment 3-4, it is assumed that a UE capability report corresponding to UE processing capability 1 is performed and PDSCH mapping type B is used, and Embodiment 3-4 may correspond to both of intra-slot TDM-based, FDM-based, or SEN PDCCH transmissions in Method 1-1. As described above, $d_{1,1}$ may be defined as follows according to the PDSCH length L.

if $L \geq Y_1$, $d_{1,1}$=0.
if $L \geq Y_2$ and $L \leq Y_1-1$, $d_{1,1}=Y_1-L$.
if $L=Y_3$, $d_{1,1}$=min ($d_{new}$, $Y_4$)
if $L=Y_5$, $d_{1,1}=Y_6+d_{new}$.

In Embodiment 3-4, it may be assumed that $Y_1$=7, $Y_2$=3, $Y_4$=1, $Y_5$=2, and $Y_6$=3. The case in which other values are used may not be excluded.

The UE may calculate the PDSCH processing time based on the new definition of $d_{1,1}$ according to PDCCH repetitive transmission. For example, the UE may calculate du between each PDCCH and the PDSCH scheduled by the corresponding PDCCH repetitive transmission and use $d_{1,1}$ for calculating the final PDSCH processing time based on the PDCCH that results in a larger value of $d_{1,1}$ among two repeatedly transmitted PDCCHs. In N PDCCH repetitive transmissions, $d_{1,1,(1)}$ to $d_{1,1,(N)}$ may be $d_{1,1}$ ($d_{1,1,(1)}$) calculated in consideration of the PDSCH scheduled through PDCCH repetitive transmission and a first PDCCH to $d_{1,1}$ ($d_{1,1,(n)}$) calculated in consideration of the PDSCH scheduled through PDCCH repetitive transmission and an $N^{th}$ PDCCH. Final $d_{1,1}$ may be determined as the largest value, that is, $d_{1,1}$=max($d_{1,1,(1)}$, $d_{1,1,(2)}$, . . . , $d_{1,1,(N)}$).

According to an embodiment, the calculation of $d_{1,1}$ ($d_{1,1}$ is calculated based on the PDCCH that makes the largest value $d_{1,1}$ among all repeated PDCCHs and reflected in the PDSCH processing time) may be applied only to the case in which the length L of OFDM symbols of the PDSCH scheduled through PDCCH repetitive transmission is from 1 to 14. For example, the calculation of $d_{1,1}$ ($d_{1,1}$ is calculated based on the PDCCH that makes the largest value $d_{1,1}$ among all repeated PDCCHs and reflected in the PDSCH processing time) may be applied only to the case in which L is 2 or 3.

As another example, when calculating $d_{1,1}$ used for the calculation of the PDSCH processing time, the UE may calculate $d_{1,1}$ based on the PDCCH having the largest number of OFDM symbols overlapping the scheduled PDSCH among repeated PDCCHs. When the length L of OFDM symbols of the scheduled PDSCH is 3, if the number of OFDM symbols overlapping between the first PDCCH of 2 PDCCH repetitive transmissions and the PDSCH is 2 and the number of OFDM symbols overlapping between the second PDCCH and the PDSCH is 1, the number of OFDM symbols overlapping between the PDSCH and the PDCCH may be determined as d=2 that is the number of OFDM symbols overlapping the most among all the repeated. PDCCHs. Final $d_{1,1}$ may be calculated as 3+min(d, 1), and the final value may be calculated as 4. Accordingly, when all the numbers of OFDM symbols overlapping between two repeated PDCCHs and the PDSCH are smaller than or equal to $Y_4$, $d_{1,1}$ may be calculated according to 3+min (d, $Y_4$). However, when the number of OFDM symbols overlapping between one of the two repeated PDCCHs and the PDSCH is smaller than or equal to $Y_4$ and the number of OFDM symbols overlapping between the other PDCCH and the PDSCH is larger than $Y_4$, the UE may calculate $d_{1,1}$ based on the PDCCH having the larger number of OFDM symbols overlapping the PDSCH.

When the length L of OFDM symbols of the scheduled PDSCH is 2, the number of OFDM symbols overlapping between the first PDCCH of 2 PDCCH repetitive transmissions and the PDSCH is 2, and the number of OFDM symbols overlapping between the second PDCCH and the PDSCH is 1, the number of OFDM symbols overlapping between the PDSCH and the PDCCH may be determined as d=2 that is the number of OFDM symbols overlapping the most among all the repeated. PDCCHs. Final $d_{1,1}$ may be calculated as 3+d, and the final value may be calculated as 5. Accordingly, when the number of OFDM symbols temporally overlapping between one of the two repeated PDCCHs and the scheduled PDSCH is larger than the number of OFDM symbols temporally overlapping between the other PDCCH and the scheduled PDSCH, the UE may calculate $d_{1,1}$ based on the PDCCH having the larger number of OFDM symbols overlapping the PDSCH. The corresponding scheme may be reported through a UE capability, and may be configured through higher-layer signaling, indicated through L1 signaling, or configured and indicated through higher-layer signaling and L1 signaling.

In Embodiment 3-4, the scheme may be applied when the UE individually decodes PDCCH repetitive transmissions after reception of all PDCCH repetitive transmissions. When N PDCCH repetitive transmissions are received, the individual decoding may include all of first PDCCH repetitive transmission to $N^{th}$ PDCCH repetitive transmission being individually decoded. When at least one of the N decodings is successful, it may be determined that the corresponding PDCCH is successfully decoded.

The UE may report on whether an individual decoding scheme is supported through a UE capability or may imply whether an individual decoding scheme is supported. For example, when the UE reports the number of counting blind decoding (BD) for PDCCH repetitive transmission as 2, the UE may imply whether the individual decoding scheme is supported.

As another example, the methods presented in Scheme 3-1 to Scheme 3-4 or additional schemes do not assume the individual decoding scheme of the UE but may assume soft combining thereof after reception of a plurality of PDCCH repetitive transmissions. The UE may report on whether soft combining is supported through a UE capability or may imply whether soft combining is supported. For example, the UE may report the number of BD counts for PDCCH repetitive transmission as 3 or may imply whether soft combining is supported when both 2 and 3 are reported. The UE may report 2 corresponding to the number of BD counts for PDCCH repetitive transmission and whether soft combining is supported together through the UE capability. The PDSCH processing time may be calculated according to the following in addition to the method presented in Scheme 3-1 to Scheme 3-4.

Scheme 3-5: Calculation of PDSCH Processing Time Using Largest Value of $d_{1,1}$ Among Plurality of Values of $d_{1,1}$ Determined in Consideration of Each PDCCH Repetitive Transmission Among all PDCCH Repetitive Transmissions and Scheduled PDSCH Scheme 3-6: Scheme for Double-Counting Corresponding Overlapping OFDM Symbols when Specific Symbols of PDSCH Temporally Overlap Two Repeated PDCCHs in Calculation of $d_{1,1}$ Scheme 3-7: Scheme for Determining $d_{1,1}$ to be Used for Calculating PDSCH Processing Time by Adding all Values of $d_{1,1}$ Determined in Consideration of Each PDCCH Repetitive Transmission in all PDCCH Repetitive Transmissions and Scheduled PDSCH Scheme 3-8: Scheme for Calculating Different Values of d According to which Value of a UE Capability Related to BD Count of the UE is Reported For example, when a UE reports 2 as the RD count when decoding the repeated PDCCH through a UE capability, the UE may calculate $d_{1,1}$ and use a double value of the $d_{1,1}$ for calculating a PDSCH processing time. As another example, when the UE reports 3 as the BD count when decoding the repeated PDCCH through a UE capability, the UE may calculate $d_{1,1}$ and use a triple value of the $d_{1,1}$ for calculating a PDSCH processing time.

When some PDCCH candidates are not monitored or are dropped during the PDCCH repetitive transmission (e.g., when an SSB and a specific PDCCH candidate overlap each other, the PDCCH candidate may not be monitored), $d_{1,1}$ may be calculated based on only PDCCH candidates which are not dropped even though one of Scheme 3-1 to Scheme 3-8 is used, and the value may be used for calculating the PDSCH processing time.

Alternatively $d_{1,1}$ may be calculated based on one of Scheme 3-1 to Scheme 3-8, regardless of whether there are PDCCH candidates which are not dropped, and the value may be used for calculating the PDSCH processing time.

Embodiment 3-5: PDSCH Processing Time According to Specific Combination of Conditions and Calculation Schemes Embodiment 3-5 includes a. PDSCH processing time according to a specific combination of some of Condition 3-1 to Condition 3-5 and some of Scheme 34 to Scheme 3-4. Various combinations of conditions and schemes considered in this embodiment are described below.

Conditions
PDCCH repetitive transmission method: intra-slot TDM-based, FDM-based, or SFN PDCCH transmission in Method 1-1
Existence of explicit connection between PDCCH repetitive transmissions Both cases in which soft combining is available or not in reception of PDCCH repetitive transmission are included.

Schemes

Definition of new $d_{1,1}$ according to PDCCH repetitive transmission

In Embodiment 3-5, it is assumed that a UE capability report corresponding to UE processing capability 2 is performed and PDSCH mapping type B is used, and this embodiment may correspond to both of intra-slot TDM-based, FDM-based, or SEN PDCCH transmissions in Method 1-1. As described above, $d_{1,1}$ may be defined as follows according to the PDSCH length L.

if $L \geq Y_1$, $d_{1,1}=0$.

if $L \geq Y_2$ and $L \leq Y_1-1$, $d_{1,1}$ is the number of OFDM symbols temporally overlapping between the PDCCH and the PDSCH.

if $L=Y_3$,
    if the PDCCH performing scheduling exists within a CORESET including $Y_4$ symbols and the corresponding CORESET and the scheduled PDSCH have the same start symbol, $d_{1,1}=Y_4+Y_5$.
    otherwise, $d_{1,1}=d+Y_6$.

In Embodiment 3-5, it may be assumed that $Y_1=7$, $Y_2=3$, $Y_3=2$, $Y_4=3$, $Y_5=0$, and $Y_6=0$. The case in which other values are used may not be excluded.

The UE may calculate the PDSCH processing time based on the new definition of $d_{1,1}$ according to PDCCH repetitive transmission. For example, the UE may calculate du between each PDCCH and the PDSCH scheduled by the corresponding PDCCH repetitive transmission and use $d_{1,1}$ for calculating the final PDSCH processing time based on the PDCCH that results in a larger value of $d_{1,1}$ among two repeatedly transmitted PDCCHs. In N PDCCH repetitive transmissions, $d_{1,1,(1)}$ to $d_{1,1,(N)}$ may be $d_{1,1}$ ($d_{1,1,(1)}$) calculated in consideration of the PDSCH scheduled through PDCCH repetitive transmission and a first PDCCH to $d_{1,1}$ ($d_{1,1,(n)}$) calculated in consideration of the PDSCH scheduled through PDCCH repetitive transmission and an $N^{th}$ PDCCH. Final $d_{1,1}$ may be determined as the largest value, that is, $d_{1,1}=\max(d_{1,1,(1)}, d_{1,1,(2)}, \ldots, d_{1,1,(N)})$.

According to an embodiment, the calculation of $d_{1,1}$ ($d_{1,1}$ is calculated based on the PDCCH that makes the largest value $d_{1,1}$ among all repeated PDCCHs and reflected in the PDSCH processing time) may be applied only to the case in which the length L of OFDM symbols of the PDSCH scheduled through PDCCH repetitive transmission is from 1 to 14. For example, the calculation of $d_{1,1}$ ($d_{1,1}$ is calculated based on the PDCCH that makes the largest value $d_{1,1}$ among all repeated PDCCHs and reflected in the PDSCH processing time) may be applied only to the case in which L is 2 or 3.

As another example, when calculating $d_{1,1}$ used for the calculation of the PDSCH processing time, the UE may calculate $d_{1,1}$ based on the PDCCH having the largest number of OFDM symbols overlapping the scheduled PDSCH among repeated PDCCHs. When the length L of OFDM symbols of the scheduled PDSCH is greater than or equal to 3 and less than or equal to 6, if the number of OFDM symbols overlapping between the first PDCCH of 2 PDCCH repetitive transmissions and the PDSCH is 2 and the number of OFDM symbols overlapping between the second PDCCH and the PDSCH is 3, the number of OFDM symbols overlapping between the PDCCH and the PDCCH may be determined as 3, which is the number of OFDM symbols overlapping the most among all the repeated PDCCHs, and at this time, final $d_{1,1}$ may also be determined as 3 that is the number of OFDM symbols overlapping the most among all the repeated PDCCHs. When the length L of OFDM symbols of the scheduled PDSCH is 2, and a specific PDCCH of 2 PDCCH repetitive transmissions is transmitted within a CORESET having 3 OFDM symbols and has the same start OFDM symbol as the scheduled PDSCH, $d_{1,1}$ may be considered as 3. Otherwise (i.e., when the specific PDCCH is not transmitted in within the CORESET having 3 OFDM symbols or has a different start OFDM symbol from the PDSCH), $d_{1,1}$ may be the number of OFDM symbols temporally overlapping between the corresponding PDCCH and the PDSCH. Accordingly, when one of the two repeated PDCCHs is transmitted within a CORESET having 3 OFDM symbols and has the same start OFDM symbol as the scheduled PDSCH, $d_{1,1}$ may be determined as 3.

When all of the two repeated PDCCHs are not transmitted within the CORESET having 3 OFDM symbols or have a different OFDM symbol from the scheduled PDSCH, $d_{1,1}$ may be determined based on the PDCCH having the larger number of OFDM symbols overlapping the scheduled PDSCH among the two PDCCHs. The corresponding scheme may be reported through a UE capability, and may be configured through higher-layer signaling, indicated through L1 signaling, or configured and indicated through higher-layer signaling and L1 signaling.

In Embodiment 3-5, the scheme may be applied when the UE individually decodes PDCCH repetitive transmissions after reception of all PDCCH repetitive transmissions. When N PDCCH repetitive transmissions are received, the individual decoding may include all of first PDCCH repetitive transmission to $N^{th}$ PDCCH repetitive transmission being individually decoded.

When at least one of the N decodings is successful, it may be determined that the corresponding PDCCH is successfully decoded. The UE may report on whether an individual decoding scheme is supported through a UE capability or may imply whether an individual decoding scheme is supported. For example, when the UE reports the number of counting blind decoding (BD) for PDCCH repetitive transmission as 2, the UE may imply whether the individual decoding scheme is supported.

As another example, the methods presented in Scheme 3-1 to Scheme 3-4 or additional schemes do not assume the individual decoding scheme of the UE, but may assume soft combining thereof after reception of a plurality of PDCCH repetitive transmissions.

The UE may report on whether soft combining is supported through a UE capability or may imply whether soft combining is supported. For example, when the UE may report the number of BD counts for PDCCH repetitive transmission as 3 or both 2 and 3, whether soft combining is supported may be implied. Further, the UE may report 2 corresponding to the number of BD counts for PDCCH repetitive transmission and whether soft combining is supported together through the UE capability. The PDSCH processing time may also be calculated according to Scheme 3-5 to Scheme 3-8 in addition to the methods presented by Scheme 3-1 to Scheme 3-4.

When some PDCCH candidates are not monitored or are dropped during the PDCCH repetitive transmission (e.g., when an SSB and a specific PDCCH candidate overlap each other, the PDCCH candidate may not be monitored), $d_{1,1}$ may be calculated based on only PDCCH candidates which are not dropped even though one of Scheme 3-1 to Scheme 3-8 is used, and the value may be used for calculating the PDSCH processing time.

Alternatively, $d_{1,1}$ may be calculated based on one of Scheme 3-1 to Scheme 3-8, regardless of whether there are PDCCH candidates which are not dropped, and the value may be used for calculating the PDSCH processing time.

Embodiment 4: Scheme for Calculating PUSCH Preparation Process Time in Multi-TRP-Based PDCCH Repetitive Transmission A scheme for calculating a PUSCH preparation process time in multi-TRP-based PDCCH repetitive transmission is described. More specifically, the PDSCH preparation process time may be determined by the following factors.

PUSCH preparation process time-related UE capability report: processing capability 1 or 2
Numerology for PDCCH and PUSCH transmission
BWP change time In addition, when the PDCCH scheduling the PDSCH is repeatedly transmitted, some or all of the 3 considered factors are influenced by a PDCCH repetitive transmission scheme configured in the UE through higher-layer signaling, indicated to the UE through L1 signaling, or configured in and indicated to the UE by a combination of higher-layer signaling and L1 signaling, and thus, the calculation for the PUSCH preparation process time may become different. For example, when the PDCCH is TDMed using 2 TCI states and repeatedly transmitted and a BWP change in addition to PUSCH transmission scheduling through the corresponding PDCCH are indicated, a time point at which a BWP change time is applied may be needed to be redefined in consideration of PDCCH repetitive transmission.

Conditions for changing the PUSCH preparation process time calculation scheme according to the PDCCH repetitive transmission are described below.

Condition 4-1: New UE Capability Report Related to PUSCH Preparation Process Time According to PDCCH Repetitive Transmission The UE may report a new UE capability related to a PUSCH preparation process time according to PDCCH repetitive transmission to the BS. The BS and the HE may change the PUSCH preparation process time calculation scheme by defining a new PUSCH timing capability in addition to PUSCH timing capabilities 1 and 2 conventionally defined according to the new UE capability. Through the LE capability report related to the PDCCH repetitive transmission, the new PUSCH timing capability may be defined and used. That is, information on the UE capability related to the PUSCH preparation process time may be inserted into the UE capability report related to the PDCCH repetitive transmission and then transmitted to the BS. The report on the UE capability for the PDCCH repetitive transmission may include a report indicating that the UE is a UE capable of calculating a new PUSCH preparation process time to the BS. The UE capability report related to the PDCCH repetitive transmission may include information on at least one of whether soft combining according to the PDCCH repetitive transmission is supported, the scheme for counting the PDCCH candidate groups and the number of CCEs, the maximum number of PDCCH candidates and CCEs for each slot/each of a plurality of slots and each span/each of a plural of spans, the overbooking scheme, and the maximum number of TCI states which can be applied to PDCCH repetitive transmission.

Condition 4-2: PDCCH Repetitive Transmission Method

For the PDCCH repetitive transmission method, the UE may receive a configuration of at least one scheme among Method 1-1 to Method 1-5, from the BS, through a higher layer, receive an indication thereof through L1 signaling, or receive a configuration or an indication through a combination of higher-layer signaling or L1 signaling, and change the PUSCH preparation process time calculation scheme according to the corresponding PDCCH repetitive transmission method. For example, in the case of TDM in Method 1-1 (i.e., a method of repeatedly transmitting a plurality of PDCCHs having the same payload), FDM in Method 1-1, or Method 1-5 (i.e., a PDCCH transmission scheme (e.g., an SFN transmission scheme) in which a plurality of TCI states are applied to all CCEs within the same PDCCH candidate group), a PUSCH preparation process time calculation scheme for the PUSCH scheduled by repeatedly transmitted PDCCHs may be changed or the existing PUSCH preparation process time calculation scheme may be used.

Condition 4-3: Whether there is Explicit Connection Between PDCCH Repetitive Transmissions The PUSCH preparation process time calculation scheme may vary depending on information on an explicit linkage or association between repeatedly transmitted PDCCHs of which the UE receives a configuration through higher-layer signaling, receives an indication through L1 signaling, or receives a configuration or an indication through a combination of higher-layer signaling or L1 signaling.

Condition 4-4: Method of Receiving PDCCH Repetitive Transmission

The PUSCH preparation process time calculation scheme may vary depending on a scheme for receiving PDCCH repetitive transmission such as individual decoding or soft combining of which the UE receives a configuration through higher-layer signaling, receives an indication through L1 signaling, or receives a configuration or an indication through a combination of higher-layer signaling or L1 signaling.

Condition 4-5: Possibility of Applying Different Numerologies to PDCCH Repetitive Transmissions, or PDCCH Repetitive Transmission and the Scheduled PDSCH When the UE receives a downlink control channel and a data channel through a plurality of subcarriers having different numerologies, the UE may receive repeatedly transmitted PDCCHs through different subcarriers having different numerologies in order to receive the PDCCH and the PDSCH by efficiently using available subcarriers.

As another example, the UE may receive repetitive PDCCHs within one subcarrier having one numerology and transmit PUSCHs scheduled by the corresponding PDCCHs through another subcarrier having numerology different from that of the subcarrier receiving the PDCCH. That is, when scheduling subcarriers having different numerologies, the UE ma change the PUSCH preparation process time calculation scheme.

The PUSCH preparation process time calculation scheme may be changed by a combination of at least one of Condition 4-1 to Condition 4-5.

A scheme for calculating the PUSCH preparation process time which can be changed may also be listed as shown in Scheme 4-1 to Scheme 4-4.

Scheme 4-1: Definition of New $N_2$ According to PUSCH Preparation Process Time-Related New UE Capability Report Scheme 4-1 may equally use Equation (4) above, but may also use a new value of $N_2$ that has not been defined among the variables in Equation (4). Values which can be newly defined for $N_2$ may vary depending on numerology as shown in Table 36 below and $W_1$ to $W_4$ may be time units in units of symbols. For example, $W_1$ to $W_4$ are symbol offsets less than or equal to the two-slot length and may have one value among 1 to 56 symbols. New values of $N_2$ according to a new UE capability report may be applied only after reception of higher-layer configuration information.

TABLE 36

$N_2$ which can be newly defined according to new UE capability report

| μ | PUSCH preparation time $N_2$ [symbols] |
|---|---|
| 0 | $W_1$ |
| 1 | $W_2$ |
| 2 | $W_3$ |
| 3 | $W_4$ |

Scheme 4-2: Redefinition of BWP Change Time

Scheme 4-2 redefines a BWP change time according to PDCCH repetitive transmission. For example, in a case of intra-slot TDM-based PDCCH repetitive transmission in Method 1-1, when the existing definition of the BWP change time is applied, the UE cannot perform transmission and reception after a third symbol of the slot for receiving the PDCCH during a slot offset indicated through a time resource allocation field within DCI and thus, PDCCH repetition is possible only in 2 CORESETs including 1 symbol and there may be very large restriction. Accordingly, in this case, redefinition of the restriction in the slot for receiving the PDCCH may be needed.

When the UE receives a configuration of the PDCCH repetitive transmission scheme through higher-layer signaling, an indication thereof through L1 signaling, or a configuration and an indication thereof through higher-layer signaling and L1 signaling and in the case corresponding to intra-slat TDM-based PDCCH repetitive transmission in Method 1-1, the UE May perform at least one of the following operations for the BWP change time.

When the UE receives a notification of information on the connection (linkage) between repeated PDCCHs (e.g., a configuration through higher-layer signaling, an indication through L1 signaling, or a configuration and an indication through a combination of higher-layer or L1 signaling) and soft combining is possible, the UE cannot perform transmission and reception after the last symbol of all PDCCH repetitive transmissions within the slot during a slot offset indicated through a time resource allocation field within DCI.

When the UE does not receive a notification of information on the connection (or linkage) between repeated PDCCHs (e.g., a configuration through higher-layer signaling, an indication through L1 signaling, or a configuration and an indication through a combination of higher-layer or L1 signaling) and only an individual decoding is possible, the UE cannot perform transmission and reception after the last symbol of the PDCCH, of which the decoding is successful, in all PDCCH repetitive transmissions within the slot during a slot offset indicated through a time resource allocation field within DCI.

When the UE receives a notification of information on the connection (linkage) between repeated PDCCHs (a configuration through higher-layer signaling, an indication through L1 signaling, or a configuration and an indication through a combination of higher-layer or L1 signaling) and soft combining is possible, the UE cannot perform transmission and reception after the last symbol of all PDCCH repetitive transmissions within the slot during a slot offset indicated through a time resource allocation field within DCI if the last symbol of all PDCCH repetitive transmissions within the slot exists within 1 to 7 symbols, When the UE receives a notification of information on the connection (linkage) between repeated PDCCHs (a configuration through higher-layer signaling, an indication through L1 signaling, or a configuration and an indication through a combination of higher-layer or L1 signaling) and soft combining is possible, the UE cannot perform transmission and reception before a slot corresponding to a value obtained by adding 1 to a slot offset indicated through a time resource allocation field within DCI after the last symbol of all PDCCH repetitive transmissions within the slot and perform PUSCH transmission in the slot corresponding to the value obtained by adding 1 to the slot offset indicated through the time resource allocation field within DCI if the last symbol exists within $7^{th}$ to $14^{th}$ symbols in all PDCCH repetitive transmissions within the slot.

When the UE receives a notification of information on the connection (linkage) between repeated PDCCHs (a configuration through higher-layer signaling, an indication through L1 signaling, or a configuration and an indication through a combination of higher-layer or L1 signaling) and soft combining is possible, the UE cannot perform transmission and reception after a specific symbol of the slot for receiving the PDCCH during a slot offset indicated through a time resource allocation field within DCI and the specific symbol may be, for example, a $6^{th}$ symbol.

When the UE receives a configuration of the PDCCH repetitive transmission scheme through higher-layer signaling, an indication thereof through L1 signaling, or a configuration and an indication thereof through higher-layer signaling and L1 signaling and in a case corresponding to inter-slot TDM-based PDCCH repetitive transmission in Method 1-1, the UE may perform at least one of the following operations for the BWP change time.

When the UE receives a notification of information on the connection (linkage) between repeated PDCCHs (a configuration through higher-layer signaling, an indication through L1 signaling, or a configuration and an indication through a combination of higher-layer or L1 signaling) and soft combining is possible, the UE cannot perform transmission and reception after the last symbol of the PDCCH existing in the last slot of all inter-slot PDCCH repetitive transmissions during a slot offset indicated through a time resource allocation field within DCI. PDCCH repetitive transmission within each slot may be performed within first X symbols of the slot, and X may have, for example, one value of 3 to 14.

When the UE does not receive a notification of information on the connection (linkage) between repeated PDCCHs (a configuration through higher-layer signaling, an indication through L1 signaling, or a configuration and an indication through a combination of higher-layer or L1 signaling) and only an individual decoding is possible, the UE cannot perform transmission and reception after the last symbol of the PDCCH, of which the decoding is successful, in all inter-slot PDCCH repetitive transmissions during a slot offset indicated through a time resource allocation field within DCI. PDCCH repetitive transmission within each slot may be performed within first X symbols of the slot, and X may have, for example, one value of 3 to 14.

When the UE does not receive a notification of information on the connection (linkage) between repeated PDCCHs (a configuration through higher-layer signaling, an indication through L1 signaling, or a configuration and an indication through a combination of higher-layer or L1 signaling) and only an individual decoding is possible, the UE cannot perform transmission and reception before a slot corresponding to a value obtained by adding N-M to a slot offset indicated through a time resource allocation field within DCI after the last symbol of the PDCCH, of which the decoding is successful, if an $M^{th}$ PDCCH is successfully decoded in all of the N inter-slot PDCCH repetitive transmissions. PDCCH repetitive transmission within each slot may be performed within first X symbols of the slot, and X may have, for example, one value of 3 to 14.

When the UE receives a notification of information on the connection (linkage) between repeated PDCCHs (a configuration through higher-layer signaling, an indication through L1 signaling, or a configuration and an indication through a combination of higher-layer or L1 signaling) and soft combining is possible, the UE cannot perform transmission and reception before a slot corresponding to a value obtained by adding 1 to a slot offset indicated through a time resource allocation field within DCI after the last symbol of the PDCCH existing in the last slot of all inter-slot PDCCH repetitive transmissions. PDCCH repetitive transmission within each slot may be performed within first X symbols of the slot, and X may have, for example, one value of 3 to 14. The UE performs PUSCH transmission in the slot corresponding to the value obtained by 1 to the slot offset indicated through the time resource allocation field within DCI.

When the UE receives a configuration of the PDCCH repetitive transmission scheme through higher-layer signaling, an indication thereof through L1 signaling, or a configuration and an indication thereof through higher-layer signaling and L1 signaling and in a case corresponding to FDM-based PDCCH repetitive transmission in Method 1-1, the UE may perform at least one of the following operations for the BWP change time.

When the UE receives a notification of information on the connection (linkage) between repeated PDCCHs (a configuration through higher-layer signaling, an indication through L1 signaling, or a configuration and an indication through a combination of higher-layer or L1 signaling) and soft combining is possible, the UE cannot perform transmission and reception after the last symbol for transmitting all repeated PDCCHs during a slot offset indicated through a time resource allocation field within DCL PDCCH repetitive transmission may be performed within first X symbols of the slot, and X may have, for example, one value of 3 to 14.

When the UE receives a notification of information on the connection (linkage) between repeated PDCCHs (a configuration through higher-layer signaling, an indication through L1 signaling, or a configuration and an indication through a combination of higher-layer or L1 signaling) and only an individual decoding is possible, the UE cannot perform transmission and reception after the last symbol for transmitting all repeated PDCCHs during a slot offset indicated through a time resource allocation field within DCI. PDCCH repetitive transmission may be performed within first X symbols of the slot, and X may have, for example, one value of 3 to 14.

Scheme 4-3: New Definition of Symbol Offset $d_3$ According to PDCCH Repetitive Transmission Scheme 4-3 defines an additional offset in units of symbols when a PUSCH preparation process time is calculated according to PDCCH repetitive transmission. For example, a time spent for decoding the final PDCCH according to PDCCH repetitive transmission may vary depending on various PDCCH reception schemes, control resources and resources of search spaces, and the number of PDCCH candidates, so that a symbol offset may be defined for each representative case and considered for calculating the PUSCH preparation process time. When the PDCCH repetitive transmission scheme is based on TDM or according to whether the PDCCH reception scheme is individual decoding or soft combining, different symbol offset values may be used.

As another example, with respect to the time spent for PDCCH decoding, a single symbol offset which can be applied to all cases may be defined and considered for calculating the PUSCH preparation process time without defining symbol offsets for respective cases. A symbol offset between 1 to 28 symbols to be additionally considered for calculating the PUSCH preparation process time in PDCCH repetitive transmission may be defined, regardless of a PDCCH repetitive transmission scheme and a reception scheme. As shown in Equation (7) below, the PUSCH preparation process time may be calculated in consideration of an additional symbol offset value $d_3$.

$$T_{proc,2} = \max((N_2 + d_{2,1} + d_2 + d_3)(2048+144)\kappa 2^{-\mu} T_c + T_{ext} + T_{switch}, d_{2,2}) \quad (7)$$

Scheme 4-4: Definition of New Time Offset $T_{rep}$ Related to PUSCH Preparation Process Time Scheme 4-4 defines an additional offset in units of symbols when a PUSCH preparation process time is calculated according to PDCCH repetitive transmission. For example, an absolute time unit may be defined and used without defining an additional PDCCH decoding time in units of symbols according to a PDCCH reception scheme used for PDCCH repetitive transmission. Particularly, a time spent for decoding the final PDCCH according to PDCCH repetitive transmission may vary depending on various PDCCH repetitive transmission schemes and reception schemes, control resources and resources of search spaces, and the number of PDCCH candidates, so that a time unit value which can be conservatively applied to all cases may be newly defined and used without separately defining time unit values for individual cases. Accordingly, Equation (8) below may be reflected in an equation of a total PUSCH preparation process time by additionally defining a new time offset $T_{rep}$ related to the PUSCH preparation process time in PDCCH repetitive transmission.

$$T_{proc,2} = \max((N_2 + d_{2,1} + d_2)(2048+144)\kappa 2^{-\mu} T_c + T_{ext} + T_{switch} + T_{rep}, d_{2,2}) \quad (8)$$

Figure 22:
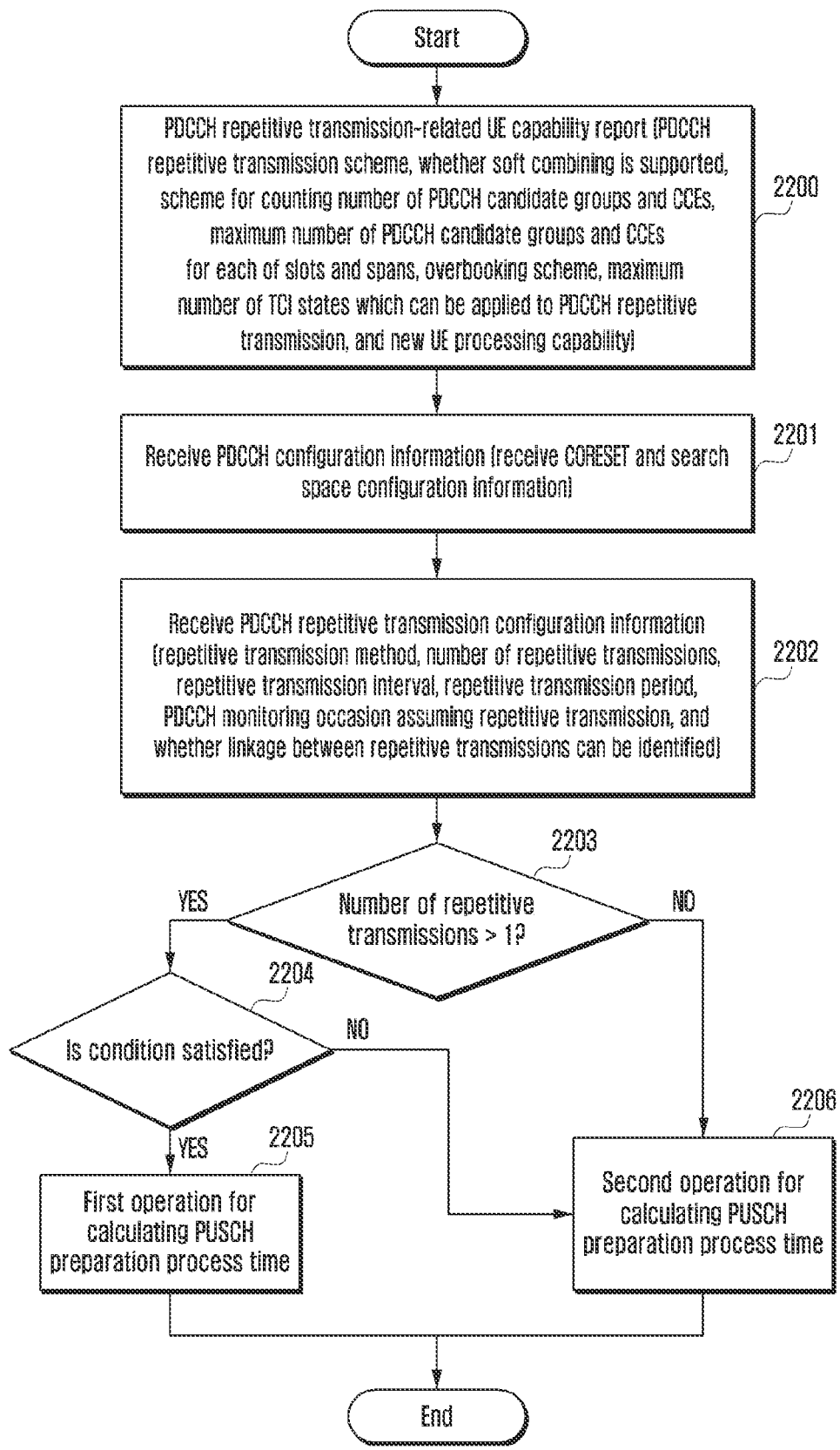
FIG. 22 is a flowchart illustrating an operation of a UE for calculating a PUSCH preparation process time according to a UE capability report in PDCCH repetitive transmission and whether a BS transmission condition is satisfied in a wireless communication system according to an embodiment.

FIG. 22 is a flowchart illustrating an operation of a UE for calculation of a PUSCH preparation process time according to a UE capability report in PDCCH repetitive transmission and whether a BS transmission condition is satisfied in a wireless communication system according to an embodiment.

Refrring to FIG. 22, in step 2200, the UE reports a UE capability related to PDCCH repetitive transmission to the BS. An available UE capability report may include information on at least one of a PDCCH repetitive transmission scheme (e.g., one of Methods 1-1 to 1-5), whether soft combining according to PDCCH repetitive transmission is supported, PDCCH candidates, a method of counting the number of CCEs, a maximum number of PDCCH candidates and the number of CCEs for each slot/a plurality of slots and for each span/a plurality of spans, the overbooking scheme, and a new UE processing capability.

Alternatively, when information on the UE capability is preconfigured for the corresponding UE or when the same default information is applied as the information on the UE capability for UEs in a predetermined group, step 2200 may be omitted.

In step 2201, the UE receives first configuration information for the PDCCH from the BS.

In step 2202, the UE receives second configuration information for PDCCH repetitive transmission. the second configuration information may include at least one piece of information such as a repetitive transmission method, the number of repetitive transmissions, a repetitive transmission interval, a repetitive transmission period, a PDCCH monitoring occasion in which repetitive, transmission is assumed, and whether linkage or association between repetitive transmissions can be identified. Further, the UE may receive at least some pieces of first and second configuration information through L1 signaling or may implicitly determine at least some pieces thereof lased on other configuration information.

Alternatively, the first and second configuration information may be included in one piece of configuration information and provided to the UE.

In step 2203, the UE identifies whether the number N of repetitive transmissions is greater than 1 (N is an integer).

When the number of repetitive transmissions is greater than 1 in step 2203, the UE identifies whether a BS transmission condition is satisfied in step 2204. The transmission condition may be a combination of at least one of Conditions 4-1 to 4-5.

When the transmission condition is not satisfied in step 2204 or when the number of repetitive transmissions is not greater than 1 in step 2203, the UE operates based on a conventional PUSCH preparation time calculation scheme a second PUSCH preparation process time calculation scheme) in step 2206. The number of repetitive transmissions corresponding to 1 may indicate that repetitive transmission is not performed.

When the transmission condition is satisfied in step 2204, the UE operates based on a new PUSCH preparation process time calculation scheme (i.e., a first PUSCH preparation process time calculation scheme) in step 2205. When the PUSCH preparation process time is calculated through the application of a new reference, a combination of at least one of Schemes 4-1 to 4-4 may be applied when the number of PDCCH repetitive transmissions is N.

Figure 23:
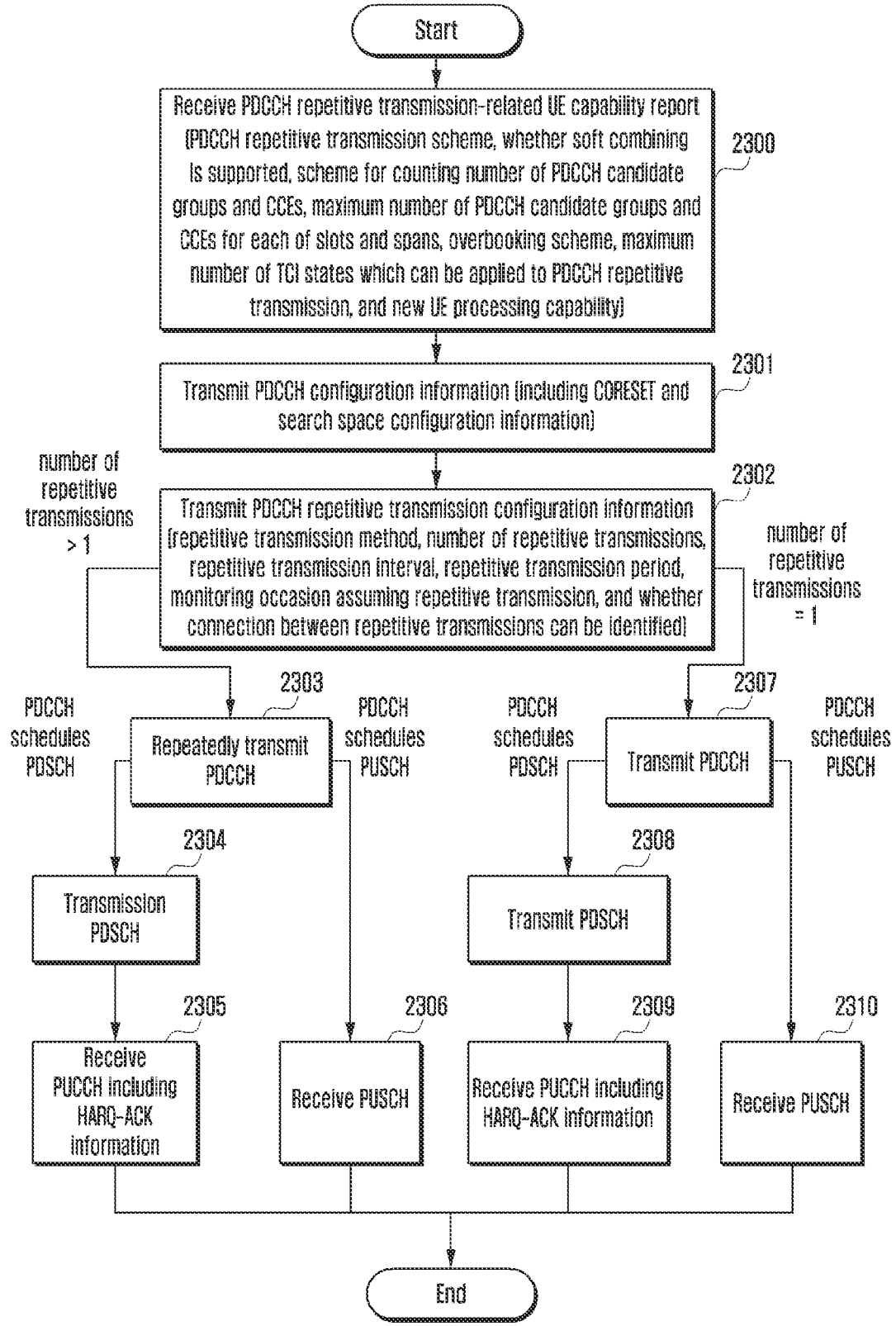
FIG. 23 is a flowchart illustrating a PDCCH repetitive transmission operation of a BS in a wireless communication system according to an embodiment.

FIG. 23 is flowchart illustrating a PDCCH repetitive transmission operation of a BS in a wireless communication system according to an embodiment.

Referring to FIG. 23, in step 2300, the BS receives a report on a UE capability related to PDCCH repetitive transmission from the UE. An available UE capability report may include information on at least one of a PDCCH repetitive transmission scheme (e.g., one of Methods 1-1 to 1-5), whether soft combining according to PDCCH repetitive transmission is supported, PDCCH candidates, a method of counting the number of CCEs, a maximum number of PDCCH candidates and the number of CCEs for each slot/a plurality of slots and for each span/a plurality of spans, the overbooking scheme, and a new UE processing capability.

Alternatively, when the information on the UE capability is pre-configured for the corresponding UE or when the same default information is applied as the information on the UE capability for UEs in a predetermined group, step 2300 may be omitted.

In step 2301, the BS transmits first configuration information for the PDCCH to the UE.

In step 2302, the BS transmits second configuration information for PDCCH repetitive transmission. The second configuration information may include at least one piece of information such as a repetitive transmission method, the number of repetitive transmissions, a repetitive transmission interval, a repetitive transmission period, a PDCCH monitoring occasion in which repetitive transmission is assumed, and whether linkage or association between repetitive transmissions can be identified. Further, the BS may transmit at least some pieces of the first configuration information and the second configuration information through L1 signaling.

Alternatively, the BS may insert the first configuration information and the second configuration information into one piece of configuration information and transmit the same to the UE. In this case, steps 2301 and 2302 may be simultaneously performed, or the first configuration information and the second configuration information may be inserted into one piece of configuration information and transmitted to the UE in step 2302.

Additionally, when the number of PDCCH repetitive transmissions is not larger than 1 (i.e., when PDCCH repetitive transmission is not performed), step 2302 may be omitted. Information indicating that PDCCH repetitive transmission is not performed may be included in the second configuration information or the number of repetitive transmissions may be configured as 1 in the second configuration information and transmitted to the UE. In this case, PDCCH repetitive transmission is not performed.

When the number of PDCCH repetitive transmissions is larger than 1 (i.e., when PDCCH repetitive transmission is performed), the BS repeatedly transmits the PDCCH to the UE based on the first configuration information and the second configuration information in step 2303.

When the PDCCH transmitted to the UE in step 2303 schedules a PDSCH, the BS transmits the scheduled PDSCH to the UE in step 2304 and receives a valid PUCCH containing HARQ-ACK information from the UE after a time of from the last symbol of the PDSCH in step 2305. When the BS transmission condition satisfies Conditions 3-1 to 3-5 or a condition obtained by combining at least one of Conditions 3-1 to 3-5, $T_{proc,1}$ may be determined by the UE according to Schemes 3-1 to 3-8 (i.e., a first PDSCH processing time calculation scheme) and a detailed description thereof has been made above and thus is omitted herein.

Alternatively, when the BS transmission condition does not satisfy Conditions 3-1 to 3-5 or the condition obtained by combining at least one of Conditions 3-1 to 3-5, $T_{proc,1}$ may be determined by the UE according to a conventional PDSCH processing time calculation scheme (i.e., a second. PDSCH processing time calculation scheme).

When the PDCCH transmitted to the UE in step 2303 schedules a PUSCH, the BS receives the PUSCH from the UE after a time of $T_{proc,2}$ from the last symbol of the PDCCH in step 2306. When the BS transmission condition satisfies Conditions 4-1 to 1-5 or a condition obtained by combining at least one of Conditions 4-1 to 4-5, may be determined by the UE according to Schemes 4-1 to 4-4 (i.e., a first PUSCH preparation process time calculation scheme) and a detailed description thereof has been made above and thus is omitted herein.

However, when the BS transmission condition does not satisfy Conditions 4-1 to 4-5 or the condition obtained by combining at least one of Conditions 4-1 to 4-5, $T_{proc,2}$ may be determined by the UE according to a conventional PUSCH preparation process time calculation scheme (i.e., a second PUSCH preparation process time calculation scheme).

When the number of PDCCH repetitive transmissions is not larger than 1 (i.e., when the number of repetitive transmissions is 1 or PDCCH repetitive transmission is not performed), the BS transmits the PDCCH to the LE based on the first configuration information in step 2307.

When the PDCCH transmitted to the UE in step 2307 schedules a PDSCH, the BS transmits the scheduled PDSCH to the UE in step 2308 and receives a valid PUCCH containing HARQ-ACK information from the UE after a time of $T_{proc,1}$ from the last symbol of the PDSCH in step 2309. $T_{proc,1}$ may be determined by the UE according to the conventional PDSCH processing time calculation scheme (i.e., a second PDSCH processing time calculation scheme).

However, when the PDCCH transmitted to the UE in step 2307 schedules a PUSCH, the BS receives the PUSCH from the UE after a time of $T_{proc,2}$ from the last symbol of the PDCCH in step 2310. $T_{proc,2}$ may be determined by the UE according to the conventional PUSCH preparation process time calculation scheme a second PUSCH preparation process time calculation scheme).

Figure 24:
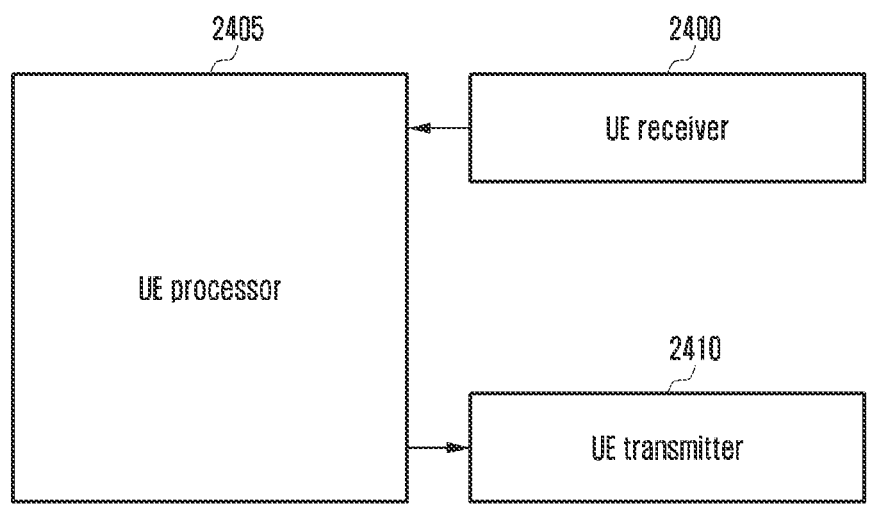
FIG. 24 illustrates a UE according to an embodiment.

FIG. 24 illustrates a UE according to an embodiment.

Referring to FIG. 24, the UE includes a U receiver 2400 and a UE transmitter 2410, a memory, and a UE processor 2405 (or a UE controller). The UE receiver 2400 and the UE transmitter 2410 may be embodied as a single transceiver. UE receiver 2400 and the UE transmitter 2410, the memory, and the UE processor 2405 may operate according to the above-described communication methods of the UE.

Additionally, the elements of the UE are not limited to the illustrated example. For example, the UE may include more or fewer elements than the above elements. Also, the UE receiver 2400, the UE transmitter 2410, the memory, and the processor 2405 may be implemented in the form of a single chip.

The UE receiver 2400 and the UE transmitter 2410 may receive and transmit signals to and from the BS. The signal may include control information and data. To this end, the transmitter 2410 may include an RF transmitter for up-converting and amplifying a frequency of the transmitted signal and the UE receiver 2400 may receive an RF receiver for low-noise amplifying the received signal and down-converting the frequency. However, the elements of the UE receiver 2400 and the UE transmitter 2410 are not limited to the RF receiver and the RF transmitter.

The UE receiver 2400 may receive a signal through a radio channel and output the signal to the processor, and the UE transmitter 2410 may transmit the signal output from the processor through the radio channel.

The memory may store a program and data required for the operation of the UE. Further, the memory may store control information or data included in the signal transmitted and received by the UE. The memory may be configured by storage media such as read only memory (ROM), random access memory (RAM), a hard disc, a compact disc-ROM (CD-ROM), a digital versatile disc (DVD), or a combination of the storage media. The may also be a plurality of memories.

The processor 2405 may control a series of processes to allow the UE to operate according to the above-described embodiments. For example, the processor 2405 may control elements of the UE to receive DCI including two layers and simultaneously receive a plurality of PDSCHs. The number of processors 2405 may be plural, and the processor 2405 may perform an operation of controlling the elements of the UE by executing the program stored in the memory.

Figure 25:
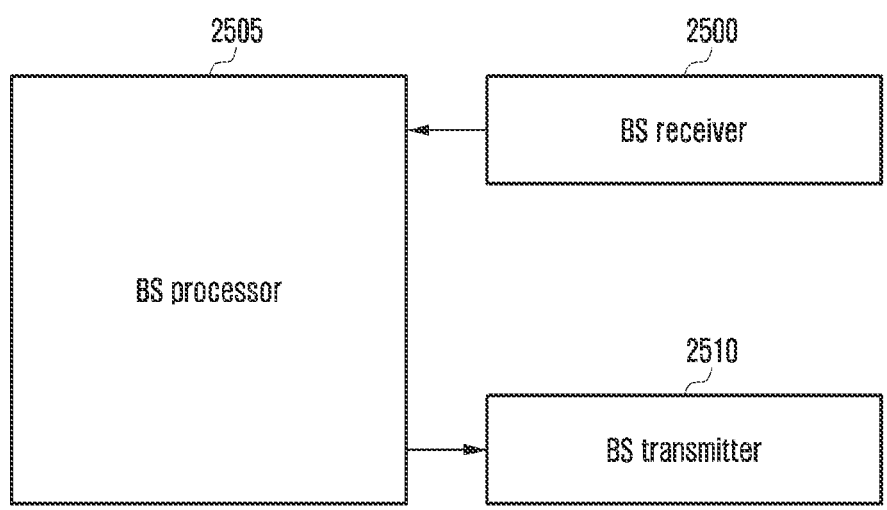
FIG. 25 illustrates a BS according to an embodiment.

FIG. 25 illustrates a BS according to an embodiment.

Referring to FIG. 25, the BS includes a BS receiver 2500, a BS transmitter 2510, a memory, and a BS processor 2505 (or a BS controller). The BS receiver 2500 and the BS transmitter 2510 may be embodied together as a transceiver. The BS receiver 2500, the BS transmitter 2510, the memory, and the BS processor 2505 may operate according to the communication method of the BS.

The elements of the BS are not limited to the illustrated example. For example, the BS may include more or fewer elements than the above-described elements. Also, the BS receiver 2500, the BS transmitter 2510, the memory, and the processor 2505 may be implemented in the form of a single chip.

The BS transmitter 2510 and the BS receiver 2500 may transmit and receive signals to and from the UE. The signal may include control information and data. To this end, the BS transmitter 2510 may include an RE transmitter for up-converting and amplifying a frequency of the transmitted signal and the BS receiver 2500 may include an RE receiver for low-noise amplifying the received signal and down-converting the frequency. However, this is only an example, and elements of the BS transmitter 2510 and the BS receiver 2500 are not limited to the RE transmitter and the RF receiver.

The BS receiver 2500 may receive a signal through a radio channel and output the signal to the processor 2505, and the BS transmitter 2510 may transmit the signal output from the processor through the radio channel.

The memory may store a program and data required for the operation of the BS. The memory may store control information or data included in a signal transmitted and received by the BS. The memory may be configured by storage media such as ROM, RAM, hard disc, CD-ROM, DVD, or a combination of the storage media. Also, there may be a plurality of memories.

The processor 2505 may control a series of processes to allow the BS to operate according to the above-described embodiments of the disclosure. For example, the processor 2505 may configure DCI of two layers including allocation information of a plurality of PDSCHs and control each element of the BS to transmit the DCI. The number of processors 2505 may be plural, and the processor 2505 may perform an operation of controlling the elements of the BS by executing the program stored in the memory.

The methods according to the various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory a ROM, an electrically erasable programmable read only memory (EEPROM), a magnetic disc storage device, a CD-ROM, DVDs, or other type optical storage devices, or a magnetic cassette. Alternatively, any combination of some or all of them may forma memory in which the program is stored. Further, a plurality of such memories may be included in the electronic device.

In addition, the programs may be stored in an attachable storage device which may access the electronic device through communication networks such as the Internet, an Intranet, a local area network (LAN), a wide LAN (WLAN), a storage area network (SAN), or a combination thereof. Such a storage device may access the electronic device via an external port. Further, a separate storage device on the communication network may access a portable electronic device.

In the above-described embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto based on the technical idea of the disclosure. Further, the above respective embodiments may be employed in combination, as necessary. That is, one embodiment of the disclosure may be partially combined with other embodiments to operate a BS and a terminal. For example, Embodiment 1 and 2 of the disclosure may be combined with each other to operate a BS and a terminal. Further, although the above embodiments have been described based on the FDD LTE system, other variants based on the technical idea of the embodiments may also be implemented in other communication systems such as TDD LTE, 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

According to the above-described embodiments of the disclosure, it is possible to implement a more efficient communication system according by determining a processing time of a UE in consideration of repetitive transmissions of a DL control channel in a wireless communication system.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
   receiving a physical downlink control channel (PDCCH) reception including a first PDCCH and a second PDCCH;
   identifying a physical downlink shared channel (PDSCH) scheduled by the PDCCH reception;
   identifying a $d_{1,1}$ value for a PDSCH processing time based on a PDCCH that results in a larger $d_{1,1}$ value among the first PDCCH and associated the second PDCCH;
   identifying the PDSCH processing time based on the identified $d_{1,1}$ value; and
   identifying whether to transmit, on a physical uplink control channel (PUCCH), hybrid automatic repeat request acknowledgement (HARQ-ACK) information for the PDSCH based on the PDSCH processing time.

2. The method of claim 1, wherein identifying the PDSCH processing time is further based on a count value associated with blind decoding of the PDCCH reception, and
   wherein the information on the count value is reported by the terminal.

3. The method of claim 1, wherein the PDCCH reception corresponds to a PDCCH repetition, and
   wherein a first payload of first downlink control information (DCI) in the first PDCCH is same as a second payload of second DCI in the second PDCCH.

4. The method of claim 1, wherein,
   for a processing capability 1 associated with the PDSCH processing time, $d_{1,1}$ is defined as:
     in case of $L \geq 7$, $d_{1,1}=0$,
     in case of $L \geq 4$ and $L \leq 6$, $d_{1,1}=7-L$,
     in case of $L=3$, $d_{1,1}=3+\min(d,1)$, and
     in case of $L=2$, $d_{1,1}=3+d$,
   wherein L is a number of symbols of a scheduled PDSCH,
   wherein d is a number of overlapping symbols of the scheduled PDSCH and a scheduling PDCCH of the scheduled PDSCH, and
   wherein, for a processing capability 2 associated with the PDSCH processing time, $d_{1,1}$ is defined as:
     in case of $Z \geq 7$, $d_{1,1}=0$,
     in case of $L \geq 3$ and $L \leq 6$, $d_{1,1}$ is the number of overlapping symbols of the scheduled PDSCH and the scheduling PDCCH, and
     in case of $L=2$:
       in case of the scheduling PDCCH corresponding to a 3-symbol control resource set (CORESET) and the CORESET and the scheduled PDSCH having a same starting symbol, $d_{1,1}=3$,
       in case of the scheduling PDCCH not corresponding to the 3-symbol CORESET, $d_{1,1}$=the number of overlapping symbols of the scheduled PDSCH and the scheduling PDCCH, and
       in case of the scheduled PDSCH having different starting symbols, $d_{1,1}$=the number of overlapping symbols of the scheduled PDSCH and the scheduling PDCCH.

5. A method performed by a base station in a communication system, the method comprising:
   transmitting a physical downlink control channel (PDCCH) transmission including a first PDCCH and a second PDCCH; and transmitting a physical downlink shared channel (PDSCH) scheduled by the PDCCH transmission;

wherein whether to receive, on a physical uplink control channel (PUCCH), hybrid automatic repeat request acknowledgement (HARQ-ACK) information for the PDSCH is associated with a PDSCH processing time, and wherein the PDSCH processing time is based on a PDCCH that results in a larger $d_{1,1}$ value among the first PDCCH and the second PDCCH.

6. The method of claim 5, further comprising receiving information on a count value associated with blind decoding of the PDCCH transmission, wherein the PDSCH processing time is further based on the count value.

7. The method of claim 5, wherein the PDCCH transmission corresponds to a PDCCH repetition, and wherein a first payload of first downlink control information (DCI) in the first PDCCH is same as a second payload of second DCI in the second PDCCH.

8. The method of claim 5, wherein, for a processing capability 1 associated with the PDSCH processing time, $d_{1,1}$ is defined as:
in case of L≥7, $d_{1,1}$=0,
in case of L≥4 and L≤6, $d_{1,1}$=7−L,
in case of L=3, $d_{1,1}$=3+min (d,1), and
in case of L=2, $d_{1,1}$=3+d, wherein L is a number of symbols of a scheduled PDSCH, wherein d is a number of overlapping symbols of the scheduled PDSCH and a scheduling PDCCH of the scheduled PDSCH, and wherein, for a processing capability 2 associated with the PDSCH processing time, $d_{1,1}$ is defined as:
in case of L≥7, $d_{1,1}$=0,
in case of L≥3 and L≤6, $d_{1,1}$ is the number of overlapping symbols of the scheduled PDSCH and the scheduling PDCCH, and
in case of L=2:
in case of the scheduling PDCCH corresponding to a 3-symbol control resource set (CORESET) and the CORESET and the scheduled PDSCH having a same starting symbol, $d_{1,1}$=3,
in case of the scheduling PDCCH not corresponding to the 3-symbol CORESET, $d_{1,1}$=the number of overlapping symbols of the scheduled PDSCH and the scheduling PDCCH, and
in case of the scheduled PDSCH having different starting symbols, $d_{1,1}$=the number of overlapping symbols of the scheduled PDSCH and the scheduling PDCCH.

9. A terminal in a communication system, the terminal comprising:

a transceiver; and a processor coupled with the transceiver and configured to:
receive a physical downlink control channel (PDCCH) reception including a first PDCCH and a second PDCCH,
identify a physical downlink shared channel (PDSCH) scheduled by the PDCCH reception,
identify a $d_{1,1}$ value for a PDSCH processing time based on a PDCCH that results in a larger $d_{1,1}$ value among the first PDCCH and the second PDCCH,
identify the PDSCH processing time based on the identified $d_{1,1}$ value, and
identify whether to transmit, on a physical uplink control channel (PUCCH), hybrid automatic repeat request acknowledgement (HARQ-ACK) information for the PDSCH based on the PDSCH processing time.

10. The terminal of claim 9, wherein the processor is further configured to identify the PDSCH processing time further based on a count value associated with blind decoding of the PDCCH reception, and wherein the information on the count value is reported by the terminal.

11. The terminal of claim 9, wherein the PDCCH reception corresponds to a PDCCH repetition, and wherein a first payload of first downlink control information (DCI) in the first PDCCH is same as a second payload of second DCI in the second PDCCH.

12. The terminal of claim 9, wherein, for a processing capability 1 associated with the PDSCH processing time, $d_{1,1}$ is defined as:
in case of L≥7, $d_{1,1}$=0,
in case of L≥4 and L≤6, $d_{1,1}$=7−L,
in case of L=3, $d_{1,1}$=3+min (d,1), and
in case of L=2, $d_{1,1}$=3+d, wherein L is a number of symbols of a scheduled PDSCH, wherein d is a number of overlapping symbols of the scheduled PDSCH and a scheduling PDCCH of the scheduled PDSCH, and wherein, for a processing capability 2 associated with the PDSCH processing time, $d_{1,1}$ is defined as:
in case of L≥7, $d_{1,1}$=0,
in case of L≥3 and L≤6, $d_{1,1}$ is the number of overlapping symbols of the scheduled PDSCH and the scheduling PDCCH, and
in case of L=2:
in case of the scheduling PDCCH corresponding to a 3-symbol control resource set (CORESET) and the CORESET and the scheduled PDSCH having a same starting symbol, $d_{1,1}$=3,
in case of the scheduling PDCCH not corresponding to the 3-symbol CORESET, $d_{1,1}$=the number of overlapping symbols of the scheduled PDSCH and the scheduling PDCCH, and
in case of the scheduled PDSCH having different starting symbols, $d_{1,1}$=the number of overlapping symbols of the scheduled PDSCH and the scheduling PDCCH.

13. A base station in a communication system, the base station comprising:

a transceiver; and a processor coupled with the transceiver and configured to:
transmit a physical downlink control channel (PDCCH) transmission including a first PDCCH a second PDCCH, and
transmit a physical downlink shared channel (PDSCH) scheduled by the PDCCH transmission, wherein whether to receive, on a physical uplink control channel (PUCCH), hybrid automatic repeat request acknowledgement (HARQ-ACK) information for the PDSCH is associated with a PDSCH processing time, and wherein the PDSCH processing time is based on a PDCCH that results in a larger $d_{1,1}$ value among the first PDCCH and the second PDCCH.

14. The base station of claim 13, wherein the processor is configured to receive information on a count value associated with blind decoding of the PDCCH transmission, and wherein the PDSCH processing time is further based on the count value.

15. The base station of claim 13, wherein the PDCCH transmission corresponds to a PDCCH repetition, and
wherein a first payload of first downlink control information (DCI) in the first PDCCH is same as a second payload of second DCI in the second PDCCH.

16. The base station of claim 13, wherein,
for a processing capability 1 associated with the PDSCH processing time, $d_{1,1}$ is defined as:
in case of $L \geq 7$, $d_{1,1}=0$,
in case of $L \geq 4$ and $L \leq 6$, $d_{1,1}=7-L$,
in case of $L=3$, $d_{1,1}=3+\min(d,1)$, and
in case of $L=2$, $d_{1,1}=3+d$,
wherein L is a number of symbols of a scheduled PDSCH,
wherein d is a number of overlapping symbols of the scheduled PDSCH and a scheduling PDCCH of the scheduled PDSCH, and
wherein, for a processing capability 2 associated with the PDSCH processing time, $d_{1,1}$ is defined as:
in case of $L \geq 7$, $d_{1,1}=0$,
in case of $L \geq 3$ and $L \leq 6$, $d_{1,1}$ is the number of overlapping symbols of the scheduled PDSCH and the scheduling PDCCH, and
in case of $L=2$:
in case of the scheduling PDCCH corresponding to a 3-symbol control resource set (CORESET) and the CORESET and the scheduled PDSCH having a same starting symbol, $d_{1,1}=3$,
in case of the scheduling PDCCH not corresponding to the 3-symbol CORESET, $d_{1,1}$=the number of overlapping symbols of the scheduled PDSCH and the scheduling PDCCH, and
in case of the scheduled PDSCH having different starting symbols, $d_{1,1}$=the number of overlapping symbols of the scheduled PDSCH and the scheduling PDCCH.

* * * * *